(12) United States Patent
Edlund et al.

(10) Patent No.: US 7,052,530 B2
(45) Date of Patent: May 30, 2006

(54) HYDROGEN PURIFICATION MEMBRANES, COMPONENTS AND FUEL PROCESSING SYSTEMS CONTAINING THE SAME

(75) Inventors: David J. Edlund, Bend, OR (US); William A. Pledger, Bend, OR (US); R. Todd Studebaker, Bend, OR (US)

(73) Assignee: IdaTech, LLC, Bend, OR (US)

( * ) Notice: Subject to any disclaimer, the term of this patent is extended or adjusted under 35 U.S.C. 154(b) by 25 days.

(21) Appl. No.: 10/989,907

(22) Filed: Nov. 15, 2004

(65) Prior Publication Data

US 2005/0188843 A1    Sep. 1, 2005

Related U.S. Application Data

(63) Continuation of application No. 10/728,473, filed on Dec. 5, 2003, now Pat. No. 6,824,593, which is a continuation of application No. 10/430,110, filed on May 5, 2003, now Pat. No. 6,723,156, which is a continuation of application No. 10/371,597, filed on Feb. 20, 2003, now Pat. No. 6,632,270, which is a continuation of application No. 10/027,509, filed on Dec. 19, 2001, now Pat. No. 6,537,352, which is a continuation-in-part of application No. 10/003,164, filed on Nov. 14, 2001, now Pat. No. 6,458,189, and a continuation-in-part of application No. 09/967,172, filed on Sep. 27, 2001, now Pat. No. 6,494,937, and a continuation-in-part of application No. 09/839,997, filed on Apr. 20, 2001, now Pat. No. 6,783,741, and a continuation-in-part of application No. 09/618,866, filed on Jul. 19, 2000, now Pat. No. 6,547,858, said application No. 10/003,164 is a continuation of application No. 09/812,499, filed on Mar. 19, 2001, now Pat. No. 6,319,306, said application No. 09/839,997 is a continuation of application No. 09/291,447, filed on Apr. 13, 1999, now Pat. No. 6,221,117, which is a continuation-in-part of application No. 08/951,091, filed on Oct. 15, 1997, now Pat. No. 5,997,594, which is a continuation-in-part of application No. 08/741,057, filed on Oct. 30, 1996, now Pat. No. 5,861,137, said application No. 09/618,866 is a continuation-in-part of application No. 09/274,154, filed on Mar. 22, 1999, now Pat. No. 6,152,995.

(51) Int. Cl.
  *B01D 53/22* (2006.01)

(52) U.S. Cl. .............................. 96/4; 48/127.7; 48/128; 48/DIG. 5; 95/55; 95/56; 96/11; 422/211; 429/12; 429/20

(58) Field of Classification Search .................. 96/4, 96/11–14; 95/45, 54–56; 422/187–193, 422/211; 423/650–652; 429/12, 17–21; 48/76, 127.9, 197 R, DIG. 5, 128, 203, 127.7
See application file for complete search history.

(56) References Cited

U.S. PATENT DOCUMENTS

| | | | |
|---|---|---|---|
| 1,306,221 A | 6/1919 | Ellis | |
| 1,782,824 A | 11/1930 | Hechenbleikner | |
| 1,848,466 A | 3/1932 | Edmonds | |
| 2,132,151 A | 10/1938 | Fenske et al. | |
| 2,319,508 A * | 5/1943 | Leprestre et al. | 196/127 |
| 2,450,804 A | 10/1948 | Loy | |
| 2,609,059 A | 9/1952 | Benedict | |
| 2,824,620 A | 2/1958 | De Rosset | |
| 3,094,391 A | 6/1963 | Mader | |
| 3,144,312 A | 8/1964 | Mertens | |
| 3,208,198 A | 9/1965 | Rubin | |
| 3,264,066 A * | 8/1966 | Quartulli et al. | 423/654 |
| 3,278,268 A * | 10/1966 | Pfefferle, Jr. | 423/654 |
| 3,278,452 A * | 10/1966 | Vorum | 252/376 |
| 3,336,730 A | 8/1967 | McBride et al. | |
| 3,338,681 A | 8/1967 | Kordesch | |
| 3,344,586 A | 10/1967 | Langley et al. | |
| 3,350,176 A | 10/1967 | Green et al. | |
| 3,356,538 A | 12/1967 | Miekka et al. | |
| 3,368,329 A | 2/1968 | Eguchi et al. | |
| 3,428,476 A | 2/1969 | Langley et al. | |
| 3,439,474 A | 4/1969 | McKinley | |
| 3,447,288 A | 6/1969 | Juda et al. | |
| 3,450,500 A | 6/1969 | Setzer et al. | |

| Patent | Date | Inventor |
|---|---|---|
| 3,469,372 A | 9/1969 | Yamauchi et al. |
| 3,469,944 A | 9/1969 | Bocard et al. |
| 3,486,301 A | 12/1969 | Bonnet |
| 3,520,803 A | 7/1970 | Iaconelli |
| 3,522,019 A | 7/1970 | Buswell et al. |
| 3,524,819 A | 8/1970 | Guerrieri |
| 3,534,531 A | 10/1970 | Eguchi et al. |
| 3,564,819 A | 2/1971 | Neulander et al. |
| 3,589,171 A | 6/1971 | Haley |
| 3,665,680 A | 5/1972 | Heuser |
| 3,713,270 A | 1/1973 | Farr et al. |
| 3,761,382 A | 9/1973 | Hammond et al. |
| 3,782,904 A | 1/1974 | Fletcher |
| 3,787,038 A | 1/1974 | Tesner et al. |
| 3,791,106 A | 2/1974 | Haley |
| 3,839,110 A | 10/1974 | Shankoff |
| 3,849,076 A | 11/1974 | Gryaznov et al. |
| 3,881,891 A | 5/1975 | Goltsov et al. |
| 3,881,897 A | 5/1975 | Faure et al. |
| 3,920,416 A | 11/1975 | Houseman |
| 3,955,941 A | 5/1976 | Houseman et al. |
| 3,972,695 A | 8/1976 | Buckley et al. |
| 3,980,452 A | 9/1976 | Krumm et al. |
| 3,982,910 A | 9/1976 | Houseman et al. |
| 4,003,343 A | 1/1977 | Lee |
| 4,003,725 A | 1/1977 | Bunn, Jr. et al. |
| 4,056,373 A | 11/1977 | Rubin |
| 4,078,985 A | 3/1978 | Takeuchi |
| 4,084,934 A | 4/1978 | Kumazawa |
| 4,098,959 A | 7/1978 | Fanciullo |
| 4,098,960 A | 7/1978 | Gagnon |
| 4,127,393 A | 11/1978 | Timmins et al. |
| 4,132,668 A | 1/1979 | Gryaznov et al. |
| 4,134,739 A | 1/1979 | Gulden et al. |
| 4,197,152 A | 4/1980 | Palty et al. |
| 4,238,403 A | 12/1980 | Pinto |
| 4,248,688 A | 2/1981 | Gartner et al. |
| 4,254,086 A | 3/1981 | Sanders |
| 4,302,177 A | 11/1981 | Fankhanel et al. |
| 4,313,013 A | 1/1982 | Harris |
| 4,315,893 A | 2/1982 | McCallister |
| 4,319,923 A | 3/1982 | Falanga et al. |
| 4,329,157 A | 5/1982 | Dobo et al. |
| 4,331,520 A | 5/1982 | Juda et al. |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,417,905 A | 11/1983 | Banks et al. |
| 4,422,911 A | 12/1983 | Juda et al. |
| 4,430,304 A | 2/1984 | Spurrier et al. |
| 4,444,158 A | 4/1984 | Yoon |
| 4,468,235 A | 8/1984 | Hill |
| 4,472,176 A | 9/1984 | Rubin |
| 4,473,622 A | 9/1984 | Chludzinski et al. |
| 4,504,447 A | 3/1985 | Spurrier et al. |
| 4,533,607 A | 8/1985 | Sederquist |
| 4,553,981 A | 11/1985 | Fuderer |
| 4,567,857 A | 2/1986 | Houseman et al. |
| 4,589,891 A | 5/1986 | Iniotakis et al. |
| 4,642,273 A | 2/1987 | Sasaki |
| 4,644,751 A | 2/1987 | Hsu |
| 4,650,814 A | 3/1987 | Keller |
| 4,654,063 A | 3/1987 | Auvil et al. |
| 4,655,797 A | 4/1987 | Iniotakis et al. |
| 4,657,828 A | 4/1987 | Tajima |
| 4,659,634 A | 4/1987 | Struthers |
| 4,670,359 A | 6/1987 | Beshty et al. |
| 4,684,581 A | 8/1987 | Struthers |
| 4,699,637 A | 10/1987 | Iniotakis et al. |
| 4,713,234 A | 12/1987 | Weirich et al. |
| 4,751,151 A | 6/1988 | Healy et al. |
| 4,781,241 A | 11/1988 | Misage et al. |
| 4,788,004 A | 11/1988 | Pinto et al. |
| 4,810,485 A | 3/1989 | Marianowski et al. |
| 4,838,897 A | 6/1989 | Amano et al. |
| 4,849,187 A | 7/1989 | Uozu et al. |
| 4,865,624 A | 9/1989 | Okada |
| 4,880,040 A | 11/1989 | Pierson et al. |
| 4,904,455 A | 2/1990 | Karafian et al. |
| 4,904,548 A | 2/1990 | Tajima |
| 4,946,667 A | 8/1990 | Beshty |
| 4,981,676 A | 1/1991 | Minet et al. |
| 4,999,107 A | 3/1991 | Guerif |
| 5,030,661 A | 7/1991 | Lywood |
| 5,032,365 A | 7/1991 | Aono et al. |
| 5,126,045 A | 6/1992 | Kohlheb et al. |
| 5,139,541 A | 8/1992 | Edlund |
| 5,158,581 A | 10/1992 | Coplan |
| 5,205,841 A | 4/1993 | Vaiman |
| 5,215,729 A | 6/1993 | Buxbaum |
| 5,217,506 A | 6/1993 | Edlund et al. |
| 5,225,080 A | 7/1993 | Karbachsch et al. |
| 5,226,928 A | 7/1993 | Makabe et al. |
| 5,229,102 A | 7/1993 | Minet et al. |
| 5,259,870 A | 11/1993 | Edlund |
| 5,326,550 A | 7/1994 | Adris et al. |
| 5,335,628 A | 8/1994 | Dunbar |
| 5,344,721 A | 9/1994 | Sonai et al. |
| 5,354,547 A | 10/1994 | Rao et al. |
| 5,376,167 A | 12/1994 | Broutin et al. |
| 5,382,271 A | 1/1995 | Ng et al. |
| 5,393,325 A | 2/1995 | Edlund |
| 5,395,425 A | 3/1995 | Brown |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,449,848 A | 9/1995 | Itoh |
| 5,458,857 A | 10/1995 | Collins et al. |
| 5,498,278 A | 3/1996 | Edlund |
| 5,500,122 A | 3/1996 | Schwartz |
| 5,509,942 A | 4/1996 | Dodge |
| 5,516,344 A | 5/1996 | Corrigan |
| 5,518,530 A | 5/1996 | Sakai et al. |
| 5,520,807 A | 5/1996 | Myrna et al. |
| 5,525,322 A | 6/1996 | Willms |
| 5,527,632 A | 6/1996 | Gardner |
| 5,536,405 A | 7/1996 | Myrna et al. |
| 5,580,523 A | 12/1996 | Bard |
| 5,589,599 A | 12/1996 | McMullen et al. |
| 5,612,012 A | 3/1997 | Soma et al. |
| 5,616,430 A | 4/1997 | Aoyama |
| 5,637,259 A | 6/1997 | Galuszka et al. |
| 5,637,414 A | 6/1997 | Inoue et al. |
| 5,639,431 A | 6/1997 | Shirasaki et al. |
| 5,645,626 A | 7/1997 | Edlund et al. |
| 5,658,681 A | 8/1997 | Sato et al. |
| 5,677,073 A | 10/1997 | Kawatsu |
| 5,679,249 A | 10/1997 | Fendya et al. |
| 5,705,082 A | 1/1998 | Hinson |
| 5,705,916 A | 1/1998 | Rudbeck et al. |
| 5,712,052 A | 1/1998 | Kawatsu |
| 5,714,276 A | 2/1998 | Okamoto |
| 5,734,092 A | 3/1998 | Wang et al. |
| 5,738,708 A | 4/1998 | Peachey et al. |
| 5,741,474 A | 4/1998 | Isomura et al. |
| 5,741,605 A | 4/1998 | Gillett et al. |
| 5,780,179 A | 7/1998 | Okamoto |
| 5,782,960 A | 7/1998 | Ogawa et al. |
| 5,795,666 A | 8/1998 | Johnssen |
| 5,811,065 A | 9/1998 | Sterenberg |
| 5,814,112 A | 9/1998 | Elliot et al. |
| 5,821,185 A | 10/1998 | White et al. |
| 5,833,723 A | 11/1998 | Kuwabara et al. |
| 5,858,314 A | 1/1999 | Hsu et al. |

| | | |
|---|---|---|
| 5,861,137 A | 1/1999 | Edlund |
| 5,874,051 A | 2/1999 | Heil et al. |
| 5,888,273 A | 3/1999 | Buxbaum |
| 5,897,766 A | 4/1999 | Kawatsu |
| 5,897,970 A | 4/1999 | Isomura et al. |
| 5,904,754 A | 5/1999 | Juda et al. |
| 5,931,987 A | 8/1999 | Buxbaum |
| 5,932,181 A | 8/1999 | Kim et al. |
| 5,938,800 A | 8/1999 | Verrill et al. |
| 5,985,474 A | 11/1999 | Chen et al. |
| 5,997,594 A | 12/1999 | Edlund et al. |
| 5,998,053 A | 12/1999 | Diethelm |
| 6,007,931 A | 12/1999 | Fuller et al. |
| 6,042,956 A | 3/2000 | Lenel |
| 6,045,772 A | 4/2000 | Szydlowski et al. |
| 6,045,933 A | 4/2000 | Okamoto |
| 6,054,229 A | 4/2000 | Hsu et al. |
| 6,077,620 A | 6/2000 | Pettit |
| 6,083,637 A | 7/2000 | Walz et al. |
| 6,103,028 A | 8/2000 | Juda et al. |
| 6,103,411 A | 8/2000 | Matsubayashi et al. |
| 6,152,995 A | 11/2000 | Edlund |
| 6,165,633 A | 12/2000 | Negishi |
| 6,168,650 B1 | 1/2001 | Buxbaum |
| 6,171,574 B1 | 1/2001 | Juda et al. |
| 6,183,543 B1 | 2/2001 | Buxbaum |
| 6,190,623 B1 | 2/2001 | Sanger et al. |
| 6,201,029 B1 | 3/2001 | Waycuilis |
| 6,221,117 B1 | 4/2001 | Edlund et al. |
| 6,238,465 B1 | 5/2001 | Juda et al. |
| 6,242,120 B1 | 6/2001 | Herron |
| 6,319,306 B1 | 11/2001 | Edlund et al. |
| 6,395,405 B1 | 5/2002 | Buxbaum |
| 6,458,189 B1 | 10/2002 | Edlund et al. |
| 6,461,408 B1 | 10/2002 | Buxbaum |
| 6,494,937 B1 | 12/2002 | Edlund et al. |
| 6,537,352 B1 | 3/2003 | Edlund et al. |
| 6,547,858 B1 | 4/2003 | Edlund et al. |
| 6,562,111 B1 * | 5/2003 | Edlund et al. .............. 96/4 |
| 6,569,227 B1 * | 5/2003 | Edlund et al. .............. 96/4 |
| 6,596,057 B1 * | 7/2003 | Edlund et al. .............. 96/4 |
| 6,632,270 B1 | 10/2003 | Edlund et al. |
| 6,719,831 B1 * | 4/2004 | Edlund et al. .............. 96/4 |
| 6,723,156 B1 * | 4/2004 | Edlund et al. .............. 96/4 |
| 6,767,389 B1 * | 7/2004 | Edlund et al. ............. 96/11 |
| 6,824,593 B1 * | 11/2004 | Edlund et al. .............. 96/4 |
| 6,899,744 B1 * | 5/2005 | Mundschau ............... 95/56 |
| 6,953,497 B1 * | 10/2005 | Edlund et al. .............. 96/4 |
| 2001/0045061 A1 * | 11/2001 | Edlund et al. ............. 48/76 |
| 2002/0146359 A1 * | 10/2002 | Lomax et al. ........... 422/198 |
| 2004/0244591 A1 * | 12/2004 | Edlund et al. ............. 96/11 |

FOREIGN PATENT DOCUMENTS

| | | | |
|---|---|---|---|
| EP | 0 335 418 | * 10/1989 | .............. 95/54 |
| EP | 0434562 A1 | 6/1991 | |
| EP | 1065741 A2 | 1/2001 | |
| JP | 45-14404 | 5/1970 | |
| JP | 45-2642 | 9/1970 | |
| JP | 57-145276 | 9/1982 | |
| JP | 1-145302 | 6/1989 | |
| JP | 1-145303 | 6/1989 | |
| JP | 1262903 | 10/1989 | |
| JP | 4-163860 | 6/1992 | |
| JP | 4-338101 | 11/1992 | |
| JP | 6-134244 | 5/1994 | |
| WO | WO 97/25649 | 7/1997 | |
| WO | WO 97/43796 | 11/1997 | |
| WO | WO 99/30806 | 6/1999 | |
| WO | WO 99/65097 | 12/1999 | |
| WO | WO 00/04600 | 1/2000 | |
| WO | WO 00/27507 | 5/2000 | |
| WO | WO 01/03086 | 1/2001 | |
| WO | WO 01/28662 | 4/2001 | |

OTHER PUBLICATIONS

English-language abstract of Japanese Patent No. 1-262903, 1989.

English-language abstract of Japanese Patent No. 432150, 1992.

English-language abstract of Japanese Patent No. 513230, 1993.

English-language abstract of Japanese Patent No. 514790, 1993.

English-language abstract of Japanese Patent No. 4-338101.

English-language abstract of Japanese Patent No. 604070, 1994.

English-language abstract of Japanese Patent No. 634540.

English-language abstract of Japanese Patent No. 710910, 1995.

English-language abstract of Japanese Patent No. 828793, 1996.

English-language abstract of Japanese Patent No. 6176779, 1994.

English-language abstract of Japanese Patent No. 7057758, 1995.

English-language abstract of Japanese Patent No. 11116202, 1999.

English-language abstract of Japanese Patent No. 57-145276.

English-language abstract of Japanese Patent No. 1-145302.

English-language abstract of Japanese Patent No. 1-145303.

English-language abstract of Great Britain Patent No. 2,305,186.

English-language abstract of German language PCT Patent Application Serial No. WO 00/04600, 2000.

Adris, A. M., et al., "A Fluidized Bed Membrane Reactor for the Steam Reforming of Methane," The Canadian Journal of Chemical Engineering, vol. 69, pp. 1061-1070 (Oct., 1991).

Amphlett, J. C., et al., "On Board Hydrogen Purification for Steam Reformer/PEM Fuel Cell Vehicle Power Plants," Energy Progress X, Proceedings of the 10th World Hydrogen Energy Conference, Cocoa Beach, Florida, U.S.A., vol. 3, pp. 1681-1690 (Jun., 1994).

Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).

Chai, M., et al., "Promotion of Methane Steam Reforming Using Ruthenium-Dispersed Microporous Alumina Membrane Reactor," Chemistry Letters, The Chemical Society of Japan, pp. 41-44 (1993).

"Compact, Lightweight Fuel Reformer for Fuel Cells," Argonne National Laboratory/U.S. Department of Energy (Jul., 1996).

Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).

Edlund, David J. and William A. Pledger, "The Practical Use of Metal-Membrane Reactors for Industrial Applications," The 1995 Membrane Technology Reviews, pp. 89-97 (Nov., 1994).

Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).

Emonts, B., et al., "Compact Methanol Reformer Test for Fuel-Cell Powered Light-Duty Vehicles," Fifth Grove Fuel Cell Symposium, Commonwealth Institute, London, U.K., (no page no.), (Sep. 22-25, 1997).

Jørgensen, S. Lægsgaard, et al., "Application of Pd-Membranes for the Production of Pure Hydrogen in Methanol-Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51-57 (May 30-31, 1997).

Knapton, A. G., "Palladium Alloys for Hydrogen Diffusion Membranes," Platinum Metals Review, vol. 21, 44-50 (1977).

Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).

Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no page no.), (Sep. 22-25, 1997).

Minet, R. G., et al., "Experimental Studies of A Ceramic Membrane Reactor for the Steam/Methane Reaction at Moderate Temperatures (400-700° C)," Symposium on Natural Gas Upgrading II Presented before The Division of Petroleum Chemistry, Inc., Meeting of American Chemical Society, San Francisco, California, U.S.A., pp. 245-248 (Apr., 1992).

Oertel, Michael, et al., "Steam Reforming of Natural Gas with Integrated Hydrogen Separation for Hydrogen Production," Chemical Engineering Techology, vol. 10, pp. 248-255 (1987).

Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.

Privette et al., "Status of SOFCo SOFC Technology Development," presented at the 1996 Fuel Cell Seminar held Nov. 17-20, 1996 in Orlando, Florida, pp. 206-209.

Shu, J., et al., "Catalytic Palladium-Based Membrane Reactors: A Review," The Canadian Journal of Chemical Engineering, vol. 69, pp. 1036-1060 (Oct., 1991).

Teagan, W. P., et al., "Cost Reduction of Fuel Cells for Transportation Applications—Fuel Processing Options," Fifth Grove Fuel Cell Symposium Commonwealth Insitute, London, U.K. (Sep. 22-25, 1997).

* cited by examiner

*Primary Examiner*—Richard L. Chiesa
(74) *Attorney, Agent, or Firm*—Kolisch Hartwell, P.C.

(57) ABSTRACT

Hydrogen purification membranes, hydrogen purification devices, and fuel processing and fuel cell systems that include hydrogen purification devices. The hydrogen purification membranes include a metal membrane, which is at least substantially comprised of palladium or a palladium alloy. In some embodiments, the membrane contains trace amounts of carbon, silicon, and/or oxygen. In some embodiments, the membranes form part of a hydrogen purification device that includes an enclosure containing a separation assembly, which is adapted to receive a mixed gas stream containing hydrogen gas and to produce a stream that contains pure or at least substantially pure hydrogen gas therefrom. In some embodiments, the membrane(s) and/or purification device forms a portion of a fuel processor, and in some embodiments, the membrane(s) and/or purification device forms a portion of a fuel processing or fuel cell system.

31 Claims, 17 Drawing Sheets

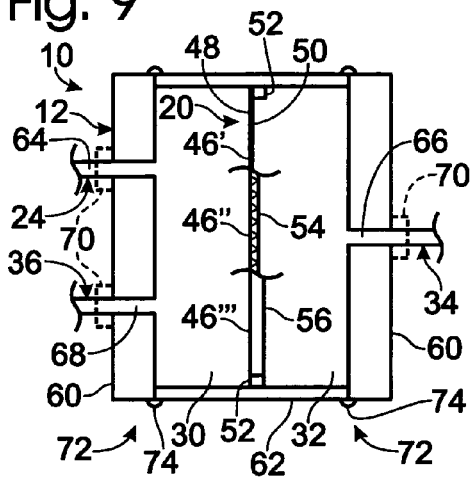
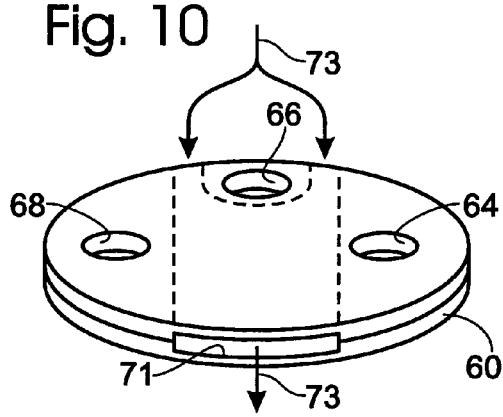
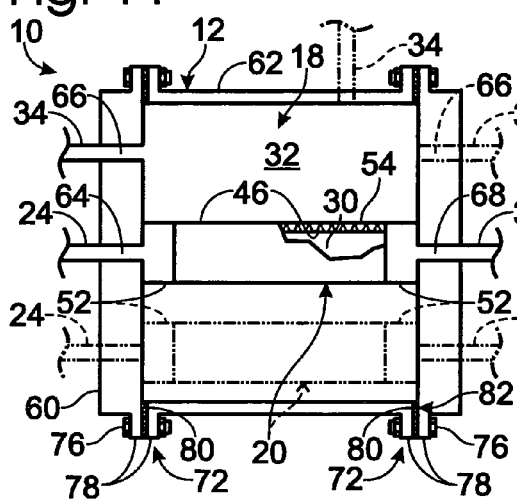
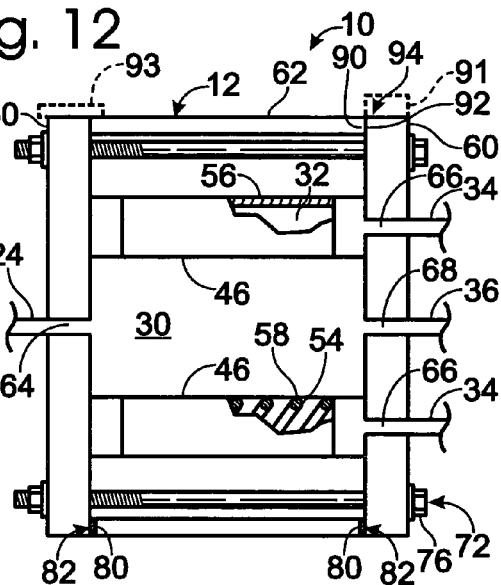
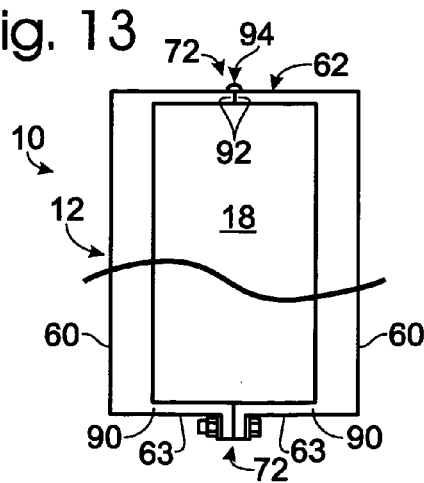

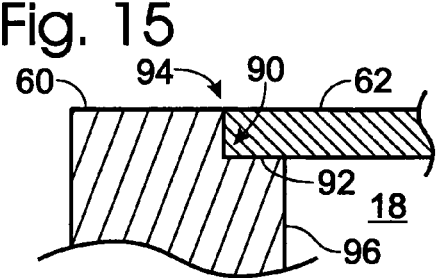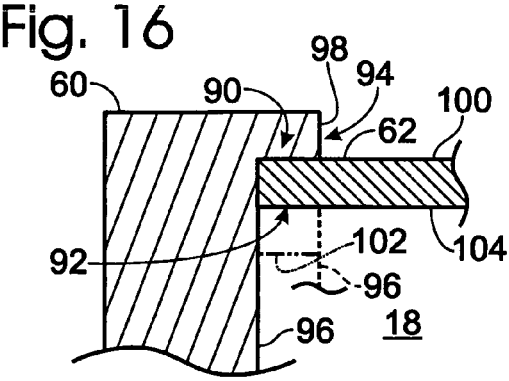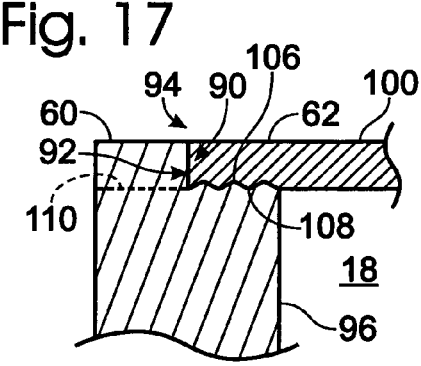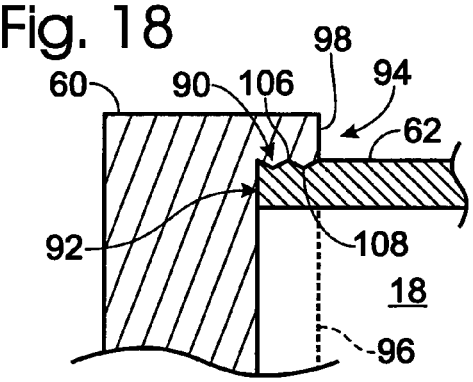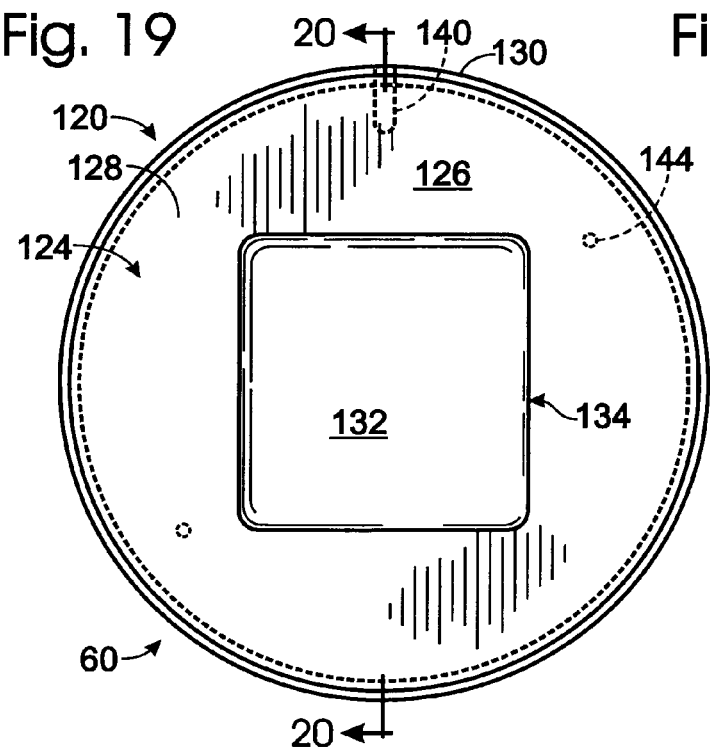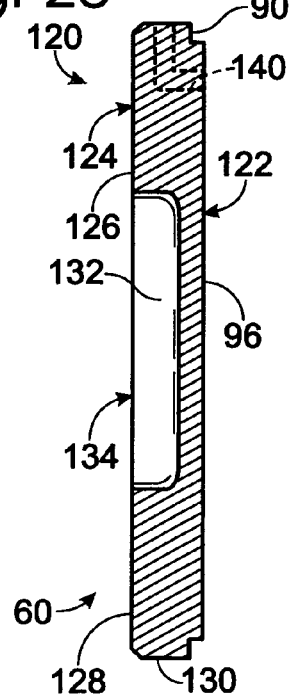

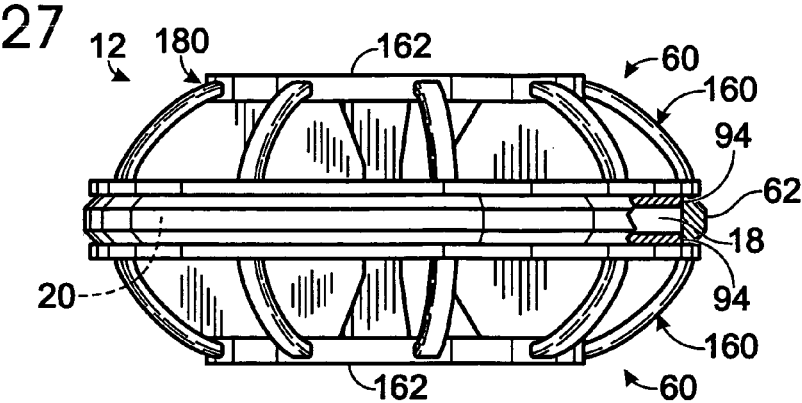
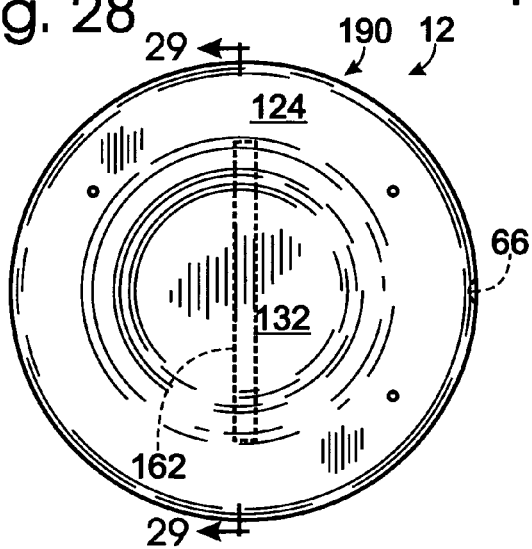
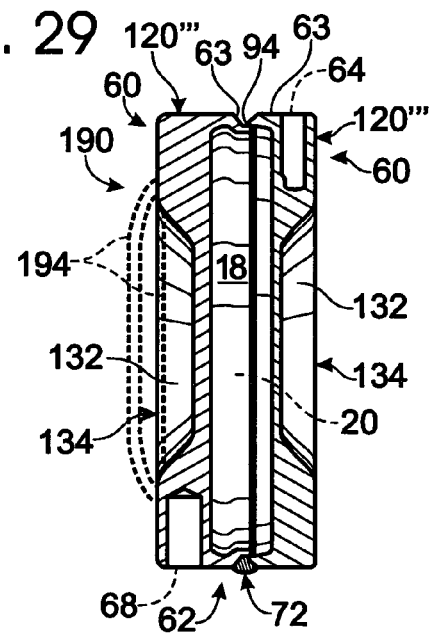
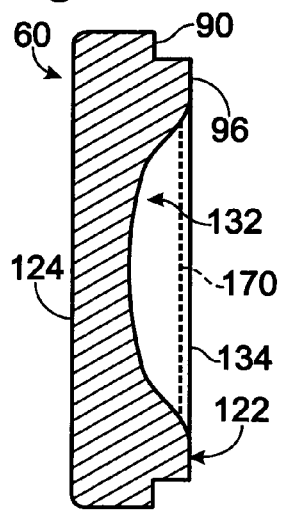
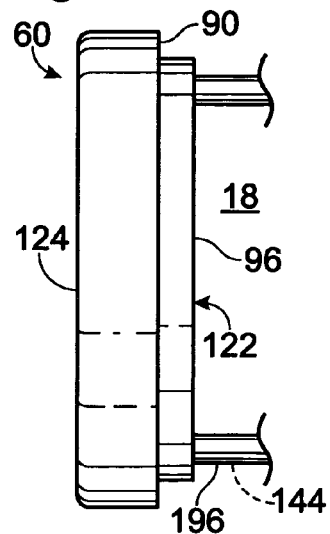
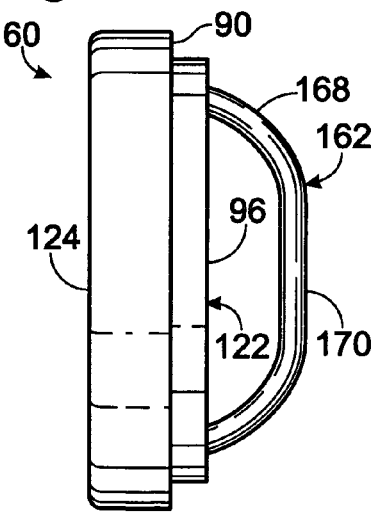

HYDROGEN PURIFICATION MEMBRANES, COMPONENTS AND FUEL PROCESSING SYSTEMS CONTAINING THE SAME

RELATED APPLICATIONS

This application is a continuation of and claims priority to U.S. patent application Ser. No. 10/728,473, which was filed on Dec. 5, 2003, issued on Nov. 30, 2004 as U.S. Pat. No. 6,824,593, and which is a continuation of U.S. patent application Ser. No. 10/430,110, now U.S. Pat. No. 6,723,156, which was filed on May 5, 2003, and which is a continuation of U.S. patent application Ser. No. 10/371,597, now U.S. Pat. No. 6,632,270, which was filed on Feb. 20, 2003, and which is a continuation of and claims priority to similarly entitled U.S. patent application Ser. No. 10/027,509, now U.S. Pat. No. 6,537,352, which was filed on Dec. 19, 2001. U.S. patent application Ser. No. 10/027,509 is a continuation-in-part of and claims priority to U.S. patent application Ser. Nos. 10/003,164 filed Nov. 14, 2001 now U.S. Pat. No. 6,458,189, Ser. No. 09/839,997 filed Apr. 20, 2001 now U.S. Pat. No. 6,783,741, Ser. No. 09/618,866 filed Jul. 19, 2000 now U.S. Pat. No. 6,547,858, and Ser. No. 09/967,172 Sep. 27, 2001 now U.S. Pat. No. 6,494,937, the complete disclosures of which are hereby incorporated by reference for all purposes. U.S. patent application Ser. No. 10/003,164, now U.S. Pat. No. 6,458,189, was filed on Nov. 14, 2001 and is a continuation of U.S. patent application Ser. No. 09/812,499, now U.S. Pat. No. 6,319,306, which was filed on Mar. 19, 2001. U.S. patent application Ser. No. 09/839,997, was filed on Apr. 20, 2001 and is a continuation of U.S. patent application Ser. No. 09/291,447, now U.S. Pat. No. 6,221,117, which was filed on Apr. 13, 1999 and which is a continuation-in-part application of U.S. patent application Ser. No. 08/951,091, now U.S. Pat. No. 5,997,594, which was filed on Oct. 15, 1997, and which is a continuation-in-part application of U.S. patent application Ser. No. 08/741,057, now U.S. Pat. No. 5,861,137, which was filed on Oct. 30, 1996. U.S. patent application Ser. No. 09/618,866, now U.S. Pat. No. 6,547,858, was filed on Jul. 19, 2000 and is a continuation-in-part application of U.S. patent application Ser. No. 09/274,154, now U.S. Pat. No. 6,152,995, which was filed on Mar. 22, 1999. U.S. patent application Ser. No. 09/967,172, now U.S. Pat. No. 6,494,937, was filed on Sep. 27, 2001. The complete disclosures of the above-identified patent applications are hereby incorporated by reference for all purposes.

FIELD OF THE DISCLOSURE

The present invention is related generally to the purification of hydrogen gas, and more specifically to hydrogen purification membranes, devices, and fuel processing and fuel cell systems containing the same.

BACKGROUND OF THE DISCLOSURE

Purified hydrogen is used in the manufacture of many products including metals, edible fats and oils, and semiconductors and microelectronics. Purified hydrogen is also an important fuel source for many energy conversion devices. For example, fuel cells use purified hydrogen and an oxidant to produce an electrical potential. Various processes and devices may be used to produce the hydrogen gas that is consumed by the fuel cells. However, many hydrogen-production processes produce an impure hydrogen stream, which may also be referred to as a mixed gas stream that contains hydrogen gas. Prior to delivering this stream to a fuel cell, a stack of fuel cells, or another hydrogen-consuming device, the mixed gas stream may be purified, such as to remove undesirable impurities.

SUMMARY OF THE DISCLOSURE

The present invention is directed to hydrogen purification membranes, hydrogen purification devices, and fuel processing and fuel cell systems that include hydrogen purification devices. The hydrogen purification membranes include a metal membrane, which is at least substantially comprised of palladium or a palladium alloy. In some embodiments, the membranes contain trace amounts of carbon, silicon, and/or oxygen. In some embodiments, the membranes form part of a hydrogen purification device that includes an enclosure containing a separation assembly, which is adapted to receive a mixed gas stream containing hydrogen gas and to produce a stream that contains pure or at least substantially pure hydrogen gas therefrom. In some embodiments, the enclosure includes a pair of end plates and a shell extending generally between the end plates. In some embodiments, the membrane(s) and/or purification device forms a portion of a fuel processor, and in some embodiments, the membrane(s) and/or purification device forms a portion of a fuel processing or fuel cell system.

Many other features of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 9 is a schematic cross-sectional view of a hydrogen purification device having a planar separation membrane.

FIG. 10 is an isometric view of an illustrative end plate for a hydrogen purification device according to the present invention.

FIG. 11 is a schematic cross-sectional view of a hydrogen purification device having a tubular separation membrane.

FIG. 12 is a schematic cross-sectional view of another hydrogen purification device having a tubular separation membrane.

FIG. 13 is a schematic cross-sectional view of another enclosure for a hydrogen purification device constructed according to the present invention.

FIG. 14 is a schematic cross-sectional view of another enclosure for a hydrogen purification device constructed according to the present invention.

FIG. 15 is a fragmentary cross-sectional detail showing another suitable interface between components of an enclosure for a purification device according to the present invention.

FIG. 16 is a fragmentary cross-sectional detail showing another suitable interface between components of an enclosure for a purification device according to the present invention.

FIG. 17 is a fragmentary cross-sectional detail showing another suitable interface between components of an enclosure for a purification device according to the present invention.

FIG. 18 is a fragmentary cross-sectional detail showing another suitable interface between components of an enclosure for a purification device according to the present invention.

FIG. 19 is a top plan view of an end plate for a hydrogen purification device constructed according to the present invention.

FIG. 20 is a cross-sectional view of the end plate of FIG. 19.

FIG. 27 is a partial cross-sectional side elevation view of an enclosure for a hydrogen purification device constructed with a pair of the end plates shown in FIGS. 25–26.

FIG. 28 is an isometric view of another hydrogen purification device constructed according to the present invention.

FIG. 29 is a cross-sectional view of the device of FIG. 28.

FIG. 30 is a side elevation view of another end plate for a hydrogen purification device constructed according to the present invention.

FIG. 31 is a side elevation view of another end plate for a hydrogen purification device constructed according to the present invention.

FIG. 32 is a side elevation view of another end plate for a hydrogen purification device constructed according to the present invention.

DETAILED DESCRIPTION AND BEST MODE OF THE DISCLOSURE

Figure 1:
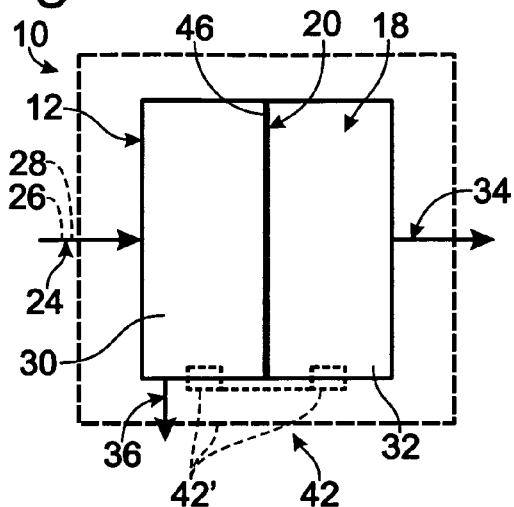
FIG. 1 is a schematic view of a hydrogen purification device.

A hydrogen purification device is schematically illustrated in FIG. 1 and generally indicated at 10. Device 10 includes a body, or enclosure, 12 that defines an internal compartment 18 in which a separation assembly 20 is positioned. A mixed gas stream 24 containing hydrogen gas 26 and other gases 28 is delivered to the internal compartment. More specifically, the mixed gas stream is delivered to a mixed gas region 30 of the internal compartment and into contact with separation assembly 20. Separation assembly 20 includes any suitable structure adapted to receive the mixed gas stream and to produce therefrom a permeate, or hydrogen-rich, stream. Stream 34 typically will contain pure or at least substantially pure hydrogen gas. However, it within the scope of the disclosure that stream 34 may at least initially also include a carrier, or sweep, gas component.

In the illustrated embodiment, the portion of the mixed gas stream that passes through the separation assembly enters a permeate region 32 of the internal compartment. This portion of the mixed gas stream forms hydrogen-rich stream 34, and the portion of the mixed gas stream that does not pass through the separation assembly forms a byproduct stream 36, which contains at least a substantial portion of the other gases. In some embodiments, byproduct stream 36 may contain a portion of the hydrogen gas present in the mixed gas stream. It is also within the scope of the disclosure that the separation assembly is adapted to trap or otherwise retain at least a substantial portion of the other gases, which will be removed as a byproduct stream as the assembly is replaced, regenerated or otherwise recharged. In FIG. 1, streams 24–28 are meant to schematically represent that each of streams 24–28 may include more that one actual stream flowing into or out of device 10. For example, device 10 may receive plural feed streams 24, a single stream 24 that is divided into plural streams prior to contacting separation assembly 20, or simply a single stream that is delivered into compartment 18.

Device 10 is typically operated at elevated temperatures and/or pressures. For example, device 10 may be operated at (selected) temperatures in the range of ambient temperatures up to 700° C. or more. In many embodiments, the selected temperature will be in the range of 200° C. and 500° C., in other embodiments, the selected temperature will be in the range of 250° C. and 400° C. and in still other embodiments, the selected temperature will be 400° C.±either 25° C., 50° C. or 75° C. Device 10 may be operated at (selected) pressures in the range of approximately 50 psi and 1000 psi or more. In many embodiments, the selected pressure will be in the range of 50 psi and 250 or 500 psi, in other embodiments, the selected pressure will be less than 300 psi or less than 250 psi, and in still other embodiments, the selected pressure will be 175 psi±either 25 psi, 50 psi or 75 psi. As a result, the enclosure must be sufficiently well sealed to achieve and withstand the operating pressure.

It should be understood that as used herein with reference to operating parameters like temperature or pressure, the term "selected" refers to defined or predetermined threshold values or ranges of values, with device 10 and any associated components being configured to operate at or within these selected values. For further illustration, a selected operating temperature may be an operating temperature above or below a specific temperature, within a specific range of temperatures, or within a defined tolerance from a specific temperature, such as within 5%, 10%, etc. of a specific temperature.

In embodiments of the hydrogen purification device in which the device is operated at an elevated operating temperature, heat needs to be applied to, or generated within, the device to raise the temperature of the device to the selected operating temperature. For example, this heat may be provided by any suitable heating assembly 42. Illustrative examples of heating assembly 42 have been schematically illustrated in FIG. 1. It should be understood that assembly 42 may take any suitable form, including mixed gas stream 24 itself. Illustrative examples of other suitable heating assemblies include one or more of a resistance heater, a burner or other combustion region that produces a heated exhaust stream, heat exchange with a heated fluid stream other than mixed gas stream 24, etc. When a burner or other combustion chamber is used, a fuel stream is consumed and byproduct stream 36 may form all or a portion of this fuel stream. At 42' in FIG. 1, schematic representations have been made to illustrate that the heating assembly may deliver the heated fluid stream external device 10, such as within a jacket that surrounds or at least partially surrounds the enclosure, by a stream that extends into the enclosure or through passages in the enclosure, or by conduction, such as with an electric resistance heater or other device that radiates or conducts electrically generated heat.

Figure 2:
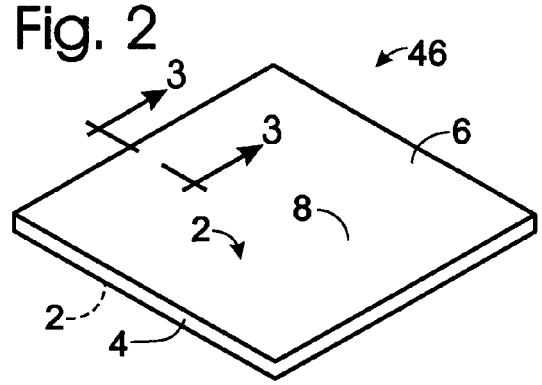
FIG. 2 is an isometric view of a hydrogen-permeable metal membrane.

A suitable structure for separation assembly 20 is one or more hydrogen-permeable and/or hydrogen-selective membranes 46, such as somewhat schematically illustrated in FIG. 2. As shown, membrane 46 includes a pair of generally opposed surfaces 2 and an edge 4 joining the perimeters of the surfaces. Each surface 2 includes an outer edge region 6 that surrounds a central region 8. Membrane 46 is typically roll formed and, as shown, has a generally rectangular, sheet-like configuration with a constant thickness. It should be understood that membrane 46 may have any geometric or irregular shape, such as by cutting the formed membrane into a desired shape based on user preferences or application requirements. It is within the scope of the disclosure that any suitable method for forming membrane 46 may be used. For example, membrane 46 may also be formed from such processes as electro deposition, sputtering or vapor deposition.

Figure 3:
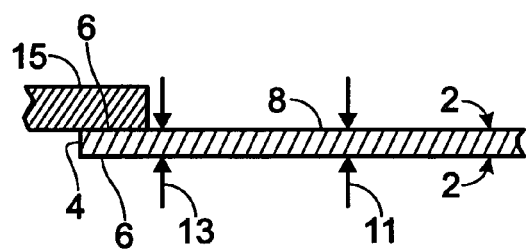
FIG. 3 is a cross-sectional detail of the membrane of FIG. 2 with an attached frame.

In FIG. 3, membrane 46 is shown in cross-section, and it can be seen that the thickness 11 of the membrane measured between the central regions is the same as the thickness 13 measured between the edge regions. In the figures, it should be understood that the thicknesses of the membranes and subsequently described absorbent media and frame have been exaggerated for purposes of illustration. Typically, hydrogen-permeable membranes have thicknesses less than approximately 50 microns, although the disclosed etching process may be used with thicker membranes.

Membrane 46 may be formed of any hydrogen-permeable material suitable for use in the operating environment and parameters in which purification device 10 is operated. Examples of suitable materials for membranes 46 include palladium and palladium alloys, and especially thin films of such metals and metal alloys. Palladium alloys have proven particularly effective, especially palladium with 35 wt % to 45 wt % copper. More specific examples of a palladium alloy that have proven effective include palladium-copper alloys containing 40 wt % (+/−0.25 or 0.5 wt %) copper, although other alloys and percentages are within the scope of the disclosure. Membranes 46 are typically formed from a thin foil that is approximately 0.001 inches thick. Accordingly, it should be understood that the thicknesses of the membranes illustrated herein have been exaggerated for purposes of illustration. It is within the scope of the present disclosure, however, that the membranes may be formed from hydrogen-permeable and/or hydrogen-selective materials, including metals and metal alloys other than those discussed above as well as non-metallic materials and compositions.

Metal membranes according to the present disclosure, and especially palladium and palladium alloy membranes, typically will also include relatively small amounts of at least one of carbon, silicon and oxygen, typically ranging from a few parts per million (ppm) to several hundred or more parts per million. For example, carbon may be introduced to the membrane either intentionally or unintentionally, such as from the raw materials from which the membranes are formed and/or through the handling and formation process. Because many lubricants are carbon-based, the machinery used in the formation and processing of the membranes may introduce carbon to the material from which the membranes are formed. Similarly, carbon-containing oils may be transferred to the material by direct or indirect contact with a user's body. Preferably, membranes constructed according to the present disclosure include less than 250 ppm carbon, and more preferably less than 150, 100 or 50 ppm carbon. Nonetheless, the membranes will typically still contain some carbon content, such as at least 5 or 10 ppm carbon. Therefore, it is within the scope of the disclosure that the membranes will contain carbon concentrations within the above ranges, such as approximately 5–150 or 10–150 ppm, 5–100 or 10–100 ppm, or 5–50 or 10–50 ppm carbon.

It is further within the scope of the disclosure that the membranes may include trace amounts of silicon and/or oxygen. For example, oxygen may be present in the Pd40Cu (or other alloy or metal) material in concentrations within the range of 5–200 ppm, including ranges of 5–100, 10–100, 5–50 and 10–50 ppm. Additionally or alternatively, silicon may be present in the material in concentrations in the range of 5–100 ppm, including ranges of 5–10 and 10–50 ppm.

In experiments, reducing the concentration of carbon in the membranes results in an increase in hydrogen flux, compared to a similar membrane that is used in similar operating conditions but which contains a greater concentration of carbon. Similarly, it is expected that increasing the oxygen and/or silicon concentrations will detrimentally affect the mechanical properties of the membrane. The following table demonstrates the correlation between high hydrogen permeability (represented as hydrogen flux through a 25 micron thick membrane at 100 psig hydrogen, 400 degrees Celsius) and low carbon content.

TABLE 1

Hydrogen flux through 25 micron thick Pd-40Cu membranes containing trace amounts of carbon, oxygen and silicon at 400° C. and 100 psig hydrogen

| Hydrogen Flux | Concentration (ppm) | | |
|---|---|---|---|
| (std ft$^3$/ft$^2$ · hr) | Carbon | Oxygen | Silicon |
| 130 | 40 | 25 | 10 |
| 125 | 56 | 29 | 39 |
| 115 | 146 | 25 | 15 |
| 56 | 219 | 25 | 27 |

It is within the scope of the disclosure that the membranes may have a variety of thicknesses, including thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,221,117 and 6,319,306, the complete disclosures of which are hereby incorporated by reference for all purposes. The above-described "trace" components (carbon, oxygen and/or silicon) may be described as being secondary components of the material from which the membranes are formed, with palladium or a palladium alloy being referred to as the primary component. In practice, it is within the scope of the disclosure that these trace components may be alloyed with the palladium or palladium alloy material from which the membranes are formed or otherwise distributed or present within the membranes.

As discussed, membrane 46 may be formed of a hydrogen-permeable metal or metal alloy, such as palladium or a palladium alloy, including a palladium alloy that is essentially comprised of 60 wt % palladium and 40 wt % copper. Because palladium and palladium alloys are expensive, the thickness of the membrane should be minimal; i.e., as thin as possible without introducing an excessive number of holes in the membrane if it is desirable to reduce the expense of the membranes. Holes in the membrane are not desired because holes allow all gaseous components, including impurities, to pass through the membrane, thereby counteracting the hydrogen-selectivity of the membrane.

An example of a method for reducing the thickness of a hydrogen-permeable membrane is to roll form the membrane to be very thin, such as with thicknesses of less than approximately 50 microns, and more commonly with thicknesses of approximately 25 microns. The flux through a hydrogen-permeable metal membrane is inversely proportional to the membrane thickness. Therefore, by decreasing the thickness of the membrane, it is expected that the flux through the membrane will increase, and vice versa. In Table 2, below, the expected flux of hydrogen through various thicknesses of Pd-40Cu membranes is shown.

TABLE 2

Expected hydrogen flux through Pd-40Cu membranes at 400° C. and 100 psig hydrogen feed, permeate hydrogen at ambient pressure.

| Membrane Thickness | Expected Hydrogen Flux |
|---|---|
| 25 micron | 60 mL/cm$^2$ · min |
| 17 micron | 88 mL/cm$^2$ · min |
| 15 micron | 100 mL/cm$^2$ · min |

Besides the increase in flux obtained by decreasing the thickness of the membrane, the cost to obtain the membrane also increases as the membrane's thickness is reduced. Also, as the thickness of a membrane decreases, the membrane becomes more fragile and difficult to handle without damaging.

Through the etching process, or method, of the present disclosure, discussed in more detail subsequently, the thickness of a portion of the membrane, such as central region 8, may be selectively reduced, while leaving the remaining portion of the membrane, such as edge region 6, at its original thickness. Therefore, greater flux is obtained in the thinner etched region, while leaving a thicker, more durable edge region that bounds the central region and thereby provides support to the membrane.

Figure 4:
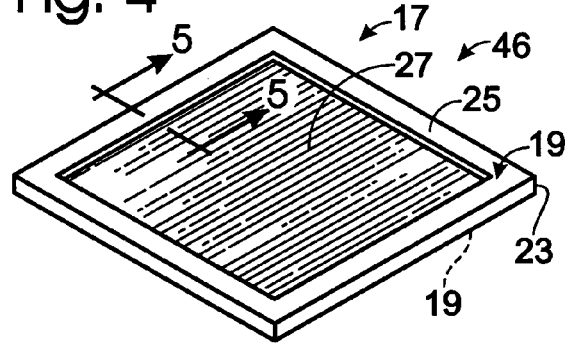
FIG. 4 is an isometric view of the membrane of FIG. 2 after being etched according to a method of the present invention.
Figure 5:
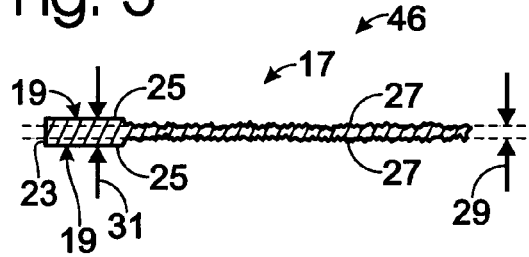
FIG. 5 is a cross-sectional detail of the membrane of FIG. 4.

For example, an etched membrane 46 prepared according to an etching method of the present disclosure is shown in FIG. 4 and illustrated generally at 17. Similar to the other membranes 46 described and illustrated herein, membrane 17 includes a pair of generally opposed surfaces 19 and an edge 23 joining the surfaces. Each surface 19 includes an outer edge region 25 that surrounds a central region 27. Membrane 17 is formed from any of the above-discussed hydrogen-permeable metal materials, and may have any of the above-discussed configurations and shapes. The etching process works effectively on work-hardened, or non-annealed membranes. Alternatively, the membrane may be annealed prior to the etching process. Unlike an unetched embodiment of membrane 46, however, the thickness of membrane 17 measured between central regions 27 is less than the thickness 31 measured between the edge regions, as schematically illustrated in FIG. 5. Therefore, the hydrogen flux through the central region will be greater than that through the edge region, as expected from the above discussion of the inversely proportional relationship between membrane thickness and hydrogen flux.

However, an unexpected benefit of chemically etching the membrane, as disclosed herein, is that the hydrogen flux through the etched region exceeds that expected or measured through roll-formed membranes of equal thickness. As shown below in Table 3, the method of the present disclosure yields a hydrogen-permeable metal membrane with significantly greater flux than unetched membranes of similar thicknesses.

TABLE 3

Hydrogen flux through etched and unetched Pd-40Cu membranes at 400° C. and 100 psig hydrogen feed, permeate hydrogen at ambient pressure. Aqua regia etchant.

| Etching Time | Membrane Thickness | Observed Hydrogen Flux | Expected Hydrogen Flux |
|---|---|---|---|
| None | 25 micron | 60 mL/cm$^2$ · min | 60 mL/cm$^2$ · min |
| 2.0 mins | 17 micron | 94 mL/cm$^2$ · min | 88 mL/cm$^2$ · min |
| 2.5 mins | 15 micron | 122 mL/cm$^2$ · min | 100 mL/cm$^2$ · min |

As the above table demonstrates, the invented method produces hydrogen-permeable metal membranes that permit increased hydrogen throughput compared to unetched membranes of similar thickness by increasing the roughness and surface area of the etched region of the membrane. Perhaps more importantly, this increase in throughput is achieved without sacrificing selectivity for hydrogen or the purity of the harvested hydrogen gas, which is passed through the membrane.

Increasing the surface roughness of the membrane is especially beneficial as the thickness of the membrane is reduced to less than 25 microns, especially less than 20 microns. As the membrane thickness is reduced, the surface reaction rates governing the transport of gaseous molecular hydrogen onto the surface of the metal membrane become more important to the overall permeation rate of hydrogen across the membrane. In extreme cases in which the membrane is quite thin (less than approximately 15 microns) the surface reaction rates are significant in governing the overall permeation rate of hydrogen across the membrane. Therefore, increasing the surface area increases the rate of hydrogen permeation. This contrasts with relatively thick membranes (greater than 25 microns) in which the surface reaction rates are less important and the overall permeation rate of hydrogen across the membrane is governed by the bulk diffusion of hydrogen through the membrane.

Thus the etching process results in an overall reduction in the thickness of the membrane and an increase in the surface roughness (and surface area) of the membrane. These improvements yield an increase in hydrogen flux and reduce the amount of material (e.g., palladium alloy) that is required, while still maintaining the membrane's selectivity for hydrogen.

In the invented etching process, an etchant is used to selectively reduce the thickness of the membrane. When the etchant removes, or etches, material from the surface of a membrane, the etchant also increases the surface roughness and surface area of the membrane in the etched region.

Examples of suitable etchants include oxidizing agents and acids. An example of a suitable oxidizing acid is nitric acid. Other suitable examples include combinations of nitric acid with other acids, such as aqua regia (a mixture of 25 vol % concentrated nitric acid and 75 vol % concentrated hydrochloric acid). Another specific example of an etchant well-suited to use in the present disclosure is a mixture comprising 67 wt % concentrated nitric acid and 33 wt % aqueous solution of poly(vinyl alcohol). A suitable method of preparing the aqueous solution of poly(vinyl alcohol) is to dissolve 4 wt % of poly(vinyl alcohol) (average molecular weight 124,000 to 186,000; 87% to 89% hydrolyzed; Aldrich Chemical Company, Milwaukee, Wis.) in de-ionized water. The disclosed examples of etchants are for illustrative purposes, and should not be construed to be limiting examples. For example, the relative percentage of acid may be increased or decreased to make the etchant respectively more or less reactive, as desired.

In a first method of the present disclosure, a selected etchant is applied to at least one of the surfaces of the membrane. Once applied, the etchant removes material from the surface of the membrane, thereby increasing its surface roughness and reducing the thickness of the membrane in the etched region. After a defined time period, the etchant is removed. The etching process disclosed herein typically is conducted under ambient conditions (temperature and pressure), although it should be understood that the process could be conducted at elevated or reduced temperatures and pressures as well.

The etching process is limited either by the time during which the membrane is exposed to the etchant, or by the reactive elements of the etchant. In the latter scenario, it should be understood that the etching reaction is self-limiting, in that the reaction will reach an equilibrium state in which the concentration of dissolved membrane in the etchant solution remains relatively constant. Regardless of the limiting factor in the process, it is important to apply a volume and concentration of etchant for a time period that will not result in the etchant creating substantial holes in, or completely dissolving, the membrane. Preferably, no holes are created in the membrane during the etching process.

When applying the etchant to a surface of membrane 46, such as to produce membrane 17, it is desirable to control the region of the surface over which the etchant extends. It is also desirable to maintain an even distribution of etchant over this application region. If the application region of the etchant is not controlled, then the etchant may remove material from other non-desired regions of the membrane, such as the edge region, or may damage materials joined to the membrane, such as an attached frame. If an even distribution of etchant is not maintained, areas of increased etchant may have too much material removed, resulting in holes in the membrane. Similarly, other areas may not have enough material removed, resulting in less than the desired reduction in thickness and increase in flux.

To control the distribution of etchant within the desired application region, an absorbent medium is placed on the membrane and defines an application region to be etched. For example, in FIGS. 6 and 7, the absorbent medium is generally indicated at 33 and covers application region 35 of surface 2. As shown, medium 33 is sized to cover only a central portion of surface 2, however, it should be understood that medium 33 may be selectively sized to define application regions of any desired size and shape, up to the complete expanse of surface 2. Typically, however, only a central portion of each surface is treated, leaving an unetched perimeter of greater thickness than the central region. This unetched region, because of its greater thickness, provides strength and support to membrane 46 while still contributing to the hydrogen permeability of the membrane.

Besides being selected to absorb the particular etchant without adversely reacting to the etchant or metal membrane, it is preferable that medium 33 has a substantially uniform absorbency and diffusivity along its length. When medium 33 absorbs and distributes the etchant uniformly along its length, it distributes the etchant evenly across the application region, thereby removing substantially the same amount of material across the entire application region. The benefit of this is not only that some etchant will contact, and thereby remove material from the entire application region, but also that the etchant will be uniformly distributed across the application region. Therefore, medium 33 prevents too much etchant being localized in an area, which would result in too much material being removed. In a region where too much etchant is applied, the excess etchant is drawn away from that region to other areas of the medium where less etchant is applied. Similarly, in a region where too little etchant is applied, the medium draws etchant to that region to produce an even distribution across the medium, and thereby across the application region.

As a result, the reduction of thickness in membrane 46 will be relatively uniform across the application region, and perhaps, more importantly, will be reproducible regardless of the exact rate and position at which the etchant is applied. Therefore, with the same size and type of medium 33 and the same volume of etchant 37, the resulting reduction in thickness should be reproducible for membranes of the same composition. Of course, it should be understood that etching removes material from the surface of the membrane, thereby resulting in an uneven, rough surface with increased surface area over an unetched surface. Therefore, the exact surface topography will not be seen. However, the average thickness measured across a section of the membrane should be reproducible. For example, in FIG. 5, the average thickness between central regions 27 is indicated with dashed lines.

Figure 6:
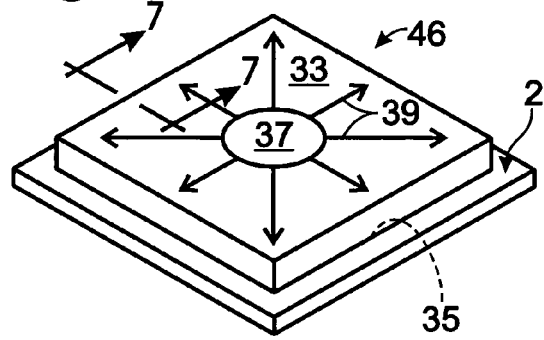
FIG. 6 is an isometric view of the membrane of FIG. 2 with an absorbent medium placed over an application region of one of the membrane's surfaces.

Because medium 33 essentially defines the bounds of application region 35, medium 33 should be sized prior to placing it upon the surface to be etched. After placing the medium in the desired position on one of the membrane's surfaces, such as surface 2 shown in FIG. 6, a volume of etchant is applied. In FIG. 6, the applied volume of etchant is schematically illustrated at 37, with arrows 39 illustrating the absorption and distribution of etchant 37 across medium 33.

The applied volume of etchant should be no more than a saturation volume of etchant. An absorbent medium can only absorb up to a defined volume of a particular etchant per unit of medium 33 before reaching the saturation point of the medium. Therefore, it is important not to exceed this saturation point. Too much applied etchant will result in unabsorbed etchant pooling on or adjacent to the medium, such as on the upper surface of medium 33 or around the edges of the medium. When excess etchant contacts the surface, it is likely to result in holes in the membrane because more than the desired amount of material is removed. As discussed, if these holes are numerous or large enough, they will render the membrane unusable for hydrogen purification applications, with any holes lowering the purity of the hydrogen passing through the membrane.

Therefore, to prevent too much etchant from being applied, the volume of etchant applied may approach, but should not exceed, the saturation volume of the etchant.

An example of a suitable absorbent medium is a cellulosic material, such as absorbent paper products. A particular example of an absorbent medium that has proven effective are single-fold paper towels manufactured by the Kimberly Clark company. When a three inch by three inch area of such a towel is used, approximately 2.5 mL of etchant may be applied without exceeding the saturation volume of that area. The capillary action of the cellulosic towel both absorbs the applied etchant and distributes the etchant throughout the towel. Other paper and cellulosic materials may be used as well, as long as they meet the criteria defined herein. Absorbent, diffusive materials other than cellulosic materials may be used as well.

After applying the etchant to medium 33, the etchant is allowed to remove material from the application region for a determined time period. This period is best determined through experimentation and will vary depending on such factors as the composition, thickness and desired thickness of the membrane, the absorbent medium being used, the composition and concentration of etchant, and the temperature at which the etching process is conducted. After this time period has passed, the medium is removed from the membrane, and the application, or treatment area is rinsed with water to remove any remaining etchant. After rinsing, the method may be repeated to etch another surface of the membrane.

Instead of a single etching step on each surface of the membrane, a variation of the above method includes plural etching steps for each surface to be etched. In the first step, a more reactive, or vigorous etchant is used to remove a substantial portion of the material to be removed. In the second step, a less reactive etchant is used to provide a more controlled, even etch across the application region.

As an illustrative example, Pd-40Cu alloy foil was etched first with concentrated nitric acid for 20–30 seconds using the absorbent medium technique described above. After removing the medium and rinsing and drying the membrane, a second etch with a mixture of 20 vol % neat ethylene glycol and the balance concentrated nitric acid was performed for between 1 and 4 minutes. Subsequent etching steps were performed with the glycol mixture to continue to gradually reduce the thickness of the membrane in the application region. Results of etching Pd-40Cu foil using this method are given in the table below.

TABLE 4

Results of etching Pd-40Cu membrane with concentrated nitric acid for 30 seconds followed by subsequent etches with concentrated nitric acid diluted with 20% vol ethylene glycol.

| Etching Solution | Etching Time | Observations |
| --- | --- | --- |
| None (Virgin Pd-40Cu Foil) | N/A | Measures 0.0013 inches thick |
| 1) Conc. Nitric Acid<br>2) 20 vol % ethylene glycol/HNO$_3$ | 1) 30 seconds<br>2) 1.5 minutes | Measures 0.0008 to 0.0009 inches thick, no pin holes |
| 1) Conc. Nitric Acid<br>2) 20 vol % ethylene glycol/HNO$_3$<br>3) 20 vol % ethylene glycol/HNO$_3$ | 1) 30 seconds<br>2) 1.5 minutes<br>3) 1.5 minutes | Measures 0.0005 to 0.0006 inches thick, no pin holes |
| 1) Conc. Nitric Acid<br>2) 20 vol % ethylene glycol/HNO$_3$ | 1) 30 seconds<br>2) 3 minutes | Measures 0.0005 inches thick, no pin holes in membrane |
| 1) Conc. Nitric Acid<br>2) 20 vol % ethylene glycol/HNO$_3$ | 1) 1 minute<br>2) 3 minutes | Multiple pin holes in membrane |

Other than confining the etching solution to a desired application region, another benefit of using an absorbent medium to control the placement and distribution of the etchant is that the quantity of etchant (or etching solution) that may be applied without oversaturating the medium is limited. Thus, the etching reaction may be self-limiting, depending on the choice of and composition of etchant. For instance, varying the etching time using 33.3 wt % PVA solution/66.7 wt % concentrated $HNO_3$ yielded the results shown in the following table. These results indicate that the volume of etchant that is applied at one time may limit the depth of etching, so long as the etchant is not so reactive or applied in sufficient quantity to completely dissolve the application region.

TABLE 5

Results of etching Pd-40Cu membrane with a solution of 33.3 wt % PVA solution/66.7 wt % concentrated nitric acid.

| Etching Time | Observations |
| --- | --- |
| 0 | Measures 0.0013 inches thick |
| 3 minutes | Measures 0.0011 inches thick |
| 4 minutes | Measures 0.0011 inches thick |
| 5 minutes | Measures 0.0011 inches thick |
| 6 minutes | Measures 0.0011 inches thick |
| 3 minutes, rinse, 3 minutes | Measures 0.0008 to 0.0009 inches thick |
| 3 minutes, rinse, 3 minutes, rinse, 3 minutes | Measures 0.0006 inches thick, multiple pin holes |

In a further variation of the etching method, a suitable mask may be applied to the membrane to define the boundaries of the region to be etched. For example, in FIG. 6, instead of using absorbent medium 33 to define application region 35, a non-absorbent mask could be applied around edge region 25. Because this mask does not absorb the etchant, it confines the etchant to an application region bounded by the mask. Following etching, the mask is removed. The mask may be applied as a liquid or it may be a film with an adhesive to bond the film to the membrane.

Figure 8:
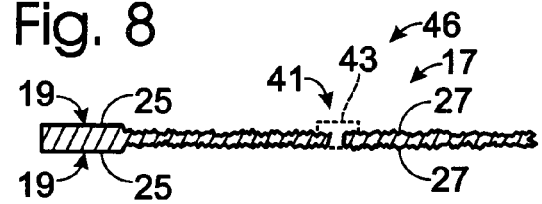
FIG. 8 is the detail of FIG. 4 with a hole indicated generally at 41 and the repaired hole indicated in dashed lines at 43.

If the chemical etching process is not properly controlled, tiny holes will appear in the membrane. For example, in FIG. 8 membrane 17 is shown with a hole 41 in its central region 27. Typically, the holes will be very small, however, the size of a particular hole will depend on the concentration and quantity of etchant applied to that region, as well as the time during which the etchant was allowed to etch material from the membrane. Holes, such as hole 41, reduce the purity of the hydrogen gas harvested through the membrane, as well as the selectivity of the membrane for hydrogen. The probability of holes forming in the membrane during the etching process increases as the thickness of the membrane is reduced. Therefore, there is often a need to repair any holes formed during the etching process.

Figure 7:
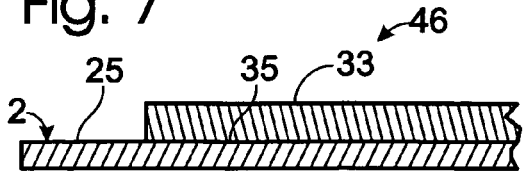
FIG. 7 is a cross-sectional detail of the membrane of FIG. 6.

One method for detecting any such holes is to utilize a light source to identify holes in the membrane. By shining a light on one side of the membrane, holes are detected where light shines through the other side of the membrane. The detected holes may then be repaired by spot electroplating, such as by using a Hunter Micro-Metallizer Pen available from Hunter Products, Inc., Bridgewater, N.J. In FIG. 7, a patch, or plug, 43 is generally indicated in dashed lines and shown repairing hole 41. Any other suitable method may be used for repairing tiny holes resulting from etching the membrane.

The repairing step of the invented etching process also may be performed using a photolithographic method. In this case a light-sensitive, electrically insulating mask is applied to one surface of the membrane, and then the membrane is irradiated with light of the appropriate wavelength(s) from the opposite side. Any tiny holes that might be present in the membrane will allow the light to pass through the membrane and be absorbed by the light-sensitive mask. Next, the mask is washed to remove irradiated regions of the mask and thereby reveal the bare metal of the membrane. Because only the irradiated regions of the mask are removed, the remaining mask serves as an electrical insulator over the surface of the membrane. Then, all of the spots where the mask has been removed are electroplated or electrolessplated at the same time.

Because the patch, or plug, represents only a minute percentage of the surface area of the membrane, the patch may be formed from a material that is not hydrogen-permeable without the flux through the membrane being noticeably affected. Of course, a hydrogen-permeable and selective patch is preferred. Suitable metals for electroplating to fill or close tiny holes in the palladium-alloy membranes include copper, silver, gold, nickel, palladium, chromium, rhodium, and platinum. Volatile metals such as zinc, mercury, lead, bismuth and cadmium should be avoided. Furthermore, it is preferable that metal applied by plating be relatively free of phosphorous, carbon, sulfur and nitrogen, since these heteroatoms could contaminate large areas of the membrane and are generally known to reduce the permeability of palladium alloys to hydrogen.

In use, membrane 46 provides a mechanism for removing hydrogen from mixtures of gases because it selectively allows hydrogen to permeate through the membrane. The flowrate, or flux, of hydrogen through membrane 46 typically is accelerated by providing a pressure differential between a mixed gaseous mixture on one side of the membrane, and the side of the membrane to which hydrogen migrates, with the mixture side of the membrane being at a higher pressure than the other side.

Because of their extremely thin construction, membranes 46 typically are supported by at least one of a support or frame. Frames, or frame members, may be used to support the membranes from the perimeter regions of the membranes. Supports, or support assemblies, typically support the membranes by extending across and in contact with at least a substantial portion of one or more of the membrane surfaces, such as surfaces 2 or 19. By referring briefly back to FIG. 3, an illustrative example of a frame, or frame member, is shown and generally indicated at 15. Frame 15 is secured to a membrane 46, such as around a portion or the entire edge region 6. Frame 15 is formed from a more durable material than the membrane and provides a support structure for the membrane. Frame 15 may be secured to one or both surfaces of the membrane. It should be understood that the invented membrane may be formed without frame 15. In another variation, frame 15 may take the form of a compressible gasket that is secured to the membrane, such as with an adhesive or other suitable structure or process. Compressible gaskets are used to form gas-tight seals around and/or between the membranes.

In FIG. 9, illustrative examples of suitable configurations for membranes 46 are shown. As shown, membrane 46 includes a mixed-gas surface 48 which is oriented for contact by mixed gas stream 24, and a permeate surface 50, which is generally opposed to surface 48. Also shown at 52 are schematic representations of mounts, which may be any suitable structure for supporting and/or positioning the membranes or other separation assemblies within compartment 18. Mounts 52 may include or be at least partially formed from frames 15. Alternatively, mounts 52 may be adapted to be coupled to frame 15 to selectively position the membrane within device 10. The patent and patent applications incorporated immediately above also disclose illustrative examples of suitable mounts 52. At 46', membrane 46 is illustrated as a foil or film. At 46", the membrane is supported by an underlying support 54, such as a mesh or expanded metal screen or a ceramic or other porous material. At 46''', the membrane is coated or formed onto or otherwise bonded to a porous member 56. It should be understood that the membrane configurations discussed above have been illustrated schematically in FIG. 9 and are not intended to represent every possible configuration within the scope of the disclosure.

Supports 54, frames 15 and mounts 52 should be thermally and chemically stable under the operating conditions of device 10, and support 54 should be sufficiently porous or contain sufficient voids to allow hydrogen that permeates membrane 46 to pass substantially unimpeded through the support layer. Examples of support layer materials include metal, carbon, and ceramic foam, porous and microporous ceramics, porous and microporous metals, metal mesh, perforated metal, and slotted metal. Additional examples include woven metal mesh (also known as screen) and tubular metal tension springs.

In embodiments of the disclosure in which membrane 46 is a metal membrane and the support and/or frame also are formed from metal, it is preferable that the support or frame is composed of metal that is formed from a corrosion-resistant material. Examples of such materials include corrosion-resistant alloys, such as stainless steels and non-ferrous corrosion-resistant alloys comprised of one or more of the following metals: chromium, nickel, titanium, niobium, vanadium, zirconium, tantalum, molybdenum, tungsten, silicon, and aluminum. These corrosion-resistant alloys have a native surface oxide layer that is chemically and physically very stable and serves to significantly retard the rate of intermetallic diffusion between the thin metal membrane and the metal support layer. Such intermetallic diffusion, if it were to occur, often results in degradation of the hydrogen permeability of the membrane and is undesirable.

Although membrane 46 is illustrated in FIG. 9 as having a planar configuration, it is within the scope of the disclosure that membrane 46 may have non-planar configurations as well. For example, the shape of the membrane may be defined at least in part by the shape of a support 54 or member 56 upon which the membrane is supported and/or formed. As such, membranes 46 may have concave, convex or other non-planar configurations, especially when device 10 is operating at an elevated pressure. As another example, membrane 46 may have a tubular configuration, such as shown in FIGS. 10 and 11.

In FIG. 10, an example of a tubular membrane is shown in which the mixed gas stream is delivered to the interior of the membrane tube. In this configuration, the interior of the membrane tube defines region 30 of the internal compartment, and the permeate region 32 of the compartment lies external the tube. An additional membrane tube is shown in dashed lines in FIG. 10 to represent graphically that it is within the scope of the present disclosure that device 10 may include more than one membrane and/or more than one mixed-gas surface 48. It is within the scope of the disclosure that device 10 may also include more than two membranes, and that the relative spacing and/or configuration of the membranes may vary.

In FIG. 11, another example of a hydrogen purification device 10 that includes tubular membranes is shown. In this illustrated configuration, device 10 is configured so that the mixed gas stream is delivered into compartment 18 external to the membrane tube or tubes. In such a configuration, the mixed-gas surface of a membrane tube is exterior to the corresponding permeate surface, and the permeate region is located internal the membrane tube or tubes.

The tubular membranes may have a variety of configurations and constructions, such as those discussed above with respect to the planar membranes shown in FIG. 9. For example, illustrative examples of various mounts 52, supports 54 and porous members 56 are shown in FIGS. 10 and 11, including a spring 58, which has been schematically illustrated. It is further within the scope of the disclosure that tubular membranes may have a configuration other than the straight cylindrical tube shown in FIG. 10. Examples of other configurations include U-shaped tubes and spiral or helical tubes.

As discussed, enclosure 12 defines a pressurized compartment 18 in which separation assembly 20 is positioned. In the embodiments shown in FIGS. 9–11, enclosure 12 includes a pair of end plates 60 that are joined by a perimeter shell 62. It should be understood that device 10 has been schematically illustrated in FIGS. 9–11 to show representative examples of the general components of the device without intending to be limited to geometry, shape and size. For example, end plates 60 typically are thicker than the walls of perimeter shell 62, but this is not required. Similarly, the thickness of the end plates may be greater than, less than or the same as the distance between the end plates. As a further example, the thickness of membrane 46 has been exaggerated for purposes of illustration.

In FIGS. 9–11, it can be seen that mixed gas stream 24 is delivered to compartment 18 through an input port 64, hydrogen-rich (or permeate) stream 34 is removed from device 10 through one or more product ports 66, and the byproduct stream is removed from device 10 through one or more byproduct ports 68. In FIG. 9, the ports are shown extending through various ones of the end plates to illustrate that the particular location on enclosure 12 from which the gas streams are delivered to and removed from device 10 may vary. It is also within the scope of the disclosure that one or more of the streams may be delivered or withdrawn through shell 62, such as illustrated in dashed lines in FIG. 10. It is further within the scope of the invention that ports 64–68 may include or be associated with flow-regulating and/or coupling structures. Examples of these structures include one or more of valves, flow and pressure regulators, connectors or other fittings and/or manifold assemblies that are configured to permanently or selectively fluidly interconnect device 10 with upstream and downstream components. For purposes of illustration, these flow-regulating and/or coupling structures are generally indicated at 70 in FIG. 9. For purposes of brevity, structures 70 have not been illustrated in every embodiment. Instead, it should be understood that some or all of the ports for a particular embodiment of device 10 may include any or all of these structures, that each port does not need to have the same, if any, structure 70, and that two or more ports may in some embodiments share or collectively utilize structure 70, such as a common collection or delivery manifold, pressure relief valve, fluid-flow valve, etc.

Another illustrative example of a suitable configuration for an end plate 60 is shown in FIG. 10. As shown, plate 60 includes input, product and byproduct ports 64–68. Also shown in FIG. 10 is a heating conduit, or passage, 71 through which a stream 73 containing heat transfer fluids, such as streams 24, 34 or 36, exhaust gases, etc., may be passed to selectively heat plate 60 and thereby decrease the heating requirements compared to a similarly sized end plate that is formed from a comparable solid slab of material.

Especially when passage 71 is adapted to receive a fluid stream 73 other than one of streams 24 and 34, it is preferable that the passage be isolated relative to ports 64–68. In operation, hot (exhaust) gas passing through plate 60 elevates the temperature of a device that includes plate 60 and thereby reduces the comparative time required to heat the device during start up. Of course, it is within the scope of the disclosure that devices and/or end plates according to the present disclosure may be formed without passage 71. Similarly, it is also within the scope of the disclosure that device 10 may include more than one passage 71, and that the passage(s) may extend through more than one region of enclosure 12, including shell 62.

End plates 60 and perimeter shell 62 are secured together by a retention structure 72. Structure 72 may take any suitable form capable of maintaining the components of enclosure 12 together in a fluid-tight or substantially fluid-tight configuration in the operating parameters and conditions in which device 10 is used. Examples of suitable structures 72 include welds 74 and bolts 76, such as shown in FIGS. 9 and 11. In FIG. 11, bolts 76 are shown extending through flanges 78 that extend from the components of enclosure 12 to be joined. In FIG. 12, bolts 76 are shown extending through compartment 18. It should be understood that the number of bolts may vary, and typically will include a plurality of bolts or similar fastening mechanisms extending around the perimeter of enclosure 18. Bolts 76 should be selected to be able to withstand the operating parameters and conditions of device 10, including the tension imparted to the bolts when device 10 is pressurized.

In the lower halves of FIGS. 11 and 12, gaskets 80 are shown to illustrate that enclosure 12 may, but does not necessarily, include a seal member 82 interconnecting or spanning the surfaces to be joined to enhance the leak-resistance of the enclosure. The seal member should be selected to reduce or eliminate leaks when used at the operating parameters and under the operating conditions of the device. Therefore, in many embodiments, high-pressure and/or high-temperature seals should be selected. An illustrative, non-exclusive example of such a seal structure is a graphite gasket, such as sold by Union Carbide under the trade name GRAFOIL™. As used herein, "seal member" and "sealing member" are meant to refer to structures or materials applied to, placed between, or placed in contact with the metallic end plates and shell (or shell portions) to enhance the seal established therebetween. Gaskets or other sealing members may also be used internal compartment 18, such as to provide seals between adjacent membranes, fluid conduits, mounts or supports, and/or any of the above with the internal surface of enclosure 12.

In FIGS. 9 and 11–12, the illustrated enclosures include a pair of end plates 60 and a shell 62. With reference to FIG. 12, it can be seen that the end plates include sealing regions 90, which form an interface 94 with a corresponding sealing region 92 of shell 62. In many embodiments, the sealing region of end plate 60 will be a perimeter region, and as such, sealing region 90 will often be referred to herein as a perimeter region 90 of the end plate. However, as used herein, the perimeter region is meant to refer to the region of the end plate that extends generally around the central region and which forms an interface with a portion of the shell, even if there are additional portions or edges of the end plate that project beyond this perimeter portion. Similarly, sealing region 92 of shell 62 will typically be an end region of the shell. Accordingly, the sealing region of the shell will often be referred to herein as end region 92 of the shell. It is within the scope of the disclosure, however, that end plates 60 may have portions that project outwardly beyond the sealing region 90 and interface 94 formed with shell 62, and that shell 62 may have regions that project beyond end plate 60 and the interface formed therewith. These portions are illustrated in dashed lines in FIG. 12 at 91 and 93 for purposes of graphical illustration.

As an alternative to a pair of end plates 60 joined by a separate perimeter shell 62, enclosure 12 may include a shell that is at least partially integrated with either or both of the end plates. For example, in FIG. 13, a portion 63 of shell 62 is integrally formed with each end plate 60. Described another way, each end plate 60 includes shell portions, or collars, 63 that extend from the perimeter region 90 of the end plate. As shown, the shell portions include end regions 92 which intersect at an interface 94. In the illustrated embodiment, the end regions abut each other without a region of overlap; however, it is within the scope of the disclosure that interface 94 may have other configurations, such as those illustrated and/or described subsequently. End regions 92 are secured together via any suitable mechanism, such as by any of the previously discussed retention structures 72, and may (but do not necessarily) include a seal member 82 in addition to the mating surfaces of end regions 92.

A benefit of shell 62 being integrally formed with at least one of the end plates is that the enclosure has one less interface that must be sealed. This benefit may be realized by reduced leaks due to the reduced number of seals that could fail, fewer components, and/or a reduced assembly time for device 10. Another example of such a construction for enclosure 12 is shown in FIG. 13, in which shell 62 is integrally formed with one of the end plates, with a shell portion 63 that extends integrally from the perimeter region 90 of one of the end plates. Shell portion 63 includes an end region 92 that forms an interface 94 with the perimeter region 90 of the other end plate via any suitable retention structure 72, such as those described above. The combined end plate and shell components shown in FIGS. 13 and 14 may be formed via any suitable mechanism, including machining them from a solid bar or block of material. For purposes of simplicity, separation assembly 20 and the input and output ports have not been illustrated in FIGS. 13 and 14 and only illustrative, non-exclusive examples of suitable retention structure 72 are shown. Similar to the other enclosures illustrated and described herein, it should be understood that the relative dimensions of the enclosure may vary and still be within the scope of the disclosure. For example, shell portions 63 may have lengths that are longer or shorter than those illustrated in FIGS. 13 and 14.

Before proceeding to additional illustrative configurations for end plates 60, it should be clarified that as used herein in connection with the enclosures of devices 10, the term "interface" is meant to refer to the interconnection and sealing region that extends between the portions of enclosure 12 that are separately formed and thereafter secured together, such as (but not necessarily) by one of the previously discussed retention structures 72. The specific geometry and size of interface 94 will tend to vary, such as depending upon size, configuration and nature of the components being joined together. Therefore, interface 94 may include a metal-on-metal seal formed between corresponding end regions and perimeter regions, a metal-on-metal seal formed between corresponding pairs of end regions, a metal-gasket (or other seal member 82)-metal seal, etc. Similarly, the interface may have a variety of shapes, including linear, arcuate and rectilinear configurations that are largely defined by the shape and relative position of the components being joined together.

For example, in FIG. 14, an interface 94 extends between end region 92 of shell portion 63 and perimeter region 90 of end plate 60. As shown, regions 90 and 92 intersect with parallel edges. As discussed, a gasket or other seal member may extend between these edges. In FIGS. 15–18, nonexclusive examples of additional interfaces 94 that are within the scope of the disclosure are shown. Embodiments of enclosure 12 that include an interface 94 formed between adjacent shell regions may also have any of these configurations. In FIG. 15, perimeter region 90 defines a recess or corner into which end region 92 of shell 62 extends to form an interface 94 that extends around this corner. Also shown in FIG. 15 is central region 96 of end plate 60, which as illustrated extends within shell 62 and defines a region of overlap therewith.

In FIG. 16, perimeter region 90 defines a corner that opens generally toward compartment 18, as opposed to the corner of FIG. 15, which opens generally away from compartment 18. In the configuration shown in FIG. 16, perimeter region 90 includes a collar portion 98 that extends at least partially along the outer surface 100 of shell 62 to define a region of overlap therewith. Central region 96 of plate 60 is shown in solid lines extending along end region 92 without extending into shell 62, in dashed lines extending into shell 62, and in dash-dot lines including an internal support 102 that extends at least partially along the inner surface 104 of shell 62. FIGS. 17 and 18 are similar to FIGS. 15 and 16 except that perimeter region 90 and end region 92 are adapted to threadingly engage each other, and accordingly include corresponding threads 106 and 108. In dashed lines in FIG. 17, an additional example of a suitable configuration for perimeter region 90 of end plate 60 is shown. As shown, the outer edge 110 of the end plate does not extend radially (or outwardly) to or beyond the exterior surface of shell 62.

It should be understood that any of these interfaces may be used with an enclosure constructed according to the present disclosure. However, for purposes of brevity, every embodiment of enclosure 12 will not be shown with each of these interfaces. Although somewhat schematically illustrated in the previously discussed figures, it should be understood that embodiments of device 10 that include end plates 60 may include end plates having a variety of configurations, such as those disclosed in the patent applications incorporated herein. Therefore, although the subsequently described end plates shown in FIGS. 19–26 are shown with the interface configuration of FIG. 15, it is within the scope of the disclosure that the end plates and corresponding shells may be configured to have any of the interfaces described and/or illustrated herein, as well as the integrated shell configuration described and illustrated with respect to FIGS. 13 and 14. Similarly, it should be understood that the devices constructed according to the present disclosure may have any of the enclosure configurations, interface configurations, retention structure configurations, separation assembly configurations, flow-regulating and/or coupling structures, seal member configurations, and port configurations discussed, described and/or incorporated herein. Illustrative examples of suitable end plate configurations are shown in FIGS. 19–32. Although the following end plate configurations are illustrated with circular perimeters, it is within the scope of the disclosure that the end plates may be configured to have perimeters with any other geometric configuration, including arcuate, rectilinear, and angular configurations, as well as combinations thereof.

Consider for example a circular end plate formed from Type 304 stainless steel and having a uniform thickness of 0.75 inches. Such an end plate weights 7.5 pounds. A hydrogen purification device containing this end plate was exposed to operating parameters of 400° C. and 175 psi. Maximum stresses of 25,900 psi were imparted to the end plate, with a maximum deflection of 0.0042 inches and a deflection at perimeter region 90 of 0.0025 inches.

Another end plate 60 constructed according to the present disclosure is shown in FIGS. 19 and 20 and generally indicated at 120. As shown, end plate 120 has interior and exterior surfaces 122 and 124. Interior surface 122 includes central region 96 and perimeter region 90. Exterior surface 124 has a central region 126 and a perimeter region 128, and in the illustrated embodiment, plate 120 has a perimeter 130 extending between the perimeter regions 90 and 128 of the interior and exterior surfaces. As discussed above, perimeter region 90 may have any of the configurations illustrated or described above, including a configuration in which the sealing region is at least partially or completely located along perimeter 130. In the illustrated embodiment, perimeter 130 has a circular configuration. However, it is within the scope of the disclosure that the shape may vary, such as to include rectilinear and other arcuate, geometric, linear, and/or cornered configurations.

Unlike the previously illustrated end plates, however, the central region of the end plate has a variable thickness between its interior and exterior surfaces, which is perhaps best seen in FIG. 20. Unlike a uniform slab of material, the exterior surface of plate 120 has a central region 126 that includes an exterior cavity, or removed region, 132 that extends into the plate and generally toward central region 96 on interior surface 122. Described another way, the end plate has a nonplanar exterior surface, and more specifically, an exterior surface in which at least a portion of the central region extends toward the corresponding central region of the end plate's interior surface. Region 132 reduces the overall weight of the end plate compared to a similarly constructed end plate that does not include region 132. As used herein, removed region 132 is meant to exclude ports or other bores that extend completely through the end plates. Instead, region 132 extends into, but not through, the end plate.

A reduction in weight means that a purification device 10 that includes the end plate will be lighter than a corresponding purification device that includes a similarly constructed end plate formed without region 132. With the reduction in weight also comes a corresponding reduction in the amount of heat (thermal energy) that must be applied to the end plate to heat the end plate to a selected operating temperature. In the illustrated embodiment, region 132 also increases the surface area of exterior surface 124. Increasing the surface area of the end plate compared to a corresponding end plate may, but does not necessarily in all embodiments, increase the heat transfer surface of the end plate, which in turn, can reduce the heating requirements and/or time of a device containing end plate 120.

In some embodiments, plate 120 may also be described as having a cavity that corresponds to, or includes, the region of maximum stress on a similarly constructed end plate in which the cavity was not present. Accordingly, when exposed to the same operating parameters and conditions, lower stresses will be imparted to end plate 120 than to a solid end plate formed without region 132. For example, in the solid end plate with a uniform thickness, the region of maximum stress occurs within the portion of the end plate occupied by removed region 132 in end plate 120. Accordingly, an end plate with region 132 may additionally or alternatively be described as having a stress abatement structure 134 in that an area of maximum stress that would otherwise be imparted to the end plate has been removed.

For purposes of comparison, consider an end plate 120 having the configuration shown in FIGS. 19 and 20, formed from Type 304 stainless steel, and having a diameter of 6.5 inches. This configuration corresponds to maximum plate thickness of 0.75 inches and a removed region 132 having a length and width of 3 inches. When utilized in a device 10 operating at 400° C. and 175 psi, plate 120 has a maximum stress imparted to it of 36,000 psi, a maximum deflection of 0.0078 inches, a displacement of 0.0055 inches at perimeter region 90, and a weight of 5.7 pounds. It should be understood that the dimensions and properties described above are meant to provide an illustrative example of the combinations of weight, stress and displacement experienced by end plates according to the present disclosure, and that the specific perimeter shape, materials of construction, perimeter size, thickness, removed region shape, removed region depth and removed region perimeter all may vary within the scope of the disclosure.

Figure 21:
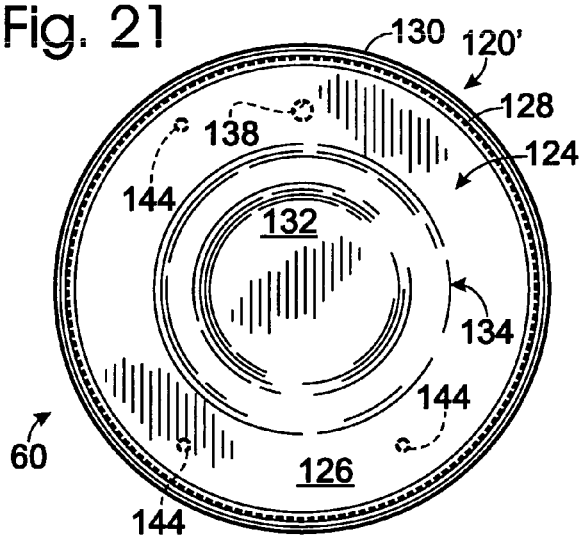
FIG. 21 is a top plan view of an end plate for a hydrogen purification device constructed according to the present invention.
Figure 22:
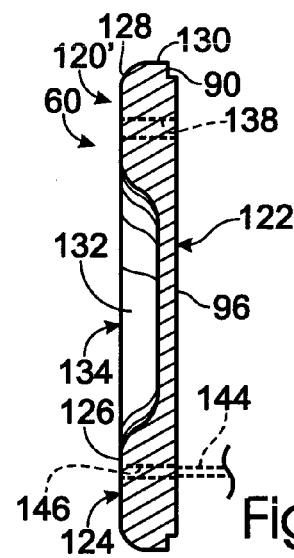
FIG. 22 is a cross-sectional view of the end plate of FIG. 21.

In FIG. 19, it can be seen that region 132 (and/or stress abatement structure 134) has a generally square or rectilinear configuration measured transverse to surfaces 122 and 124. As discussed, other geometries and dimensions may be used and are within the scope of the disclosure. To illustrate this point, variations of end plate 120 are shown in FIGS. 21 and 22 and generally indicated at 120'. In these figures, region 132 is shown having a circular perimeter. It should be understood that the relative dimensions of region 132 compared to the rest of the end plate may vary, such as being either larger or smaller than shown in FIGS. 21 and 22.

For purposes of comparison, consider an end plate 120 having the configuration shown in FIGS. 21 and 22 and having the same materials of construction, perimeter and thickness as the end plate shown in FIGS. 19 and 20. Instead of the generally square removed region of FIGS. 19 and 20, however, end plate 120' has a removed region with a generally circular perimeter and a diameter of 3.25 inches. End plate 120' weighs the same as end plate 120, but has reduced maximum stress and deflections. More specifically, while end plate 120 had a maximum stress greater than 35,000 psi, end plate 120' had a maximum stress that is less than 30,000 psi, and in the illustrated configuration less than 25,000 psi, when subjected to the operating parameters discussed above with respect to plate 120. In fact, plate 120' demonstrated approximately a 35% reduction in maximum stress compared to plate 120. The maximum and perimeter region deflections of plate 120' were also less than plate 120, with a measured maximum deflection of 0.007 inches and a measured deflection at perimeter region 90 of 0.0050 inches.

As a further example, forming plate 120' with a region 132 having a diameter of 3.75 inches instead of 3.25 inches decreases the weight of the end plate to 5.3 pounds and produced the same maximum deflection. This variation produces a maximum stress that is less than 25,000 psi, although approximately 5% greater than that of end plate 120' (24,700 psi, compared to 23,500 psi). At perimeter region 90, this variation of end plate 120' exhibited a maximum deflection of 0.0068 inches.

In FIGS. 19–23, illustrative port configurations have been shown. In FIGS. 21 and 22, a port 138 is shown in dashed lines extending from interior surface 122 through the end plate to exterior surface 124. Accordingly, with such a configuration a gas stream is delivered or removed via the exterior surface of the end plate of device 10. In such a configuration, fluid conduits and/or flow-regulating and/or coupling structure 70 typically will project from the exterior surface 124 of the end plate. Another suitable configuration is indicated at 140 in dashed lines in FIGS. 19 and 20. As shown, port 140 extends from the interior surface of the end plate, and then through perimeter 130 instead of exterior surface 124. Accordingly, port 140 enables gas to be delivered or removed from the perimeter of the end plate instead of the exterior surface of the end plate. It should be understood that ports 64–68 may have these configurations illustrated by ports 138 and 140. Of course, ports 64–68 may have any other suitable port configuration as well, including a port that extends through shell 62 or a shell portion. For purposes of simplicity, ports will not be illustrated in many of the subsequently described end plates, just as they were not illustrated in FIGS. 13 and 14.

Also shown in dashed lines in FIGS. 19 and 21–22 are guide structures 144. Guide structures 144 extend into compartment 18 and provide supports that may be used to position and/or align separation assembly 20, such as membranes 46. In some embodiments, guide structures 144 may themselves form mounts 52 for the separation assembly. In other embodiments, the device includes mounts other than guide structures 144. Guide structures may be used with any of the end plates illustrated, incorporated and/or described herein, regardless of whether any such guide structures are shown in a particular drawing figure. However, it should also be understood that hydrogen purification devices according to the present disclosure may be formed without guide structures 144. In embodiments of device 10 that include guide structures 144 that extend into or through compartment 18, the number of such structures may vary from a single support to two or more supports. Similarly, while guide structures 144 have been illustrated as cylindrical ribs or projections, other shapes and configurations may be used within the scope of the disclosure.

Guide structures 144 may be formed from the same materials as the corresponding end plates. Additionally or alternatively, the guide structures may include a coating or layer of a different material. Guide structures 144 may be either separately formed from the end plates and subsequently attached thereto, or integrally formed therewith. Guide structures 144 may be coupled to the end plates by any suitable mechanism, including attaching the guide structures to the interior surfaces of the end plates, inserting the guide structures into bores extending partially through the end plates from the interior surfaces thereof, or inserting the guide structures through bores that extend completely through the end plates. In embodiments where the end plates include bores that extend completely through the end plates (which are graphically illustrated for purposes of illustration at 146 in FIG. 22), the guide structures may be subsequently affixed to the end plates. Alternatively, the guide structures may be inserted through compartment 18 until the separation assembly is properly assigned and secured therein, and then the guide structures may be removed and the bores sealed (such as by welding) to prevent leaks.

Figure 23:
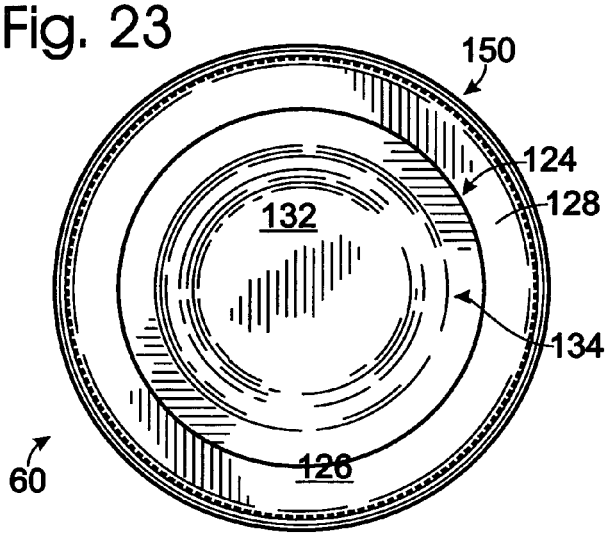
FIG. 23 is a top plan view of an end plate for a hydrogen purification device constructed according to the present invention.
Figure 24:
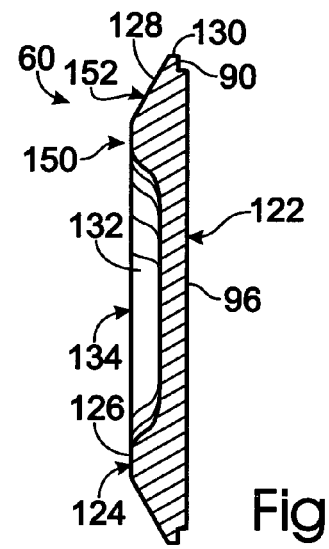
FIG. 24 is a cross-sectional view of the end plate of FIG. 23.

In FIGS. 23 and 24, another illustrative example of a suitable configuration for end plate 60 is shown and generally indicated at 150. Unless otherwise specified, it should be understood that end plates 150 may have any of the elements, subelements and variations as any of the other end plates shown, described and/or incorporated herein. Similar to end plate 120', plate 150 includes an exterior surface 124 with a removed region 132 (and/or stress abatement structure 134) having a circular perimeter with a diameter of 3.25 inches. Exterior surface 124 further includes an outer removed region 152 that extends from central region 126 to perimeter portion 128. Outer removed region 152 decreases in thickness as it approaches perimeter 130. In the illustrated embodiment, region 152 has a generally linear reduction in thickness, although other linear and arcuate transitions may be used.

For purposes of comparison, end plate 150 has a reduced weight compared to end plates 120 and 120'. Plate 150 weighed 4.7 pounds and experienced maximum stresses of 25,000 psi or less when subjected to the operating parameters discussed above (400° C. and 175 psi). The maximum deflection of the plate was 0.0098 inches, and the displacement at perimeter region 90 was 0.0061 inches.

Figure 25:
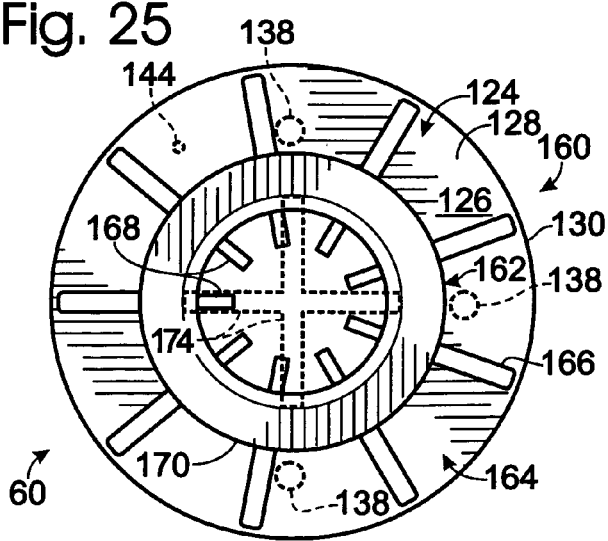
FIG. 25 is a top plan view of an end plate for an enclosure for a hydrogen purification device constructed according to the present invention.
Figure 26:
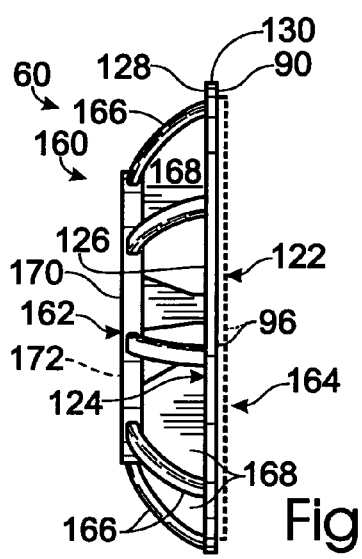
FIG. 26 is a side elevation view of the end plate of FIG. 25.

Another illustrative example of a suitable configuration for end plate 60 is shown in FIGS. 25 and 26 and generally indicated at 160. Unless otherwise specified, end plate 160 may have the same elements, subelements and variations as the other end plates illustrated, described and/or incorporated herein. End plate 160 may be referred to as a truss-stiffened end plate because it includes a truss assembly 162 that extends from the end plate's exterior surface 124. As shown, end plate 160 has a base plate 164 with a generally planar configuration, similar to the end plates shown in FIGS. 9 and 11–13. However, truss assembly 162 enables, but does not require, that the base plate may have a thinner construction while still providing comparable if not reduced maximum stresses and deflections. It is within the scope of the disclosure that any of the other end plates illustrated, described and/or incorporated herein also may include a truss assembly 162.

Truss assembly 162 extends from exterior surface 124 of base plate 164 and includes a plurality of projecting ribs 166 that extend from exterior surface 124. In FIGS. 25 and 26, it can be seen that ribs 166 are radially spaced around surface 124. Nine ribs 166 are shown in FIGS. 21 and 23, but it is within the scope of the disclosure that truss assembly 162 may be formed with more or fewer ribs. Similarly, in the illustrated embodiment, ribs 166 have arcuate configurations, and include flanges 168 extending between the ribs and surface 124. Flanges 168 may also be described as heat transfer fins because they add considerable heat transfer area to the end plate. Truss assembly 162 further includes a tension collar 170 that interconnects the ribs. As shown, collar 170 extends generally parallel to surface base plate 164 and has an open central region 172. Collar 170 may be formed with a closed or internally or externally projecting central portion without departing from the disclosure. To illustrate this point, members 174 are shown in dashed lines extending across collar 170 in FIG. 21. Similarly, collar 170 may have configurations other than the circular configuration shown in FIGS. 25 and 26. As a further alternative, base plate 164 has been indicated in partial dashed lines in FIG. 26 to graphically illustrate that the base plate may have a variety of configurations, such as those described, illustrated and incorporated herein, including the configuration shown if the dashed region is removed.

End plate 160 may additionally, or alternatively, be described as having a support (170) that extends in a spaced-apart relationship beyond exterior surface 124 of base plate 164 and which is adapted to provide additional stiffness and/or strength to the base plate. Still another additional or alternative description of end plate 160 is that the end plate includes heat transfer structure (162) extending away from the exterior surface of the base plate, and that the heat transfer structure includes a surface (170) that is spaced-away from surface 124 such that a heated fluid stream may pass between the surfaces.

Truss assembly 162 may also be referred to as an example of a deflection abatement structure because it reduces the deflection that would otherwise occur if base plate 164 were formed without the truss assembly. Similarly, truss assembly 162 may also provide another example of a stress abatement restructure because it reduces the maximum stresses that would otherwise be imparted to the base plate. Furthermore, the open design of the truss assembly increases the heat transfer area of the base plate without adding significant weight to the base plate.

Continuing the preceding comparisons between end plates, plate 160 Was subjected to the same operating parameters as the previously described end plates. The maximum stresses imparted to base plate 164 were 10,000 psi or less. Similarly, the maximum deflection of the base plate was only 0.0061 inches, with a deflection of 0.0056 inches at perimeter region 90. It should be noted, that base plate 160 achieved this significant reduction in maximum stress while weighing only 3.3 pounds. Similarly, base plate 164 experienced a smaller maximum displacement and comparable or reduced perimeter displacement yet had a base plate that was only 0.25 inches thick. Of course, plate 160 may be constructed with thicker base plates, but the tested plate proved to be sufficiently strong and rigid under the operating parameters with which it was used.

As discussed, enclosure 12 may include a pair of end plates 60 and a perimeter shell. In FIG. 27, an example of an enclosure 12 formed with a pair of end plates 160 is shown for purposes of illustration and indicated generally at 180. Although enclosure 180 has a pair of truss-stiffened end plates 160, it is within the scope of the disclosure that an enclosure may have end plates having different constructions and/or configurations. In fact, in some operating environments it may be beneficial to form enclosure 12 with two different types of end plates. In others, it may be beneficial for the end plates to have the same construction.

In FIGS. 28 and 29 another example of an enclosure 12 is shown and generally indicated at 190 and includes end plates 120'''. End plates 120''' have a configuration similar to FIGS. 21 and 22, except removed region 132 is shown having a diameter of 4 inches to further illustrate that the shape and size of the removed region may vary within the scope of the disclosure. Both end plates include shell portions 63 extending integrally therefrom to illustrate that any of the end plates illustrated, described, and/or incorporated herein may include a shell portion 63 extending integrally therefrom. To illustrate that any of the end plates described, illustrated and/or incorporated herein may also include truss assemblies (or heat transfer structure) 162 and/or projecting supports 170 or deflection abatement structure, members 194 are shown projecting across removed region 132 in a spaced-apart configuration from the exterior surface 124 of the end plate.

It is also within the scope of the disclosure that enclosure 12 may include stress and/or deflection abatement structures that extend into compartment 18 as opposed to, or in addition to, corresponding structures that extend from the exterior surface of the end plates. In FIGS. 30–32, end plates 60 are shown illustrating examples of these structures. For example, in FIG. 30, end plate 60 includes a removed region 132 that extends into the end plate from the interior surface 122 of the end plate. It should be understood that region 132 may have any of the configurations described, illustrated and/or incorporated herein with respect to removed regions that extend from the exterior surface of a base plate. Similarly, in dashed lines at 170 in FIG. 30, supports are shown extending across region 132 to provide additional support and/or rigidity to the end plate. In FIG. 31, end plate 60 includes internal supports 196 that are adapted to extend into compartment 18 to interconnect the end plate with the corresponding end plate at the other end of the compartment. As discussed, guide structures 144 may form such a support. In FIG. 32, an internally projecting truss assembly 162 is shown.

As discussed, the dimensions of device 10 and enclosure 12 may also vary. For example, an enclosure designed to house tubular separation membranes may need to be longer (i.e. have a greater distance between end plates) than an enclosure designed to house planar separation membranes to provide a comparable amount of membrane surface area exposed to the mixed gas stream (i.e., the same amount of effective membrane surface area). Similarly, an enclosure configured to house planar separation membranes may tend to be wider (i.e., have a greater cross-sectional area measured generally parallel to the end plates) than an enclosure designed to house tubular separation membranes. However, it should be understood that neither of these relationships are required, and that the specific size of the device and/or enclosure may vary. Factors that may affect the specific size of the enclosure include the type and size of separation assembly to be housed, the operating parameters in which the device will be used, the flow rate of mixed gas stream 24, the shape and configuration of devices such as heating assemblies, fuel processors and the like with which or within which the device will be used, and to some degree, user preferences.

As discussed previously, hydrogen purification devices may be operated at elevated temperatures and/or pressures. Both of these operating parameters may impact the design of enclosures 12 and other components of the devices. For example, consider a hydrogen purification device 10 operated at a selected operating temperature above an ambient temperature, such as a device operating at 400° C. As an initial matter, the device, including enclosure 12 and separation assembly 20, must be constructed from a material that can withstand the selected operating temperature, and especially over prolonged periods of time and/or with repeated heating and cooling off cycles. Similarly, the materials that are exposed to the gas streams preferably are not reactive or at least not detrimentally reactive with the gases. An example of a suitable material is stainless steel, such as Type 304 stainless steel, although others may be used.

Besides the thermal and reactive stability described above, operating device 10 at a selected elevated temperature requires one or more heating assemblies 42 to heat the device to the selected operating temperature. When the device is initially operated from a shutdown, or unheated, state, there will be an initial startup or preheating period in which the device is heated to the selected operating temperature. During this period, the device may not produce a hydrogen-rich stream at all, a hydrogen-rich stream that contains more than an acceptable level of the other gases, and/or a reduced flow rate of the hydrogen-rich stream compared to the byproduct stream or streams (meaning that a greater percentage of the hydrogen gas is being exhausted as byproduct instead of product). In addition to the time to heat the device, one must also consider the heat or thermal energy required to heat the device to the selected temperature. The heating assembly or assemblies may add to the operating cost, materials cost, and/or equipment cost of the device. For example, a simplified end plate 60 is a relatively thick slab having a uniform thickness. In fact, stainless steel plates having a uniform thickness of 0.5 inches or 0.75 inches have proven effective to support and withstand the operating parameters and conditions of device 10. However, the dimensions of these plates add considerable weight to device 10, and in many embodiments require considerable thermal energy to be heated to the selected operating temperature. As used herein, the term "uniform thickness" is meant to refer to devices that have a constant or at least substantially constant thickness, including those that deviate in thickness by a few percent (less than 5%) along their lengths. In contrast, and as used herein, a "variable thickness" will refer to a thickness that varies by at least 10%, and in some embodiments at least 25%, 40% or 50%.

The pressure at which device 10 is operated may also affect the design of device 10, including enclosure 12 and separation assembly 20. Consider for example a device operating at a selected pressure of 175 psi. Device 10 must be constructed to be able to withstand the stresses encountered when operating at the selected pressure. This strength requirement affects not only the seals formed between the components of enclosure 12, but also the stresses imparted to the components themselves. For example, deflection or other deformation of the end plates and/or shell may cause gases within compartment 18 to leak from the enclosure. Similarly, deflection and/or deformation of the components of the device may also cause unintentional mixing of two or more of gas streams 24, 34 and 36. For example, an end plate may deform plastically or elastically when subjected to the operating parameters under which device 10 is used. Plastic deformation results in a permanent deformation of the end plate, the disadvantage of which appears fairly evident. Elastic deformation, however, also may impair the operation of the device because the deformation may result in internal and/or external leaks. More specifically, the deformation of the end plates or other components of enclosure 12 may enable gases to pass through regions where fluid-tight seals previously existed. As discussed, device 10 may include gaskets or other seal members to reduce the tendency of these seals to leak, however, the gaskets have a finite size within which they can effectively prevent or limit leaks between opposing surfaces. For example, internal leaks may occur in embodiments that include one or more membrane envelopes or membrane plates compressed (with or without gaskets) between the end plates. As the end plates deform and deflect away from each other, the plates and/or gaskets may in those regions not be under the same tension or compression as existed prior to the deformation. Gaskets, or gasket plates, may be located between a membrane envelope and adjacent feed plates, end plates, and/or other adjacent membrane envelopes. Similarly, gaskets or gasket plates may also be positioned within a membrane envelope to provide additional leak prevention within the envelope.

In view of the above, it can be seen that there are several competing factors to be weighed with respect to device 10. In the context of enclosure 12, the heating requirements of the enclosure will tend to increase as the materials used to form the enclosure are thickened. To some degree using thicker materials may increase the strength of the enclosure, however, it may also increase the heating and material requirements, and in some embodiments actually produce regions to which greater stresses are imparted compared to a thinner enclosure. Areas to monitor on an end plate include the deflection of the end plate, especially at the perimeter regions that form interface(s) 94, and the stresses imparted to the end plate.

As discussed, enclosure 12 contains an internal compartment 18 that houses separation assembly 20, such as one or more separation membranes 46, which are supported within the enclosure by a suitable mount 52. In the illustrative examples shown in FIGS. 9 and 12, the separation membranes 46 are depicted as independent planar or tubular membranes. It is also within the scope of the disclosure that the membranes may be arranged in pairs that define permeate region 32 therebetween. In such a configuration, the membrane pairs may be referred to as a membrane envelope, in that they define a common permeate region 32 in the form of a harvesting conduit, or flow path, extending therebetween and from which hydrogen-rich stream 34 may be collected.

Figure 33:
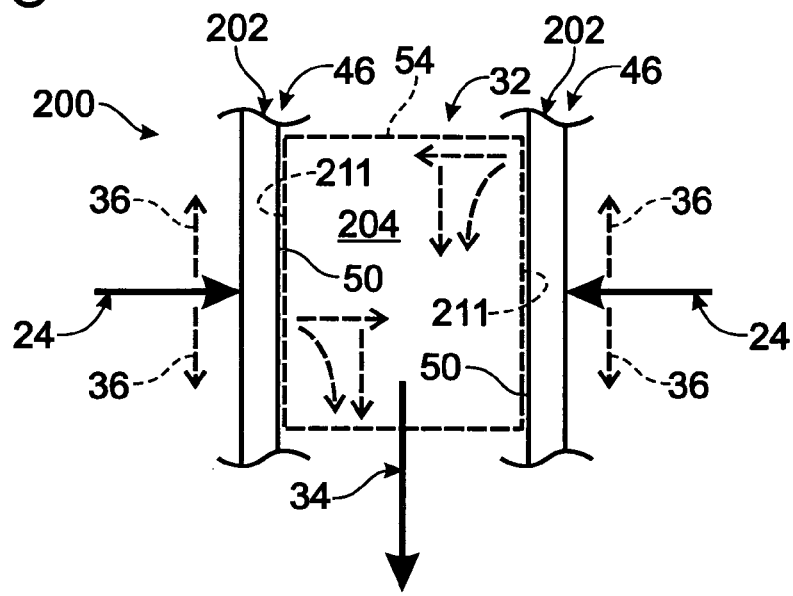
FIG. 33 is a fragmentary side elevation view of a pair of separation membranes separated by a support.

An example of a membrane envelope is shown in FIG. 33 and generally indicated at 200. It should be understood that the membrane pairs may take a variety of suitable shapes, such as planar envelopes and tubular envelopes. Similarly, the membranes may be independently supported, such as with respect to an end plate or around a central passage. For purposes of illustration, the following description and associated illustrations will describe the separation assembly as including one or more membrane envelopes 200. It should be understood that the membranes forming the envelope may be two separate membranes, or may be a single membrane folded, rolled or otherwise configured to define two membrane regions, or surfaces, 202 with permeate surfaces 50 that are oriented toward each other to define a conduit 204 therebetween from which the hydrogen-rich permeate gas may be collected and withdrawn. Conduit 204 may itself form permeate region 32, or a device 10 according to the present disclosure may include a plurality of membrane envelopes 200 and corresponding conduits 204 that collectively define permeate region 32. Furthermore, membranes 46 may have any of the compositions and structures described and incorporated herein.

As discussed, a support 54 may be used to support the membranes against high feed pressures. Support 54 should enable gas that permeates through membranes 46 to flow therethrough. Support 54 includes surfaces 211 against which the permeate surfaces 50 of the membranes are supported. In the context of a pair of membranes forming a membrane envelope, support 54 may also be described as defining harvesting conduit 204. In conduit 204, permeated gas preferably may flow both transverse and parallel to the surface of the membrane through which the gas passes, such as schematically illustrated in FIG. 33. The permeate gas, which is at least substantially pure hydrogen gas, may then be harvested or otherwise withdrawn from the envelope to form hydrogen-rich stream 34. Because the membranes lie against the support, it is preferable that the support does not obstruct the flow of gas through the hydrogen-selective membranes. The gas that does not pass through the membranes forms one or more byproduct streams 36, as schematically illustrated in FIG. 33.

Figure 34:
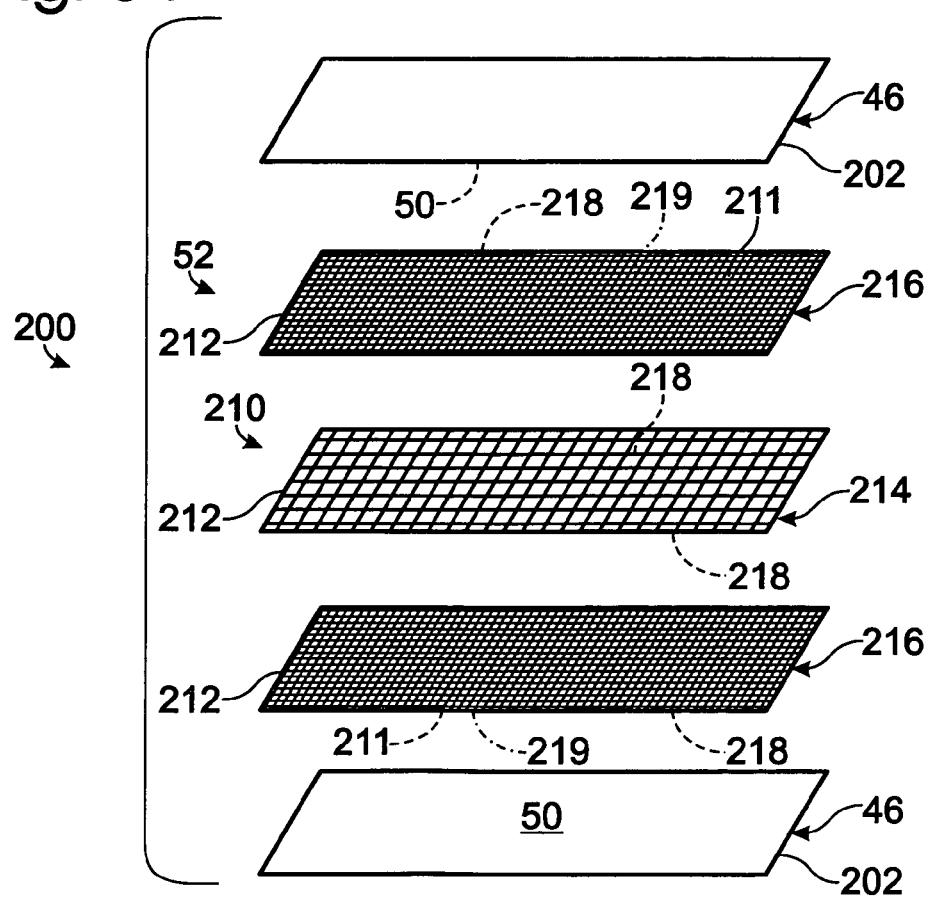
FIG. 34 is an exploded isometric view of a membrane envelope constructed according to the present invention and including a support in the form of a screen structure having several layers.

An example of a suitable support 54 for membrane envelopes 200 is shown in FIG. 34 in the form of a screen structure 210. Screen structure 210 includes plural screen members 212. In the illustrated embodiment, the screen members include a coarse mesh screen 214 sandwiched between fine mesh screens 216. It should be understood that the terms "fine" and "coarse" are relative terms. Preferably, the outer screen members are selected to support membranes 46 without piercing the membranes and without having sufficient apertures, edges or other projections that may pierce, weaken or otherwise damage the membrane under the operating conditions with which device 10 is operated. Because the screen structure needs to provide for flow of the permeated gas generally parallel to the membranes, it is preferable to use a relatively courser inner screen member to provide for enhanced, or larger, parallel flow conduits. In other words, the finer mesh screens provide better protection for the membranes, while the coarser mesh screen provides better flow generally parallel to the membranes.

The screen members may be of similar or the same construction, and more or less screen members may be used than shown in FIG. 34. Preferably, support 54 is formed from a corrosion-resistant material that will not impair the operation of the hydrogen purification device and other devices with which device 10 is used. Examples of suitable materials for metallic screen members include stainless steels, titanium and alloys thereof, zirconium and alloys thereof, corrosion-resistant alloys, including Inconel™ alloys, such as 800H™, and Hastelloy™ alloys, and alloys of copper and nickel, such as Monel™. Additional examples of structure for supports 54 include porous ceramics, porous carbon, porous metal, ceramic foam, carbon foam, and metal foam, either alone, or in combination with one or more screen members 212. As another example, some or all of the screen members may be formed from expanded metal instead of a woven mesh material.

During fabrication of the membrane envelopes, adhesive may be used to secure membranes 46 to the screen structure and/or to secure the components of screen structure 210 together, as discussed in more detail in the above-incorporated U.S. patent application Ser. No. 09/812,499. For purposes of illustration, adhesive is generally indicated in dashed lines at 218 in FIG. 34. An example of a suitable adhesive is sold by 3M under the trade name SUPER 77. Typically, the adhesive is at least substantially, if not completely, removed after fabrication of the membrane envelope so as not to interfere with the permeability, selectivity and flow paths of the membrane envelopes. An example of a suitable method for removing adhesive from the membranes and/or screen structures or other supports is by exposure to oxidizing conditions prior to initial operation of device 10. The objective of the oxidative conditioning is to burn out the adhesive without excessively oxidizing the palladium-alloy membrane. A suitable procedure for such oxidizing is disclosed in the above-incorporated patent application.

Supports 54, including screen structure 210, may include a coating 219 on the surfaces 211 that engage membranes 46, such as indicated in dash-dot lines in FIG. 34. Examples of suitable coatings include aluminum oxide, tungsten carbide, tungsten nitride, titanium carbide, titanium nitride, and mixtures thereof. These coatings are generally characterized as being thermodynamically stable with respect to decomposition in the presence of hydrogen. Suitable coatings are formed from materials, such as oxides, nitrides, carbides, or intermetallic compounds, that can be applied as a coating and which are thermodynamically stable with respect to decomposition in the presence of hydrogen under the operating parameters (temperature, pressure, etc.) under which the hydrogen purification device will be operated. Suitable methods for applying such coatings to the screen or expanded metal screen member include chemical vapor deposition, sputtering, thermal evaporation, thermal spraying, and, in the case of at least aluminum oxide, deposition of the metal (e.g., aluminum) followed by oxidation of the metal to give aluminum oxide. In at least some embodiments, the coatings may be described as preventing intermetallic diffusion between the hydrogen-selective membranes and the screen structure.

The hydrogen purification devices 10 described, illustrated and/or incorporated herein may include one or more membrane envelopes 200, typically along with suitable input and output ports through which the mixed gas stream is delivered and from which the hydrogen-rich and byproduct streams are removed. In some embodiments, the device may include a plurality of membrane envelopes. When the separation assembly includes a plurality of membrane envelopes, it may include fluid conduits interconnecting the envelopes, such as to deliver a mixed gas stream thereto, to withdraw the hydrogen-rich stream therefrom, and/or to withdraw the gas that does not pass through the membranes from mixed gas region 30. When the device includes a plurality of membrane envelopes, the permeate stream, byproduct stream, or both, from a first membrane envelope may be sent to another membrane envelope for further purification. The envelope or plurality of envelopes and associated ports, supports, conduits and the like may be referred to as a membrane module 220.

The number of membrane envelopes 200 used in a particular device 10 depends to a degree upon the feed rate of mixed gas stream 24. For example, a membrane module 220 containing four envelopes 200 has proven effective for a mixed gas stream delivered to device 10 at a flow rate of 20 liters/minute. As the flow rate is increased, the number of membrane envelopes may be increased, such as in a generally linear relationship. For example, a device 10 adapted to receive mixed gas stream 24 at a flow rate of 30 liters/minute may preferably include six membrane envelopes. However, these exemplary numbers of envelopes are provided for purposes of illustration, and greater or fewer numbers of envelopes may be used. For example, factors that may affect the number of envelopes to be used include the hydrogen flux through the membranes, the effective surface area of the membranes, the flow rate of mixed gas stream 24, the desired purity of hydrogen-rich stream 34, the desired efficiency at which hydrogen gas is removed from mixed gas stream 24, user preferences, the available dimensions of device 10 and compartment 18, etc.

Figure 35:
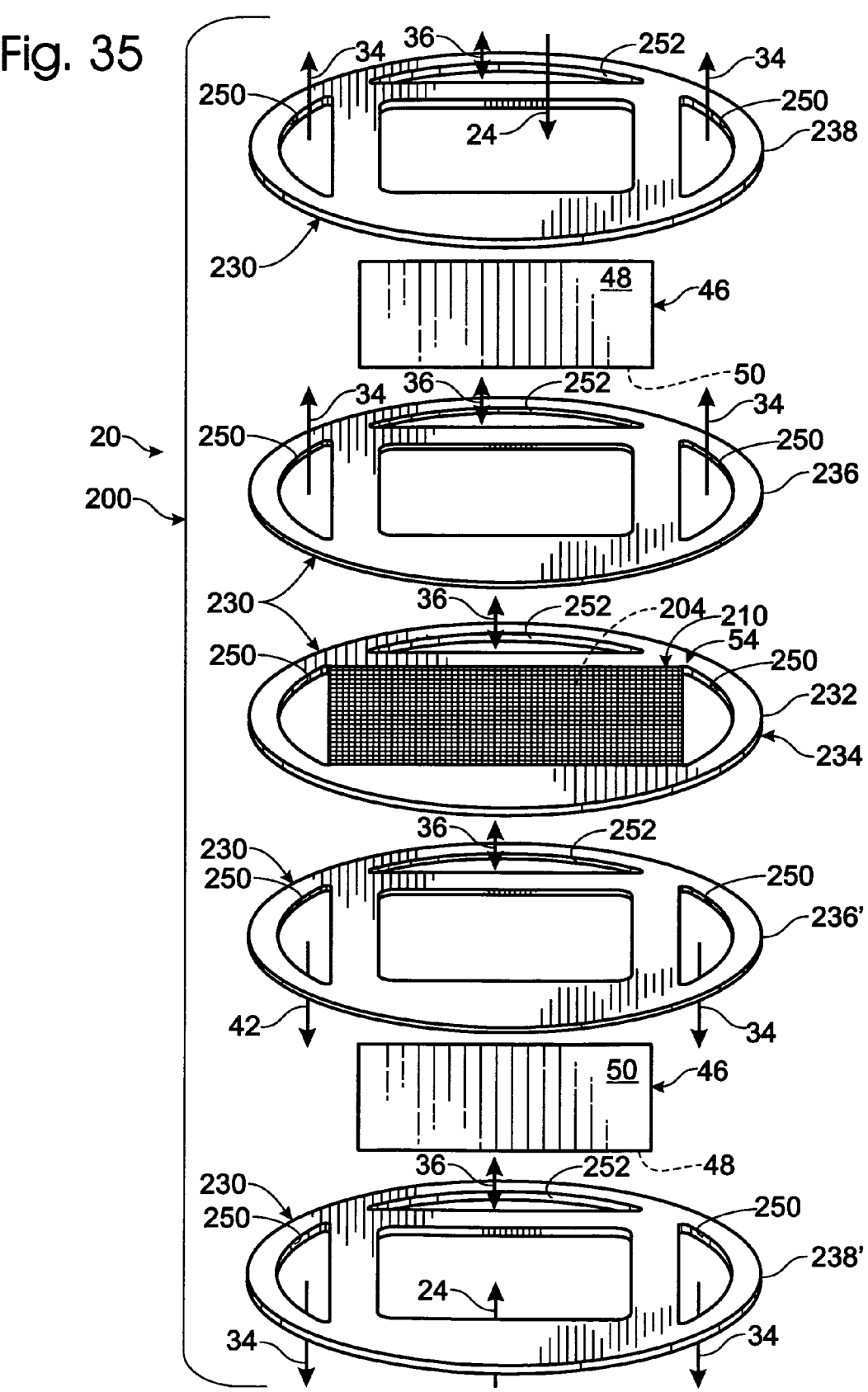
FIG. 35 is an exploded isometric view of another membrane envelope according to the present invention.

Preferably, but not necessarily, the screen structure and membranes that are incorporated into a membrane envelope 200 include frame members 230, or plates, that are adapted to seal, support and/or interconnect the membrane envelopes. An illustrative example of suitable frame members 230 is shown in FIG. 35. As shown, screen structure 210 fits within a frame member 230 in the form of a permeate frame 232. The screen structure and frame 232 may collectively be referred to as a screen plate or permeate plate 234. When screen structure 210 includes expanded metal members, the expanded metal screen members may either fit within permeate frame 232 or extend at least partially over the surface of the frame. Additional examples of frame members 230 include supporting frames, feed plates and/or gaskets. These frames, gaskets or other support structures may also define, at least in part, the fluid conduits that interconnect the membrane envelopes in an embodiment of separation assembly 20 that contains two or more membrane envelopes. Examples of suitable gaskets are flexible graphite gaskets, including those sold under the trade name GRAFOIL™ by Union Carbide, although other materials may be used, such as depending upon the operating conditions under which device 10 is used.

Continuing the above illustration of exemplary frame members 230, permeate gaskets 236 and 236' are attached to permeate frame 232, preferably but not necessarily, by using another thin application of adhesive. Next, membranes 46 are supported against screen structure 210 and/or attached to screen structure 210 using a thin application of adhesive, such as by spraying or otherwise applying the adhesive to either or both of the membrane and/or screen structure. Care should be taken to ensure that the membranes are flat and firmly attached to the corresponding screen member 212. Feed plates, or gaskets, 238 and 238' are optionally attached to gaskets 236 and 236', such as by using another thin application of adhesive. The resulting membrane envelope 200 is then positioned within compartment 18, such as by a suitable mount 52. Optionally, two or more membrane envelopes may be stacked or otherwise supported together within compartment 18.

Figure 36:
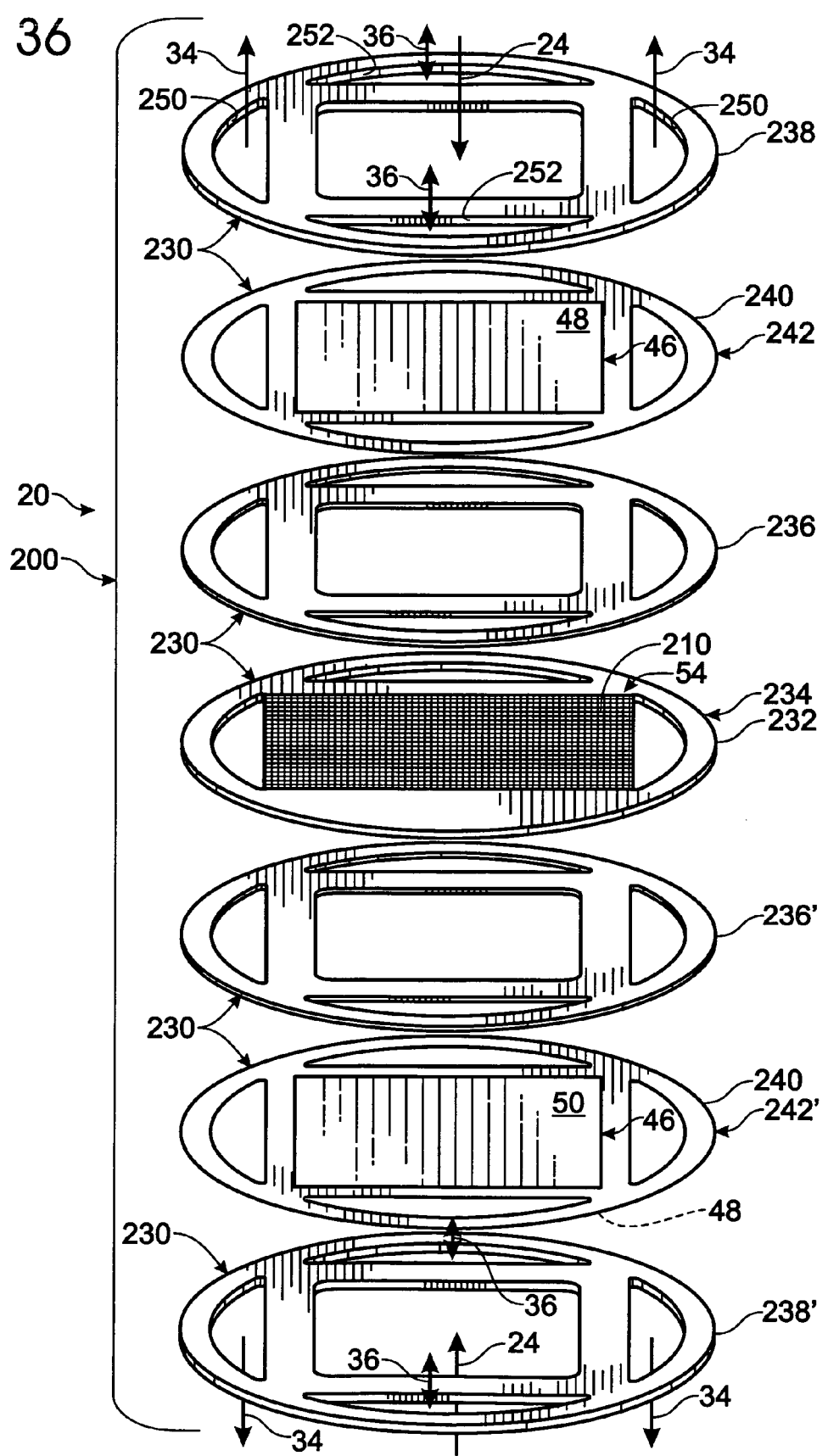
FIG. 36 is an exploded isometric view of another membrane envelope constructed according to the present invention.

As a further alternative, each membrane 46 may be fixed to a frame member 230, such as a metal frame 240, as shown in FIG. 36. If so, the membrane is fixed to the frame, for instance by ultrasonic welding or another suitable attachment mechanism. The membrane-frame assembly may, but is not required to be, attached to screen structure 210 using adhesive. Other examples of attachment mechanisms that achieve gas-tight seals between plates forming membrane envelope 200, as well as between the membrane envelopes, include one or more of brazing, gasketing, and welding. The membrane and attached frame may collectively be referred to as a membrane plate 242. It is within the scope of the disclosure that the various frames discussed herein do not all need to be formed from the same materials and/or that the frames may not have the same dimensions, such as the same thicknesses. For example, the permeate and feed frames may be formed from stainless steel or another suitable structural member, while the membrane plate may be formed from a different material, such as copper, alloys thereof, and other materials discussed in the above-incorporated patents and applications. Additionally and/or alternatively, the membrane plate may, but is not required to be, thinner than the feed and/or permeate plates.

For purposes of illustration, a suitable geometry of fluid flow through membrane envelope 200 is described with respect to the embodiment of envelope 200 shown in FIG. 35. As shown, mixed gas stream 24 is delivered to the membrane envelope and contacts the outer surfaces 50 of membranes 46. The hydrogen-rich gas that permeates through the membranes enters harvesting conduit 204. The harvesting conduit is in fluid communication with conduits 250 through which the permeate stream may be withdrawn from the membrane envelope. The portion of the mixed gas stream that does not pass through the membranes flows to a conduit 252 through which this gas may be withdrawn as byproduct stream 36. In FIG. 35, a single byproduct conduit 252 is shown, while in FIG. 36 a pair of conduits 252 are shown to illustrate that any of the conduits described herein may alternatively include more than one fluid passage. It should be understood that the arrows used to indicate the flow of streams 34 and 36 have been schematically illustrated, and that the direction of flow through conduits 250 and 252 may vary, such as depending upon the configuration of a particular membrane envelope 200, module 220 and/or device 10.

Figure 37:
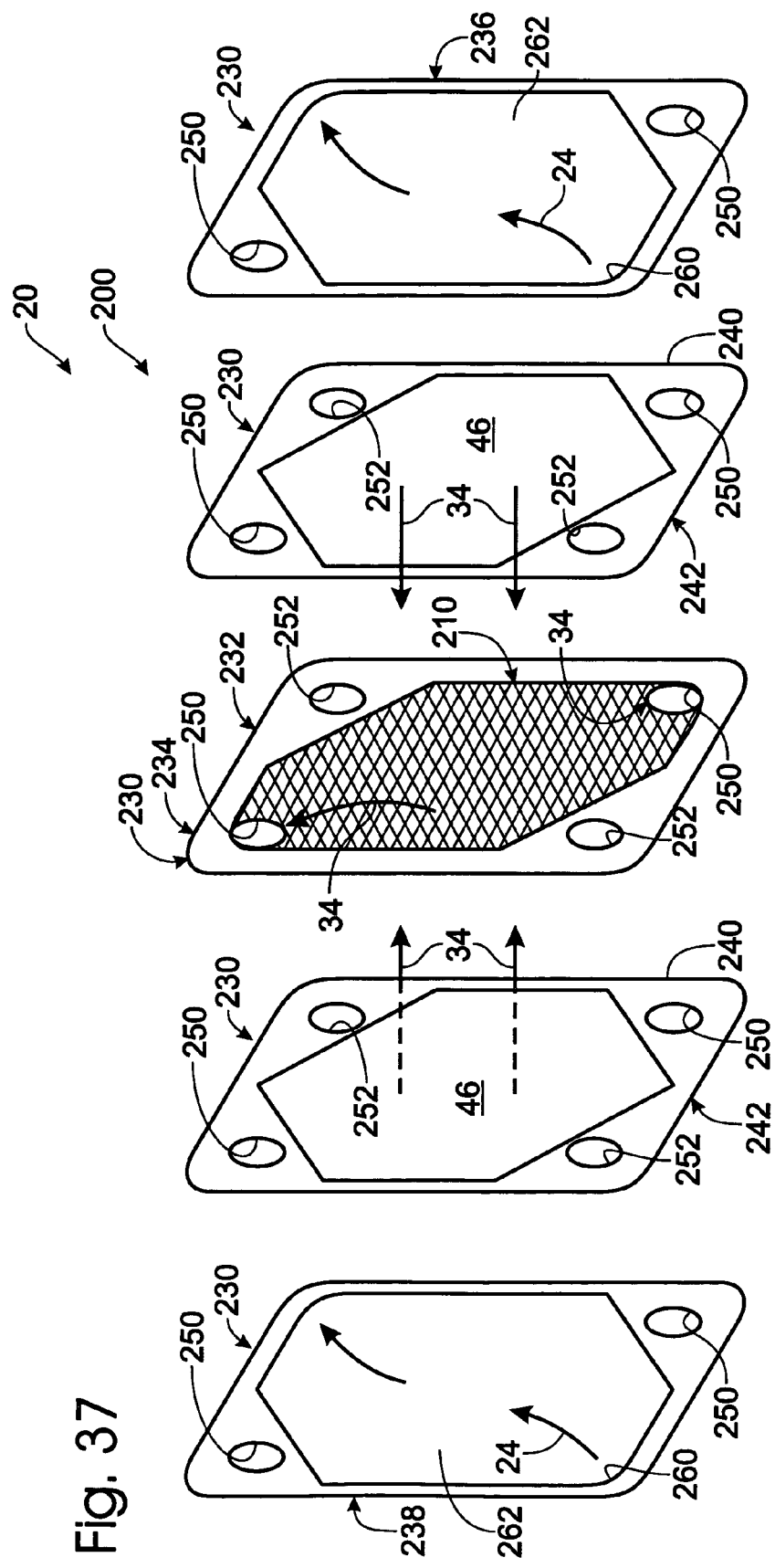
FIG. 37 is an exploded isometric view of another membrane envelope constructed according to the present invention.

In FIG. 37, another example of a suitable membrane envelope 200 is shown. To graphically illustrate that end plates 60 and shell 62 may have a variety of configurations, envelope 200 is shown having a generally rectangular configuration. The envelope of FIG. 37 also provides another example of a membrane envelope having a pair of byproduct conduits 252 and a pair of hydrogen conduits 250. As shown, envelope 200 includes feed, or spacer, plates 238 as the outer most frames in the envelope. Generally, each of plates 238 includes a frame 260 that defines an inner open region 262. Each inner open region 262 couples laterally to conduits 252. Conduits 250, however, are closed relative to open region 262, thereby isolating hydrogen-rich stream 34.

Membrane plates 242 lie adjacent and interior to plates 238. Membrane plates 242 each include as a central portion thereof a hydrogen-selective membrane 46, which may be secured to an outer frame 240, which is shown for purposes of graphical illustration. In plates 242, all of the conduits are closed relative to membrane 46. Each membrane lies adjacent to a corresponding one of open regions 262, i.e., adjacent to the flow of mixed gas arriving to the envelope. This provides an opportunity for hydrogen gas to pass through the membrane, with the non-permeating gases, i.e., the gases forming byproduct stream 36, leaving open region 262 through conduit 252. Screen plate 234 is positioned intermediate membranes 46 and/or membrane plates 242, i.e., on the interior or permeate side of each of membranes 46. Screen plate 234 includes a screen structure 210 or another suitable support 54. Conduits 252 are closed relative to the central region of screen plate 234, thereby isolating the byproduct stream 36 and mixed gas stream 24 from hydrogen-rich stream 34. Conduits 250 are open to the interior region of screen plate 234. Hydrogen gas, having passed through the adjoining membranes 46, travels along and through screen structure 210 to conduits 250 and eventually to an output port as the hydrogen-rich stream 34.

Figure 38:
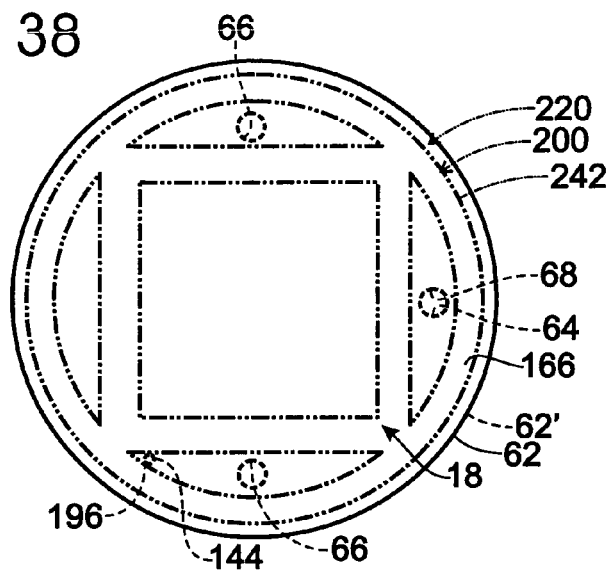
FIG. 38 is a cross-sectional view of a shell for an enclosure for a hydrogen purification device constructed according to the present invention with an illustrative membrane frame and membrane module shown in dashed lines.
Figure 39:
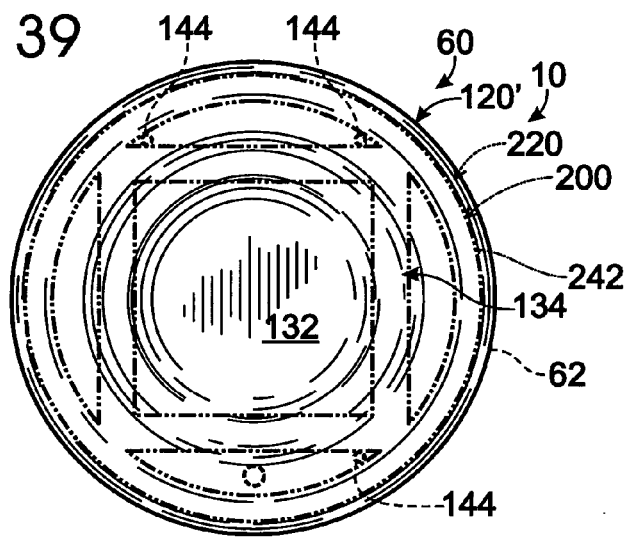
FIG. 39 is a top plan view of the end plate of FIG. 21 with an illustrative separation membrane and frame shown in dashed lines.
Figure 40:
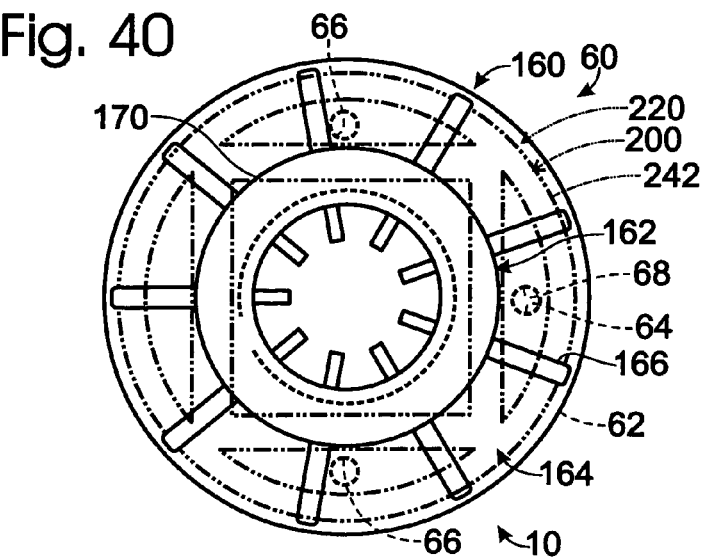
FIG. 40 is a top plan view of the end plate of FIG. 25 with an illustrative separation membrane and frame shown in dashed lines.

As discussed, device 10 may include a single membrane 46 within shell 62, a plurality of membranes within shell 62, one or more membrane envelopes 200 within shell 62 and/or other separation assemblies 20. In FIG. 38, a membrane envelope 200 similar to that shown in FIG. 36 is shown positioned within shell 62 to illustrate this point. It should be understood that envelope 200 may also schematically represent a membrane module 220 containing a plurality of membrane envelopes, and/or a single membrane plate 242. Also shown for purposes of illustration is an example of a suitable position for guide structures 144. As discussed, structures 144 also represent an example of internal supports 196. FIG. 38 also illustrates graphically an example of suitable positions for ports 64–68. To further illustrate suitable positions of the membrane plates and/or membrane envelopes within devices 10 containing end plates according to the present disclosure, FIGS. 39 and 40 respectively illustrate in dashed lines a membrane plate 242, membrane envelope 200 and/or membrane module 220 positioned within a device 10 that includes the end plates shown in FIGS. 21–22- and 25–26.

Figure 41:
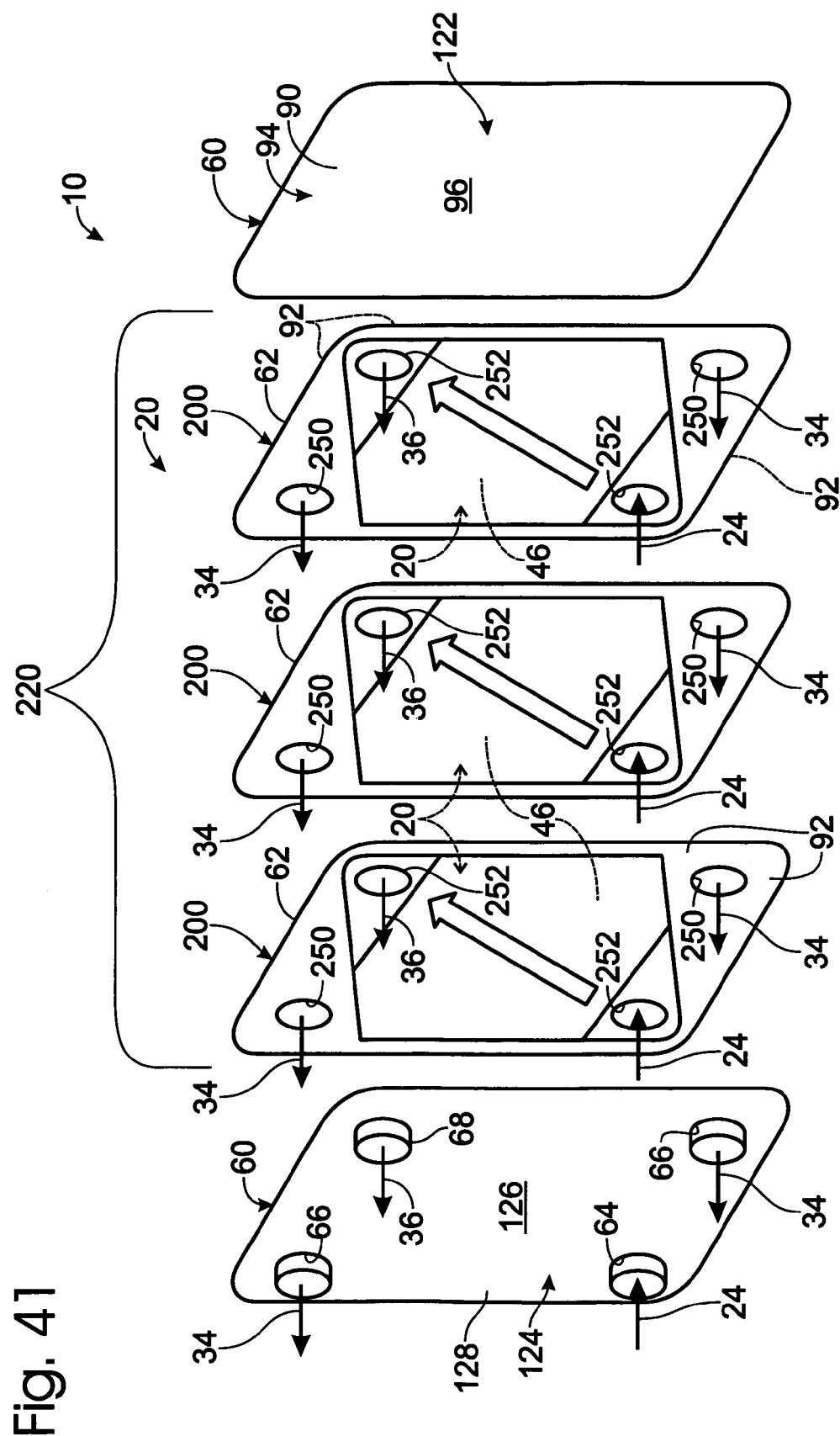
FIG. 41 is an exploded isometric view of another hydrogen purification device constructed according to the present invention.

Shell 62 has been described as interconnecting the end plates to define therewith internal compartment 18. It is within the scope of the disclosure that the shell may be formed from a plurality of interconnected plates 230. For example, a membrane module 220 that includes one or more membrane envelopes 200 may form shell 62 because the perimeter regions of each of the plates may form a fluid-tight, or at least substantially fluid-tight seal therebetween. An example of such a construction is shown in FIG. 41, in which a membrane module 220 that includes three membrane envelopes 200 is shown. It should be understood that the number of membrane envelopes may vary, from a single envelope or even a single membrane plate 242, to a dozen or more. In FIG. 41, end plates 60 are schematically represented as having generally rectangular configurations to illustrate that configurations other than circular configurations are within the scope of the disclosure. It should be understood that the schematically depicted end plates 60 may have any of the end plate configurations discussed, illustrated and/or incorporated herein.

In the preceding discussion, illustrative examples of suitable materials of construction and methods of fabrication for the components of hydrogen purification devices according to the present disclosure have been discussed. It should be understood that the examples are not meant to represent an exclusive, or closed, list of exemplary materials and methods, and that it is within the scope of the disclosure that other materials and/or methods may be used. For example, in many of the above examples, desirable characteristics or properties are presented to provide guidance for selecting additional methods and/or materials. This guidance is also meant as an illustrative aid, as opposed to reciting essential requirements for all embodiments.

As discussed, in embodiments of device 10 that include a separation assembly that includes hydrogen-permeable and/or hydrogen-selective membranes 46, suitable materials for membranes 46 include palladium and palladium alloys, including alloys containing relatively small amounts of carbon, silicon and/or oxygen. As also discussed, the membranes may be supported by frames and/or supports, such as the previously described frames 240, supports 54 and screen structure 210. Furthermore, devices 10 are often operated at selected operating parameters that include elevated temperatures and pressures. In such an application, the devices typically begin at a startup, or initial, operating state, in which the devices are typically at ambient temperature and pressure, such as atmospheric pressure and a temperature of approximately 25° C. From this state, the device is heated (such as with heating assembly 42) and pressurized (via any suitable mechanism) to selected operating parameters, such as temperatures of 200° C. or more, and selected operating pressures, such as pressure of 50 psi or more.

When devices 10 are heated, the components of the devices will expand. The degree to which the components enlarge or expand is largely defined by the coefficient of thermal expansion (CTE) of the materials from which the components are formed. Accordingly, these differences in CTEs will tend to cause the components to expand at different rates, thereby placing additional tension or compression on some components and/or reduced tension or compression on others.

For example, consider a hydrogen-selective membrane 46 formed from an alloy of 60 wt % palladium and 40 wt % copper (Pd-40Cu). Such a membrane has a coefficient of thermal expansion of 13.4 ($\mu$m/m)/° C. Further consider that the membrane is secured to a structural frame 230 or retained against a support 54 formed from a material having a different CTE than Pd-40Cu or another material from which membrane 46 is formed. When a device 10 in which these components are operated is heated from an ambient or resting configuration, the components will expand at different rates. If the CTE of the membrane is less than the CTE of the adjoining structural component, then the membrane will tend to be stretched as the components are heated. In addition to this initial stretching, it should be considered that hydrogen purification devices typically experience thermal cycling as they are heated for use, then cooled or allowed to cool when not in use, then reheated, recooled, etc. In such an application, the stretched membrane may become wrinkled as it is compressed toward its original configuration as the membrane and other structural component(s) are cooled. On the other hand, if the CTE of the membrane is greater than the CTE of the adjoining structural component, then the membrane will tend to be compressed during heating of the device, and this compression may cause wrinkling of the membrane. During cooling, or as the components cool, the membrane is then drawn back to its original configuration.

Wrinkling of membrane 46 may cause holes and cracks in the membrane, especially along the wrinkles where the membrane is fatigued. In regions where two or more wrinkles intersect, the likelihood of holes and/or cracks is increased because that portion of the membrane has been wrinkled in at least two different directions. It should be understood that holes and cracks lessen the selectivity of the membrane for hydrogen gas because the holes and/or cracks are not selective for hydrogen gas and instead allow any of the components of the mixed gas stream to pass thereto. During repeated thermal cycling of the membrane, these points or regions of failure will tend to increase in size, thereby further decreasing the purity of the hydrogen-rich, or permeate, stream.

One approach to guarding against membrane failure due to differences in CTE between the membranes and adjoining structural components is to place deformable gaskets between the membrane and any component of device 10 that contacts the membrane and has sufficient stiffness or structure to impart compressive or tensile forces to the membrane that may wrinkle the membrane. For example, in FIG. 33, membrane 46 is shown sandwiched between feed plate 238 and permeate gasket 236, both of which may be formed from a deformable material. In such an embodiment and with such a construction, the deformable gaskets buffer, or absorb, at least a significant portion of the compressive or tensile forces that otherwise would be exerted upon membrane 46.

In embodiments where either or both of these frames are not formed from a deformable material (i.e., a resilient material that may be compressed or expanded as forces are imparted thereto and which returns to its original configuration upon removal of those forces), when membrane 46 is mounted on a plate 242 that has a thickness and/or composition that may exert the above-described wrinkling tensile or compressive forces to membrane 46, or when support 54 is bonded (or secured under the selected operating pressure) to membrane 46, a different approach may additionally or alternatively be used. More specifically, the life of the membranes may be increased by forming components of device 10 that otherwise would impart wrinkling forces, either tensile or compressive, to membrane 46 from materials having a CTE that is the same or similar to that of the material or materials from which membrane 46 is formed.

For example, Type 304 stainless steel has a CTE of 17.3 and Type 316 stainless steel has a CTE of 16.0. Accordingly, Type 304 stainless steel has a CTE that is approximately 30% greater than that of Pd-40Cu, and Type 316 stainless steel has a CTE that is approximately 20% greater than that of Pd-40Cu. This does not mean that these materials may not be used to form the various supports, frames, plates, shells and the like discussed herein. However, in some embodiments of the disclosure, it may be desirable to form at least some of these components form a material that has a CTE that is the same or similar to that of the material from which membrane 46 is formed. More specifically, it may be desirable to have a CTE that is the same as the CTE of the material from which membrane 46 is formed, or a material that has a CTE that is within a selected range of the CTE of the material from which membrane 46 is selected, such as within ±1%, 2%, 5%, 10%, or 15%.

In the following table, exemplary alloys and their corresponding CTE's and compositions are presented.

TABLE 6

| Alloy Type/Grade | CTE (µm/m/C) | Nominal Composition | | | | | | | | | | | |
|---|---|---|---|---|---|---|---|---|---|---|---|---|---|
| | | C | Mn | Ni | Cr | Co | Mo | W | Nb | Cu | Ti | Al | Fe | Si |
| Pd-40Cu | 13.4 | | | | | | | | | | | | | |
| Monel 400 (UNS N04400) | 13.9 | .02 | 1.5 | 65 | | | | | | 32 | | | 2.0 | |
| Monel 401 (UNS N04401) | 13.7 | .05 | 2.0 | 42 | | | | | | 54 | | | 0.5 | |
| Monel 405 (UNS N04405) | 13.7 | .02 | 1.5 | 65 | | | | | | 32 | | | 2.0 | |
| Monel 500 (UNS N05500) | 13.7 | .02 | 1.0 | 65 | | | | | | 32 | 0.6 | | 1.5 | |
| Type 304 Stainless (UNS S30400) | 17.3 | .05 | 1.5 | 9.0 | 19.0 | | | | | | | | Bal | 0.5 |
| Type 316 Stainless (UNS S31600) | 16.0 | .05 | 1.5 | 12.0 | 17.0 | | 2.5 | | | | | | Bal | 0.5 |
| Type 310S Stainless (UNS S31008) | 15.9 | .05 | 1.5 | 20.5 | 25.0 | | | | | | | | Bal | 1.1 |
| Type 330 Stainless (UNS N08330) | 14.4 | .05 | 1.5 | 35.5 | 18.5 | | | | | | | | Bal | 1.1 |
| AISI Type 661 Stainless (UNS R30155) | 14.0 | .1 | 1.5 | 20.0 | 21.0 | 20.5 | 3.0 | 2.5 | 1.0 | | | | 31.0 | 0.8 |
| Inconel 600 (UNS N06600) | 13.3 | .08 | | 76.0 | 15.5 | | | | | | | | 8.0 | |
| Inconel 601 (UNS N06601) | 13.75 | .05 | | 60.5 | 23.0 | | | | | | 0.5 | 1.35 | 14.1 | |
| Inconel 625 (UNS N06625) | 12.8 | .05 | | 61.0 | 21.5 | | 9.0 | | 3.6 | | 0.2 | 0.2 | 2.5 | |
| Incoloy 800 (UNS N08800) | 14.4 | .05 | 0.8 | 32.5 | | | | | | | 0.4 | 0.4 | 0.4 | 46.0 | 0.5 |
| Nimonic Alloy 901 (UNS N09901) | 13.5 | .05 | | 42.5 | 12.5 | | 6.0 | | | | 2.7 | | 36.2 | |
| Hastelloy X (UNS N06002) | 13.3 | .15 | | 49.0 | 22.0 | 1.5 | 9.0 | 0.6 | | | | 2 | 15.8 | |
| Inconel 718 UNS N07718) | 13.0 | .05 | | 52.5 | 19.0 | | 3.0 | | 5.1 | | 0.9 | 0.5 | 18.5 | |
| Haynes 230 (UNS N06002) | 12.7 | 0.1 | | 55.0 | 22.0 | 5.0 | 2.0 | 14 | | | | 0.35 | 3.0 | |

From the above information, it can be seen that alloys such as Hastelloy X have a CTE that corresponds to that of Pd-40Cu, and that the Monel and Inconel 601 alloys have CTE's that are within approximately 1% of the CTE of Pd-40Cu. Of the illustrative example of materials listed in the table, all of the alloys other than Hastelloy F, Incoloy 800 and the Type 300 series of stainless steel alloys have CTE's that are within 2% of the CTE of Pd-40Cu, and all of the alloys except Type 304, 316 and 310S stainless steel alloys have CTE's that are within 5% of the CTE of Pd-40Cu.

Examples of components of device 10 that may be formed from a material having a selected CTE relative to membrane 46, such as a CTE corresponding to or within one of the selected ranges of the CTE of membrane 46, include one or more of the following: support 54, screen members 212, fine or outer screen or expanded metal member 216, inner screen member 214, membrane frame 240, permeate frame 232, permeate plate 234, feed plate 238. By the above, it should be understood that one of the above components may be formed from such a material, more than one of the above components may be formed from such a material, but that none of the above components are required to be formed from such a material. Similarly, the membranes 46 may be formed from materials other than Pd-40Cu, and as such the selected CTE's will vary depending upon the particular composition of membranes 46.

By way of further illustration, a device 10 may be formed with a membrane module 220 that includes one or more membrane envelopes 200 with a screen structure that is entirely formed from a material having one of the selected CTE's; only outer, or membrane-contacting, screen members (such as members 216) formed from a material having one of the selected CTE's and the inner member or members being formed from a material that does not have one of the selected CTE's; inner screen member 214 formed from a material having one of the selected CTE's, with the membrane-contacting members being formed from a material that does not have one of the selected CTE's, etc. By way of further illustration, a device 10 may have a single membrane 46 supported between the end plates 60 of the enclosure by one or more mounts 52 and/or one or more supports 54. The mounts and/or the supports may be formed from a material having one of the selected CTE's. Similarly, at least a portion of enclosure 12, such as one or both of end plates 60 or shell 62, may be formed from a material having one of the selected CTE's.

In embodiments of device 10 in which there are components of the device that do not directly contact membrane 46, these components may still be formed from a material having one of the selected CTE's. For example, a portion or all of enclosure 12, such as one or both of end plates 60 or shell 62, may be formed from a material, including one of the alloys listed in Table 6, having one of the selected CTE's relative to the CTE of the material from which membrane 46 is formed even though these portions do not directly contact membrane 46.

A hydrogen purification device 10 constructed according to the present disclosure may be coupled to, or in fluid communication with, any source of impure hydrogen gas. Examples of these sources include gas storage devices, such as hydride beds and pressurized tanks. Another source is an apparatus that produces as a byproduct, exhaust or waste stream a flow of gas from which hydrogen gas may be recovered. Still another source is a fuel processor, which as used herein, refers to any device that is adapted to produce a mixed gas stream containing hydrogen gas from at least one feed stream containing a feedstock. Typically, hydrogen gas will form a majority or at least a substantial portion of the mixed gas stream produced by a fuel processor.

A fuel processor may produce mixed gas stream 24 through a variety of mechanisms. Examples of suitable mechanisms include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Figure 42:
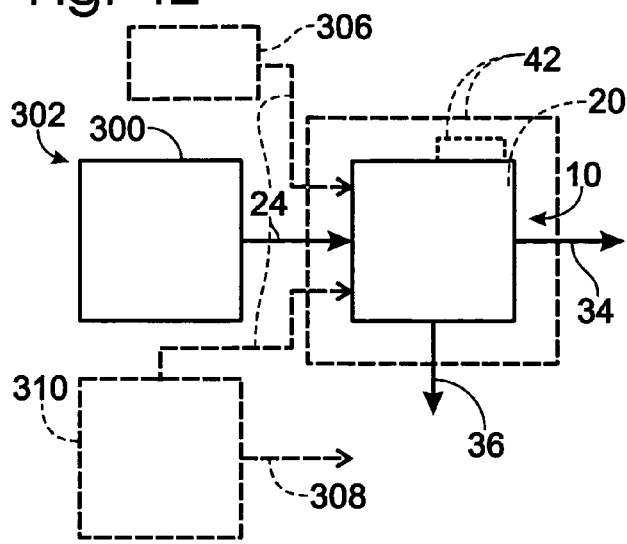
FIG. 42 is a schematic diagram of a fuel processing system that includes a fuel processor and a hydrogen purification device constructed according to the present invention.

A hydrogen purification device 10 adapted to receive mixed gas stream 24 from a fuel processor is shown schematically in FIG. 42. As shown, the fuel processor is generally indicated at 300, and the combination of a fuel processor and a hydrogen purification device may be referred to as a fuel processing system 302. Also shown in dashed lines at 42 is a heating assembly, which as discussed provides heat to device 10 and may take a variety of forms. Fuel processor 300 may take any of the forms discussed above. To graphically illustrate that a hydrogen purification device according to the present disclosure may also receive mixed gas stream 24 from sources other than a fuel processor 300, a gas storage device is schematically illustrated at 306 and an apparatus that produces mixed gas stream 24 as a waste or byproduct stream in the course of producing a different product stream 308 is shown at 310. It should be understood that the schematic representation of fuel processor 300 is meant to include any associated heating assemblies, feedstock delivery systems, air delivery systems, feed stream sources or supplies, etc.

Figure 43:
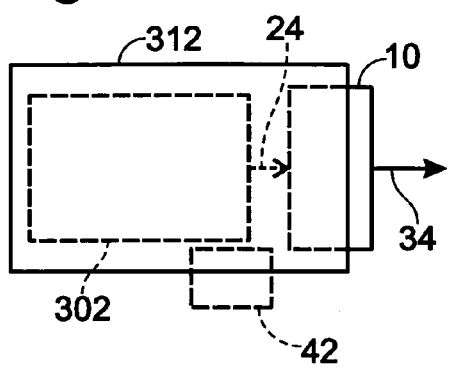
FIG. 43 is a schematic diagram of a fuel processing system that includes a fuel processor integrated with a hydrogen purification device according to the present invention.

Fuel processors are often operated at elevated temperatures and/or pressures. As a result, it may be desirable to at least partially integrate hydrogen purification device 10 with fuel processor 300, as opposed to having device 10 and fuel processor 300 connected by external fluid transportation conduits. An example of such a configuration is shown in FIG. 43, in which the fuel processor includes a shell or housing 312, which device 10 forms a portion of and/or extends at least partially within. In such a configuration, fuel processor 300 may be described as including device 10. Integrating the fuel processor or other source of mixed gas stream 24 with hydrogen purification device 10 enables the devices to be more easily moved as a unit. It also enables the fuel processor's components, including device 10, to be heated by a common heating assembly and/or for at least some if not all of the heating requirements of device 10 be satisfied by heat generated by processor 300.

Figure 44:
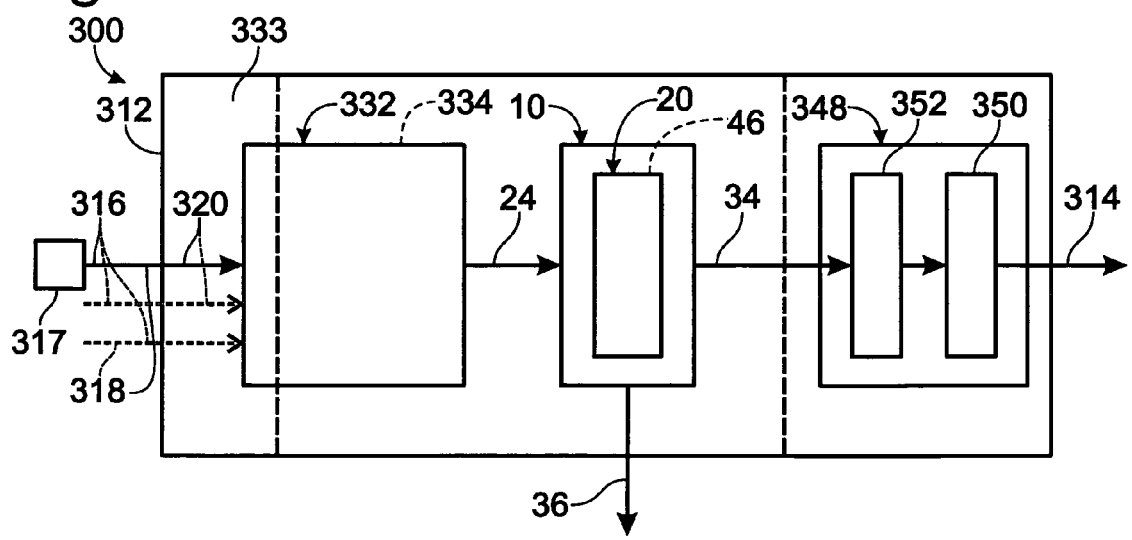
FIG. 44 is a schematic diagram of another fuel processor that includes an integrated hydrogen purification device constructed according to the present invention.

As discussed, fuel processor 300 is any suitable device that produces a mixed gas stream containing hydrogen gas, and preferably a mixed gas stream that contains a majority of hydrogen gas. For purposes of illustration, the following discussion will describe fuel processor 300 as being adapted to receive a feed stream 316 containing a carbon-containing feedstock 318 and water 320, as shown in FIG. 44. However, it is within the scope of the disclosure that the fuel processor 300 may take other forms, as discussed above, and that feed stream 316 may have other compositions, such as containing only a carbon-containing feedstock or only water.

Feed stream 316 may be delivered to fuel processor 300 via any suitable mechanism. A single feed stream 316 is shown in FIG. 44, but it should be understood that more than one stream 316 may be used and that these streams may contain the same or different components. When the carbon-containing feedstock 318 is miscible with water, the feedstock is typically delivered with the water component of feed stream 316, such as shown in FIG. 44. When the carbon-containing feedstock is immiscible or only slightly miscible with water, these components are typically delivered to fuel processor 300 in separate streams, such as shown in dashed lines in FIG. 44. In FIG. 44, feed stream 316 is shown being delivered to fuel processor 300 by a feed stream delivery system 317. Delivery system 317 includes any suitable mechanism, device, or combination thereof that delivers the feed stream to fuel processor 300. For example, the delivery system may include one or more pumps that deliver the components of stream 316 from a supply. Additionally, or alternatively, system 317 may include a valve assembly adapted to regulate the flow of the components from a pressurized supply. The supplies may be located external of the fuel cell system, or may be contained within or adjacent the system.

As generally indicated at 332 in FIG. 44, fuel processor 300 includes a hydrogen-producing region in which mixed gas stream 24 is produced from feed stream 316. As discussed, a variety of different processes may be utilized in hydrogen-producing region 332. An example of such a process is steam reforming, in which region 332 includes a steam reforming catalyst 334 and may therefore be referred to as a reforming region. Alternatively, region 332 may produce stream 24 by autothermal reforming, in which case region 332 includes an autothermal reforming catalyst. In the context of a steam or autothermal reformer, mixed gas stream 24 may also be referred to as a reformate stream. Preferably, the fuel processor is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Examples of suitable fuel processors are disclosed in U.S. Pat. No. 6,221,117, pending U.S. patent application Ser. No. 09/802,361, which was filed on Mar. 8, 2001, and is entitled "Fuel Processor and Systems and Devices Containing the Same," and U.S. Pat. No. 6,319,306, each of which is incorporated by reference in its entirety for all purposes.

Fuel processor 300 may, but does not necessarily, further include a polishing region 348, such as shown in dashed lines in FIG. 44. Polishing region 348 receives hydrogen-rich stream 34 from device 10 and further purifies the stream by reducing the concentration of, or removing, selected compositions therein. In FIG. 44, the resulting stream is indicated at 314 and may be referred to as a product hydrogen stream or purified hydrogen stream. When fuel processor 300 does not include polishing region 348, hydrogen-rich stream 34 forms product hydrogen stream 314. For example, when stream 34 is intended for use in a fuel cell stack, compositions that may damage the fuel cell stack, such as carbon monoxide and carbon dioxide, may be removed from the hydrogen-rich stream, if necessary. The concentration of carbon monoxide should be less than 10 ppm (parts per million) to prevent the control system from isolating the fuel cell stack. Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, even more preferably, less than 1%. Especially preferred concentrations are less than 50 ppm. It should be understood that the acceptable minimum concentrations presented herein are illustrative examples, and that concentrations other than those presented herein may be used and are within the scope of the present disclosure. For example, particular users or manufacturers may require minimum or maximum concentration levels or ranges that are different than those identified herein.

Region 348 includes any suitable structure for removing or reducing the concentration of the selected compositions in stream 34. For example, when the product stream is intended for use in a PEM fuel cell stack or other device that will be damaged if the stream contains more than determined concentrations of carbon monoxide or carbon dioxide, it may be desirable to include at least one methanation catalyst bed 350. Bed 350 converts carbon monoxide and carbon dioxide into methane and water, both of which will not damage a PEM fuel cell stack. Polishing region 348 may also include another hydrogen-producing region 352, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 700° C., and at pressures in the range of 50 psi and 1000 psi, although temperatures outside of this range are within the scope of the disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing or fuel cell system, by an external source, or both.

In FIG. 44, fuel processor 300 is shown including a shell 312 in which the above-described components are contained. Shell 312, which also may be referred to as a housing, enables the components of the fuel processor to be moved as a unit. It also protects the components of the fuel processor from damage by providing a protective enclosure and reduces the heating demand of the fuel processor because the components of the fuel processor may be heated as a unit. Shell 312 may, but does not necessarily, include insulating material 333, such as a solid insulating material, blanket insulating material, or an air-filled cavity. It is within the scope of the disclosure, however, that the fuel processor may be formed without a housing or shell. When fuel processor 300 includes insulating material 333, the insulating material may be internal the shell, external the shell, or both. When the insulating material is external a shell containing the above-described reforming, separation and/or polishing regions, the fuel processor may further include an outer cover or jacket external the insulation.

It is further within the scope of the disclosure that one or more of the components of fuel processor 300 may either extend beyond the shell or be located external at least shell 312. For example, device 10 may extend at least partially beyond shell 312, as indicated in FIG. 43. As another example, and as schematically illustrated in FIG. 44, polishing region 348 may be external shell 312 and/or a portion of hydrogen-producing region 312 (such as portions of one or more reforming catalyst beds) may extend beyond the shell.

Figure 45:
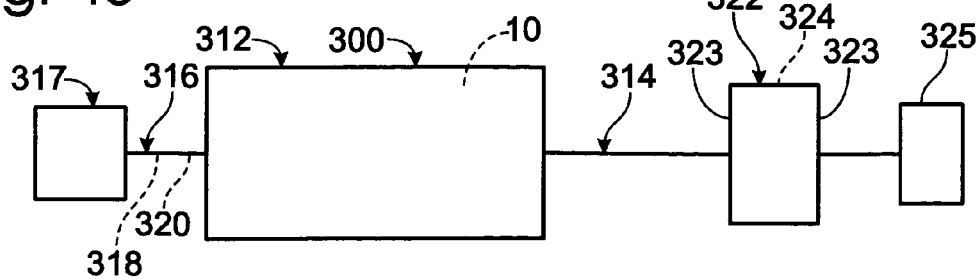
FIG. 45 is a schematic diagram of a fuel cell system that includes a hydrogen purification device constructed according to the present invention.

As indicated above, fuel processor 300 may be adapted to deliver hydrogen-rich stream 34 or product hydrogen stream 314 to at least one fuel cell stack, which produces an electric current therefrom. In such a configuration, the fuel processor and fuel cell stack may be referred to as a fuel cell system. An example of such a system is schematically illustrated in FIG. 45, in which a fuel cell stack is generally indicated at 322. The fuel cell stack is adapted to produce an electric current from the portion of product hydrogen stream 314 delivered thereto. In the illustrated embodiment, a single fuel processor 300 and a single fuel cell stack 322 are shown and described, however, it should be understood that more than one of either or both of these components may be used. It should also be understood that these components have been schematically illustrated and that the fuel cell system may include additional components that are not specifically illustrated in the figures, such as feed pumps, air delivery systems, heat exchangers, heating assemblies and the like.

Fuel cell stack 322 contains at least one, and typically multiple, fuel cells 324 that are adapted to produce an electric current from the portion of the product hydrogen stream 314 delivered thereto. This electric current may be used to satisfy the energy demands, or applied load, of an associated energy-consuming device 325. Illustrative examples of devices 325 include, but should not be limited to, a motor vehicle, recreational vehicle, boat, tools, lights or lighting assemblies, appliances (such as household or other appliances), household, signaling or communication equipment, etc. It should be understood that device 325 is schematically illustrated in FIG. 45 and is meant to represent one or more devices or collection of devices that are adapted to draw electric current from the fuel cell system. A fuel cell stack typically includes multiple fuel cells joined together between common end plates 323, which contain fluid delivery/removal conduits (not shown). Examples of suitable fuel cells include proton exchange membrane (PEM) fuel cells and alkaline fuel cells. Fuel cell stack 322 may receive all of product hydrogen stream 314. Some or all of stream 314 may additionally, or alternatively, be delivered, via a suitable conduit, for use in another hydrogen-consuming process, burned for fuel or heat, or stored for later use.

The above-identified and incorporated patents and patent applications contain numerous examples of fuel processors according to the present disclosure. For purposes of illustration, representative examples of steam reformers with separation regions that include one or more membranes 46 according to the present disclosure are shown. In view of the preceding incorporations by reference, each component, subcomponent, and variation will not be represented and discussed below and/or indicated with reference numbers in the subsequently described figures. Similarly, where possible, like reference numbers will be used. It should be understood that the following discussion is intended to provide exemplary constructions for steam reformers according to the present disclosure, and that any of the above-described features, elements, subelements and/or variations may be incorporated into any of these reformers.

Figure 46:
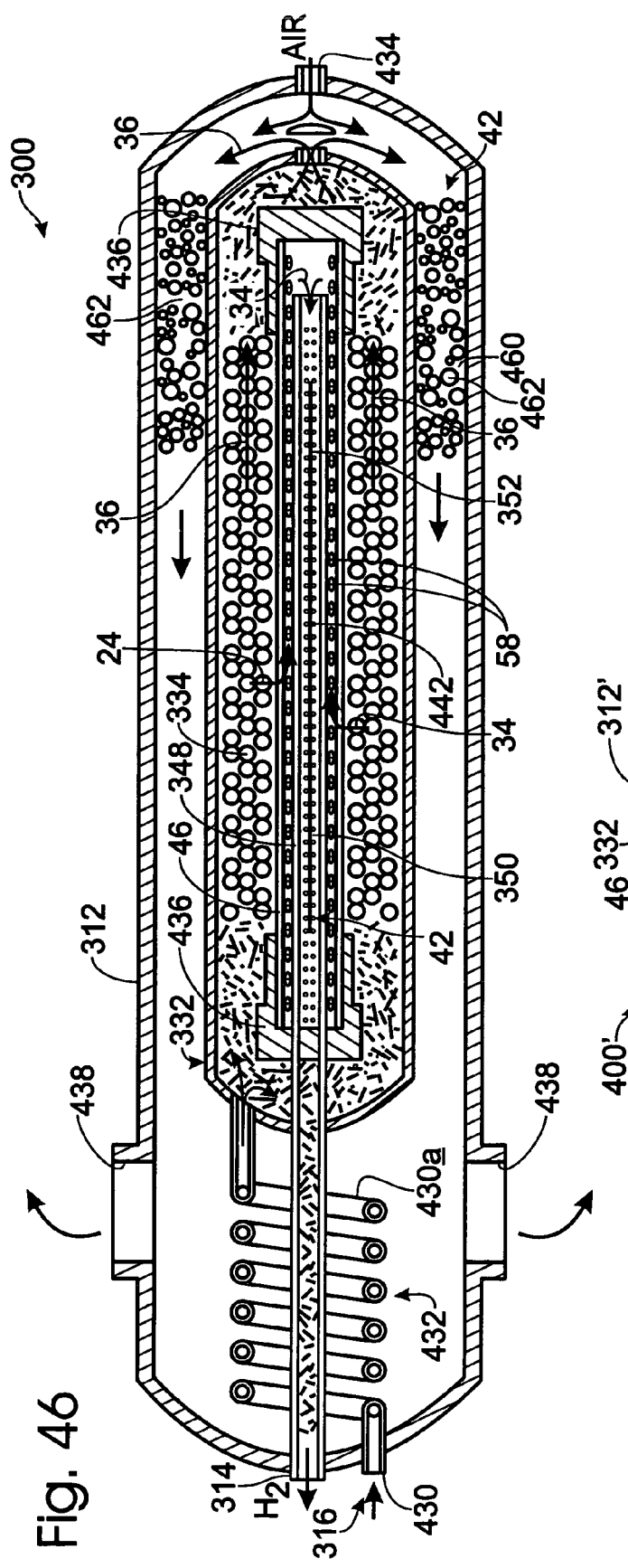
FIG. 46 is a cross-sectional view showing an example of a steam reformer constructed according to the present invention.

FIG. 46 illustrates in cross section an illustrative example of a fuel processor 300 in the form of a steam reformer 400. In FIG. 46, reformer 400 includes a shell 312, which as indicated has a generally closed-end tubular structure. Shell 312 receives through inlet 434 an air supply and releases at combustion ports 438 combustion byproducts. Reformer 400 is heated by a heating assembly 42 in the form of a combustion region 460 that contains a combustion catalyst 462. As illustrated somewhat schematically, catalyst 462 is located generally toward inlet 434, but it is within the scope of the disclosure that the catalyst may additionally or alternatively be located elsewhere within, or even external, shell 312. Examples of suitable combustion catalyst materials include platinum supported on alumina or other inert and thermally-stable ceramic. As shown, feed stream 316 is delivered to the reformer at an inlet 430, which is in communication with a coil 430a in which the feedstock is vaporized. As such, reformer 400 may be described as including a vaporization region 432.

Within reforming region 332 a reforming catalyst 334 (e.g., BASF catalyst K3-110 or ICI catalyst 52-8) reacts with the vaporized feed stream to produce mixed gas stream 24 in the vicinity of a separation region that contains a hydrogen-selective membrane 46. As discussed, membrane 46 may have any of the compositions and constructions described and incorporated herein, including the relatively low carbon content construction described above. As shown, membrane 46 includes end caps 436 and is supported by a support 54 in the form of a tension spring 58.

As discussed previously, hydrogen-rich stream 34 is formed from the portion of mixed gas stream 24 that passes through membrane 46, with the remaining portion of the mixed gas stream forming byproduct stream 36. Hydrogen-rich stream 34 travels within permeate region 32, which as illustrated within tubular membrane 46 may be described as a transport region to a polishing region 348, which in the illustrated embodiment is contained at least partially within region 32. As shown, region 348 contains both a reforming catalyst bed, or region, 352 downstream of membrane 46, as well as a methanation catalyst bed, or region, 350 downstream from the reforming catalyst bed. As discussed, the catalyst beds or regions may form part of a single catalyst bed or may be spaced-apart from each other. Similarly, the beds may vary in relative size and number. Also shown for purposes of illustration in FIG. 41 is another example of a heating assembly 42, namely, an electric resistance heater 442. As shown, heater 442 is located within permeate region 32. However, other placements are possible and within the scope of the disclosure, such as within reforming region 332.

As discussed, byproduct stream 36 may contain hydrogen and other gases that may be used or stored for other applications, including as a combustion fuel to provide some or all of the heating requirements of reformer 400. In the illustrated embodiment, reformer 400 is configured so that stream 36 flows into combustion region 460 and is ignited by a combustion catalyst 462.

Figure 47:
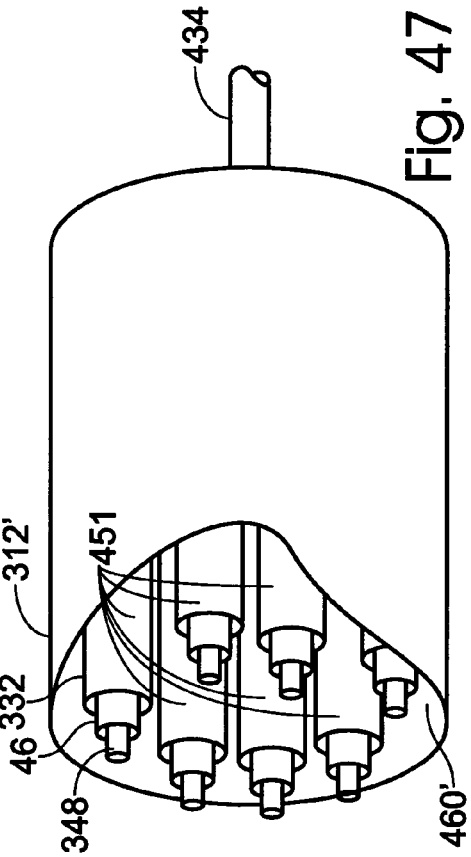
FIG. 47 is a cross-sectional view showing another example of a steam reformer constructed according to the present invention.

FIG. 47 illustrates schematically the architecture of an alternate reformer 400' with an enlarged outermost metal shell 312' that defines a common combustion region 460'. Within the relatively larger combustion region 460', a plurality of reforming assemblies 451 are arranged in spaced relation. The reforming assemblies may have the same or similar constructions, such as each including a reforming region 332, separation assembly (such as with one or more membranes 46), and in some embodiments a polishing, or purification, region 348. While not shown in FIG. 47 for purposes of clarity, reformer 400' includes a feedstock inlet, a product hydrogen outlet, and a byproduct or exhaust gas outlet. As shown, a common air inlet 434 supplies air to the common combustion region 460'. As may be appreciated, each of reforming assemblies 451 provides a byproduct stream 36 to the combustion region 460'.

Figure 48:
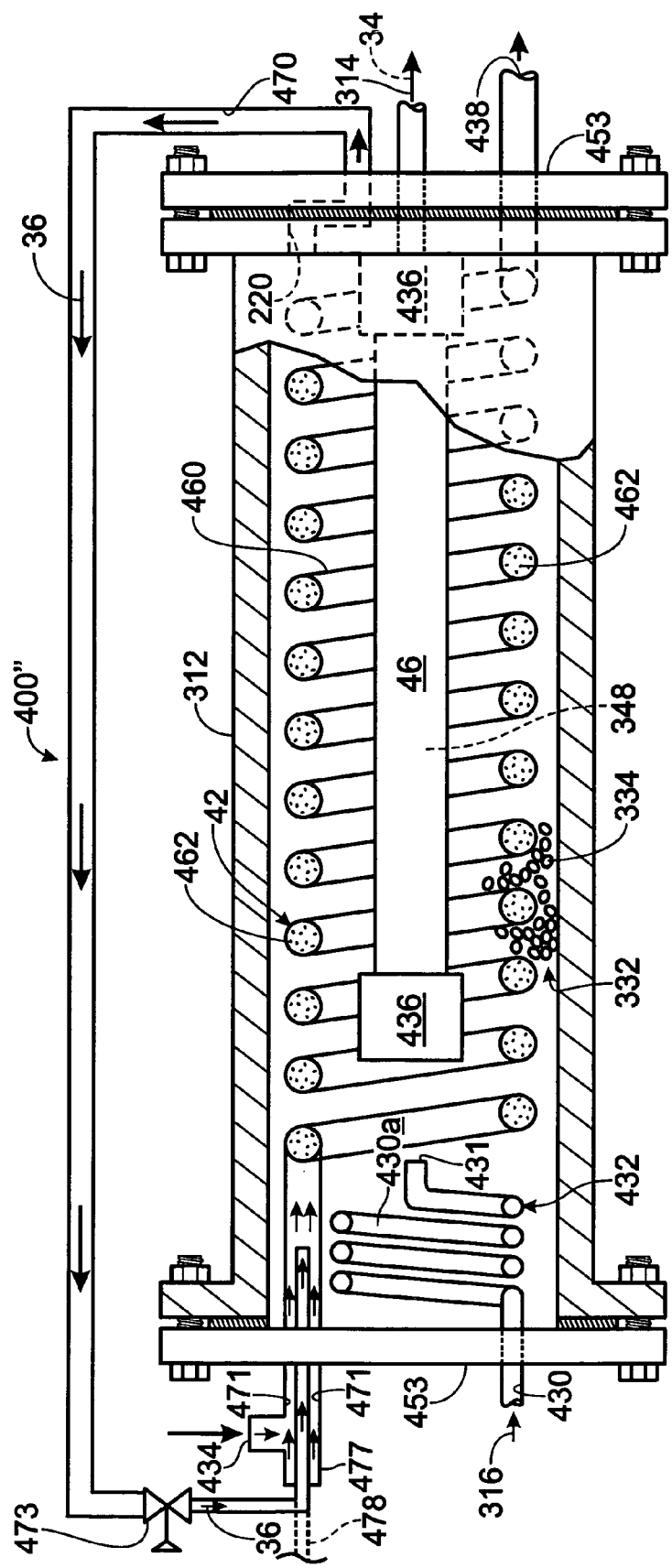
FIG. 48 is a cross-sectional view showing another example of a steam reformer constructed according to the present invention.

FIG. 48 illustrates in partial cross-section, another example of a fuel processor 300 in the form of a steam reformer, which is generally indicated at 400.″ Reformer 400″ demonstrates another example of a reformer having a heating assembly 42 in the form of a catalytically-ignited combustion region 460 distributed through reforming region 332 to improve heat transfer from the combustion process to the reformation process. As shown for purposes of illustration in FIG. 48, reformer 400″ also includes a purification assembly, or polishing region, 348.

Reformer 400″ includes an outer shell 312 sealed at each end by end plates 453. As shown, bolts are used to secure the end plates to the shoulders, or flanges, of a tubular portion of shell 312. However, it is within the scope of the disclosure that other fastening mechanisms may be used and that at least one of the end plates may be integrally formed with the rest of the shell. To illustrate that a variety of internal configurations are possible for reformers according to the present disclosure, reformer 400″ includes a reforming region 332 through which a tubular combustion region 460 extends, in contrast to the tubular reforming region within a combustion region shown in FIG. 46. While a coil or spiral form of combustion system has been illustrated, i.e., the coil 430a, other shapes may be employed as a combustion system within the reforming region 332.

Reformer 400″ also demonstrates that one or more of the reformers fluid conduits may extend external shell 312. For example, reformer 400″ includes a conduit 470 through which byproduct stream 36 flows. In the illustrated embodiment, conduit 470 includes a valve assembly 473, which may include a pressure let-down valve and/or other types of flow-regulating valves to deliver stream 36 at the desired pressure for utilization as a combustion fuel within the pressurized reformer. As shown, conduit 470 delivers stream 36 to an intake manifold 477. Manifold 477 includes an air inlet 434, e.g., coupled to an air blower or to discharged air from the cathode component of a fuel cell stack or to another suitable air source, and air passage way 471 in which the air and fuel stream are mixed and which is in communication with combustion region 460, which as shown has a coiled configuration. In FIG. 48, combustion region 460 again illustrates the use of a combustion catalyst 462, although other combustion sources, such as spark plugs, pilots, glow plugs, and the like may be used. As shown in dashed lines at 478 in FIG. 48, reformer 400 may receive some or all of its combustible fuel from an external source. However, and as discussed in more detail in the incorporated applications, byproduct stream 36 may additionally or alternatively form at least a portion of the combustible fuel stream.

Figure 49:
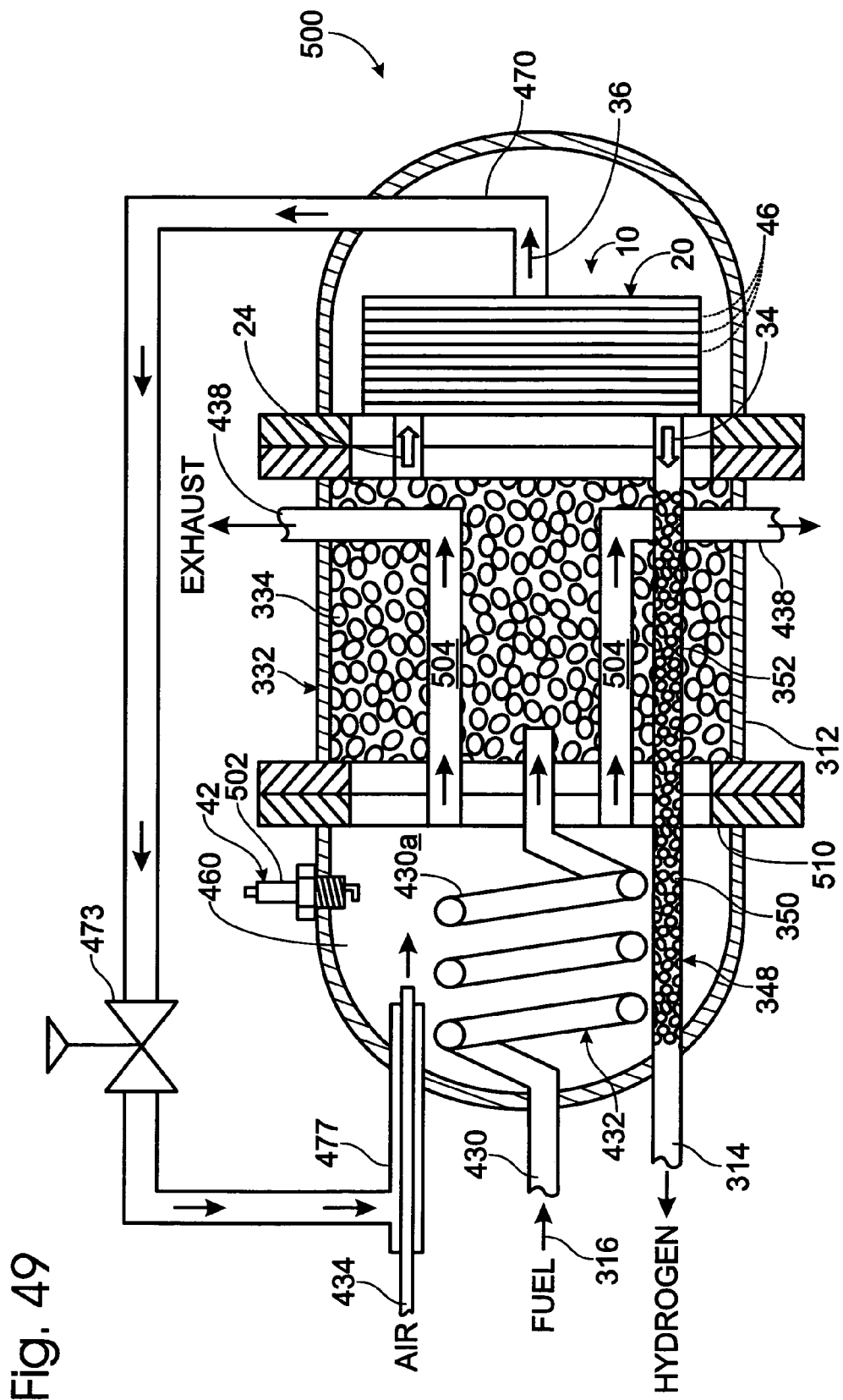
FIG. 49 is a cross-sectional view showing another example of a steam reformer constructed according to the present invention.

FIG. 49 illustrates another example of a fuel processor in the form of a steam reformer, which is generally indicated at 500. Reformer 500 demonstrates an example of a reformer having a vaporization region 432 that is generally isolated, other than the conduit that delivers the vaporized feed stream, from reforming region 332. Expressed another way, reformer 500 includes a partition 510 that at least substantially separates the vaporization and reforming regions. In the illustrated embodiment, vaporization region 432 (and coil 430a) are at least substantially contained within combustion region 460, although it is within the scope of the disclosure that both the combustion and vaporization regions may be separated from the reforming region and from each other. However, in many embodiments, the vaporization and combustion regions will be at least partially coextensive to reduce the heat requirements or heat transfer requirements of the reformer. In the illustrated embodiment, combustion region 460 contains an ignition source in the form of a spark plug 502 and delivers heated combustion gases through conduits 504 that extend through partition 510 and at least partially through reforming region 332.

Reformer 500 also demonstrates an example of a steam reformer (or fuel processor) utilizing an attached hydrogen-purification device 10 in the form of a separation assembly 20 containing a plurality of at least generally planar hydrogen-selective membranes 46 and/or membrane envelopes. As discussed, membranes 46 may have a variety of compositions and constructions, including the relatively low carbon-content membranes (such as Pd-40Cu or other palladium or palladium alloy membranes) discussed above. As shown, conduit 470 delivers byproduct stream 36 to intake manifold 477.

Figure 50:
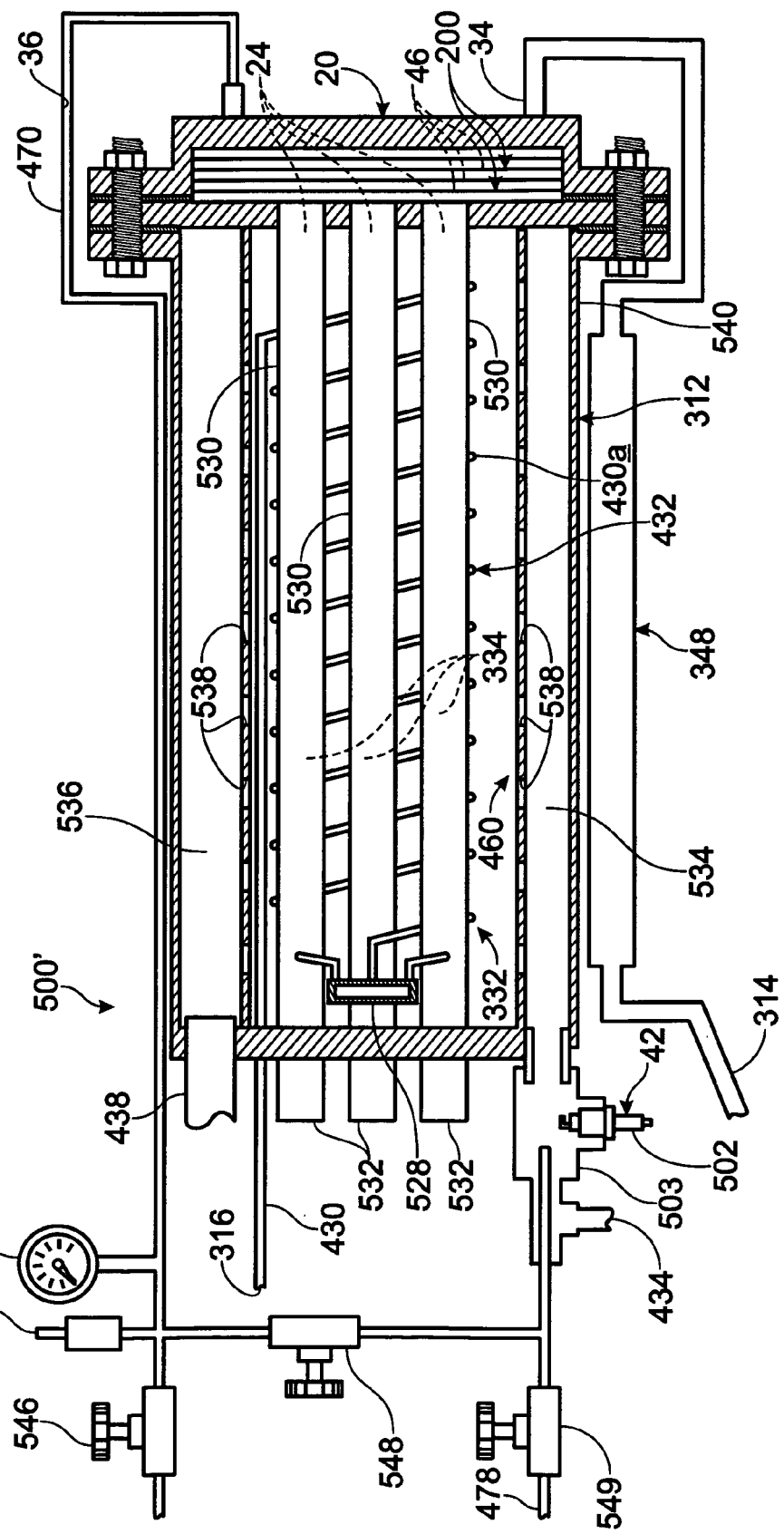
FIG. 50 is a cross-sectional view showing another example of a steam reformer constructed according to the present invention.

In FIG. 50, another embodiment of the fuel processor in the form of a steam reformer is shown and generally indicated at 500'. Similar to the previously described embodiments, reformer 500' includes a shell 312 that houses a reforming region 332 and a combustion region 460. In the illustrated embodiment, reformer 500' includes a plurality of reforming tubes, or regions, 530 that each contain reforming catalyst 334. Three such tubes are shown in FIG. 50, and it should be understood that, like the rest of the reformers disclosed herein, reformer 500' may include as few as one tube or region and in many embodiments may include multiple tubes, such as six, ten or more tubes. Understandably, the number of tubes in any particular embodiment may vary, depending upon such factors as the size of the reformer's shell, the desired rate of hydrogen production, and the number of additional elements within the shell. For example, when a plate-type membrane module is used, there is typically more available space within a similarly sized shell 312 than when a tubular membrane is used.

Reformer 500' also provides an illustrative example of a reformer in which at least a portion of the reforming region extends beyond shell 312. As shown in FIG. 50, a portion 532 of each reforming tube 530 extends external shell 312. This enables the tubes (and the reforming catalyst contained therein) to be accessed without having to open the shell. In this configuration each end portion 532 includes a removable cap or other closure which may be selectively removed to permit access to the interior of the tube, and thereafter replaced. This configuration for the reforming tubes may be used with any of the other reformers disclosed herein, just as reformer 500' may include reforming tubes which are completely housed within shell 312.

In the illustrated embodiment, tubes 530 are heated by hot combustion gases passing from internal combustion manifold 534 to internal exhaust manifold 536, and ultimately exiting reformer 500' through outlet 438. In FIG. 50, a plurality of passages 538 are shown which permit the hot combustion gases to pass between manifolds 534 and 536, and thereby heat tubes 530 as the gases flow around the tubes. Hot combustion gases are produced by a heating assembly 42, which in the illustrated embodiment may be described as a burner 503. Upon initial startup, burner 503 is ignited by a suitable ignition source, such as spark plug 502, or any of the other ignition sources disclosed herein. Combustion air, preferably at or near ambient pressure, is delivered to burner 503 through air inlet 434. Feed stream 316 for the steam reforming process is admitted into the fuel processor through inlet tube 430 and is vaporized as it is heated by the combustion gases. As discussed, a single inlet tube 430 may be used to admit a feedstock comprising alcohol and water, or multiple separate inlet tubes may be used (such as disclosed herein) if the feedstock consists of separate streams of water and a hydrocarbon or alcohol. As shown in FIG. 50, inlet tube 430 forms a coil 430a that defines at least a portion of a vaporization region 432. As shown, coil 430a extends around tubes 530 multiple times before entering a distribution manifold 528. When tubes 530 are of similar size or are adapted to process generally equal volumes of feeds, the feedstock is evenly distributed between the tubes by manifold 528. However, the feedstock may be otherwise proportioned if the tubes are adapted to receive and process different flows of the feedstock.

Coil 430a should be of sufficient length that the feedstock is vaporized prior to reaching distribution manifold 528. It should be understood that the circuitous path of coil 430a is shown in FIG. 50 for purposes of illustrating one possible path. The important concern is that the coil is of sufficient length that the feedstock passing therethrough is vaporized by heat transmitted to it as it travels to distribution manifold 528. To aid with the vaporization of the feedstock, multiple coils of tubing may be used to effectively increase the heat transfer surface area of the tubing, and thereby aid in the vaporization of the feedstock. Vaporization of the feedstock may also be accomplished using plate-type vaporizers, isolated vaporization regions, heating assemblies that vaporize the feed stream prior to delivery to the reformer, etc.

From distribution manifold 528, the vaporized feedstock is distributed to steam reforming tubes 530 and the mixed gas streams 24 generated therein are delivered to a separation assembly, which in the illustrated embodiment takes the form of a membrane module having a plurality of membrane envelopes 200 that each contain hydrogen-selective membranes 46.

Reformer 500" includes the previously described conduit 470, which as discussed may be configured to deliver at least a portion of stream 36 to combustion region 460. Also shown in FIG. 50 are other non-essential elements that may be used within any of the reformers and/or fuel processors disclosed herein. For example, in FIG. 50, reformer 500' further includes a pressure gauge 542 for monitoring the pressure of the fuel gas in conduit 471, a pressure relief valve 544, and a vent valve 546. Also illustrated are a valve 548, which controls the flow of fuel gas in conduit 471 to the burner and applies back pressure on the reforming region, and a valve 549, which controls the flow of start-up fuel gas (previously produced and stored or supplied from an external source), such as hydrogen, propane or natural gas, during a cold start-up of the reformer.

To illustrate another example of a portion of the reformer being located external shell 312, reformer 500' is shown with a polishing region 348 located external shell 312. As shown, region 348 extends proximate the exterior surface 540 of shell 312. However, it is within the scope of the disclosure that region 348 may be at least partially or completely positioned against or spaced away from shell 312. Polishing region 348 is further heated by the hydrogen-rich stream 24 that flows into the bed from the separation region 20. Finally, purified hydrogen exits reformer 500' as stream 314. By locating the polishing catalyst bed external shell 312, reformer 500' may either include additional reforming tubes within its shell, or the shell may be smaller because it no longer needs to house the polishing catalyst bed.

Figure 51:
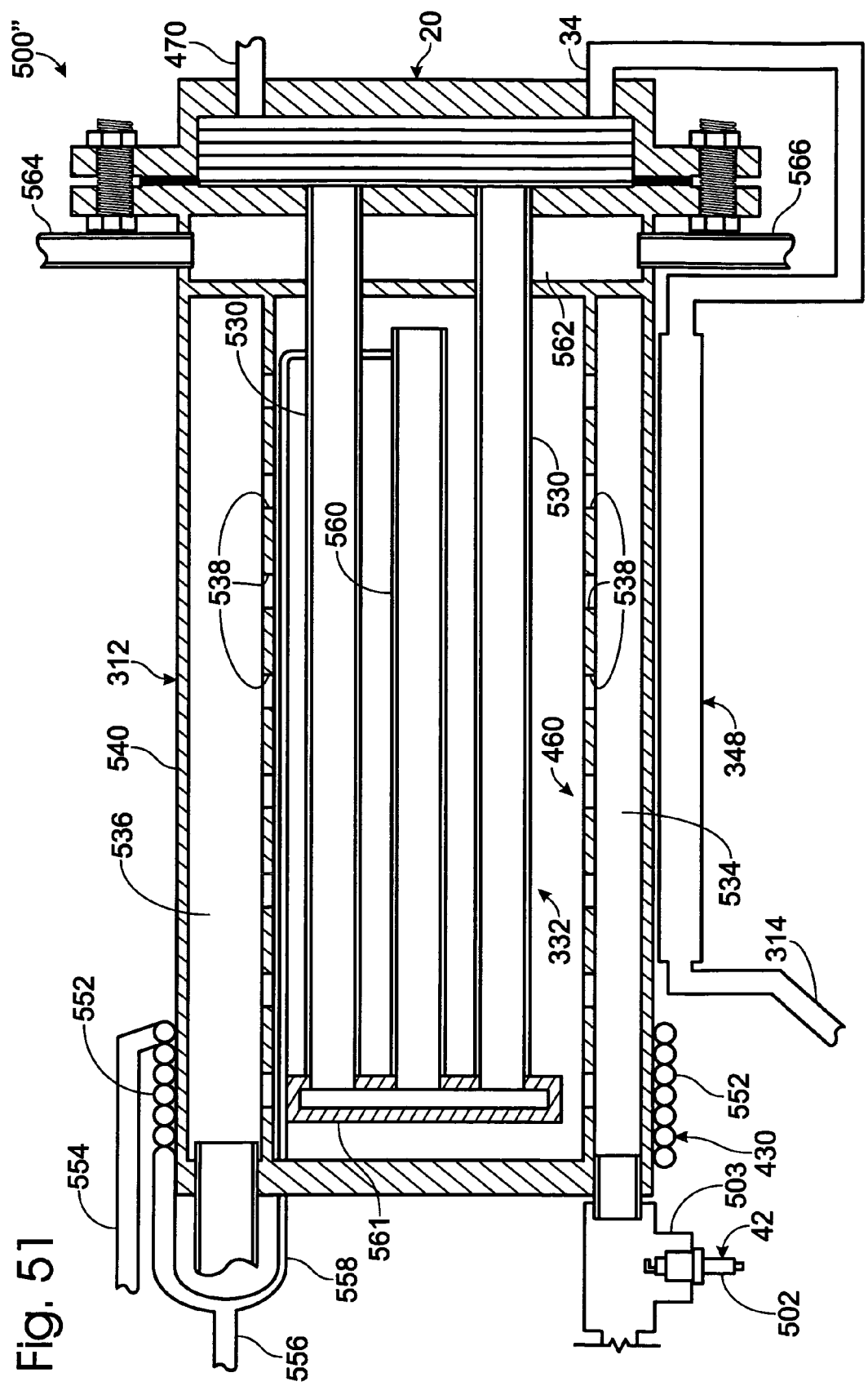
FIG. 51 is a cross-sectional view showing another example of a steam reformer constructed according to the present invention.

In FIG. 51, a variation of the reformer of FIG. 50 is shown and generally indicated at 500". To provide more space within shell 312, and thereby permit additional reforming tubes 530 to be housed therein or permit shell 312 to be smaller, reformer 500" includes vaporization coils 552 which are located external shell 312. As shown, coils 552 are wrapped around the external surface 540 of shell 312 and are in contact therewith. Similar to the polishing catalyst bed described with respect to FIG. 51, coils 552 may be at least partially or completely spaced apart from shell 312. In this case, the important factor is that sufficient heat is transmitted to the feedstock within the coils to vaporize the feedstock before it reaches reforming region 332. In the position shown in FIG. 51, the coils are heated by radiation and thermal conduction from the hot surface of shell 312.

The reformer shown in FIG. 51 also demonstrates an example of suitable structure for admitting to the reforming region feed streams 316 that contain immiscible components. As shown, reformer 500" includes an inlet tube 554 through which a water feed is received and delivered to vaporization region 432 having vaporization coils 552. A hydrocarbon or alcohol feed is admitted through inlet tube 556, and it is mixed with the hot steam before passing into the reformer through a reformer inlet tube 558. The combined feedstock stream passes into one end of a mixing chamber 560, which contains an optional static mixer or a packing (not shown) to promote turbulent flow and thereby encourage mixing of the vaporized feedstocks. The mixed, vaporized feedstock exit the mixing chamber and are delivered to distribution manifold 561, which in turn distributes the feedstock to the reforming tubes.

To increase the energy efficiency and to increase the combustion chamber temperature within the reformer, reformer 500" includes a quenching chamber 562 adapted to partially quench the reformate gas stream prior to its entrance into separation region 20, which as discussed may contain one or more membranes 46 and/or membrane envelopes 200. As shown, the reformate gas stream must pass through chamber 562 after exiting reforming tubes 530 and prior to entering region 20. Chamber 562 includes a pair of ports 564 and 566 through which combustion air respectively enters and exits the chamber. The air is cooler than the reformate gas stream, and therefore cools the reformate gas stream prior to its entry into the separation region. During this exchange, the combustion air is heated prior to its entry to burner 503.

The quenching chamber and external vaporization coils described with respect to reformer 500" may be used with any of the reformers (or fuel processors) described, illustrated and/or incorporated herein. Similarly, the external polishing catalyst bed may be used with any of the reformers described herein, such as to increase the number of reforming tubes within the reformer's shells or to decrease the size of the shell.

INDUSTRIAL APPLICABILITY

The invented hydrogen purification membranes, devices and fuel processing systems are applicable to the fuel processing, fuel cell and other industries in which hydrogen gas is produced and/or utilized.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A hydrogen-producing fuel processing assembly, comprising:
   a shell having an outer surface and defining an internal compartment;
   a reforming region substantially within the internal compartment of the shell and including at least one reforming catalyst bed adapted to receive a reforming feedstock and convert the feedstock into a reformate stream comprising hydrogen gas as a majority component and further comprising other gases as minority components, wherein a portion of the at least one reforming catalyst bed extends beyond the outer surface of the shell;
   a hydrogen purification module adapted to receive at least a portion of the reformate stream and to produce therefrom a hydrogen-rich stream containing at least substantially pure hydrogen gas and a byproduct stream containing at least a substantial portion of the other gases; and
   a heating assembly adapted to receive and combust a fuel stream with air to generate heat for heating at least the reforming region of the fuel processing assembly.

2. The assembly of claim 1, wherein the hydrogen purification module includes at least one hydrogen-selective membrane, and further wherein the hydrogen-rich stream is formed from a portion of the reformate stream that passes through the at least one hydrogen-selective membrane and the byproduct stream is formed from a portion of the reformate stream that does not pass through the at least one hydrogen-selective membrane.

3. The assembly of claim 2, wherein the hydrogen-selective membrane is formed from at least one of palladium and a palladium alloy and has a coefficient of thermal expansion.

4. The assembly of claim 3, wherein the hydrogen-selective membrane comprises palladium and approximately 40 wt % copper.

5. The assembly of claim 4, wherein the hydrogen-selective membrane contains less than 200 ppm carbon.

6. The assembly of claim 4, wherein the hydrogen-selective membrane contains less than 100 ppm carbon.

7. The assembly of claim 4, wherein the hydrogen-selective membrane contains less than 50 ppm carbon.

8. The assembly of claim 3, wherein the hydrogen purification module includes a sealed enclosure defining an internal compartment within which the at least one hydrogen-selective membrane is supported, wherein the enclosure includes at least one input port through which the reformate stream is delivered to the enclosure, at least one product output port through which the hydrogen-rich stream is removed from the enclosure, and at least one byproduct output port through which the byproduct stream is removed from the enclosure, wherein the module further comprises a membrane-contacting structure that is adapted to provide support to the at least one hydrogen-selective membrane and which is at least substantially comprised of a material having a composition that is different than the composition of the hydrogen-selective membrane and which has a coefficient of thermal expansion that is no more than 10% greater than the coefficient of thermal expansion of the hydrogen-selective membrane.

9. The assembly of claim 8, wherein the membrane-contacting structure has a coefficient of thermal expansion that is within 10% of the coefficient of thermal expansion of the membrane.

10. The assembly of claim 9, wherein the membrane-contacting structure has a coefficient of thermal expansion that is within 2% of the coefficient of thermal expansion of the membrane.

11. The assembly of claim 1, further comprising a polishing catalyst bed including a methanation catalyst, wherein the polishing catalyst bed is in fluid communication with the hydrogen purification module and is adapted to receive the hydrogen-rich stream therefrom and produce a product stream from the hydrogen-rich stream, wherein the polishing catalyst bed is adapted to reduce the concentration of carbon dioxide and carbon monoxide in the hydrogen-rich stream by catalytic reaction to produce methane.

12. The assembly of claim 11, wherein the polishing catalyst bed is at least partially located within the internal compartment of the shell.

13. The assembly of claim 12, wherein a portion of the polishing catalyst bed extends external the internal compartment of the shell.

14. The assembly of claim 12, wherein the polishing catalyst bed is located external the internal compartment of the shell.

15. The assembly of claim 11, wherein the polishing catalyst bed is fluidly isolated from the heating assembly so that combustion fluid in the combustion chamber does not enter a polishing catalyst bed.

16. The fuel processing assembly of claim 1, wherein the fuel stream is at least partially comprised of the byproduct stream.

17. The assembly of claim 16, wherein the hydrogen purification module is adapted to produce a byproduct stream containing at least 20 wt % hydrogen gas.

18. The assembly of claim 16, wherein the hydrogen purification module is adapted to produce a byproduct stream containing approximately 20–50% of the stoichiornetrically available hydrogen gas in the reformate stream.

19. The fuel processing assembly of claim 1, wherein the amount of hydrogen in the hydrogen-rich stream is less than a stoichiometrically available amount of hydrogen.

20. The fuel processing assembly of claim 19, wherein the amount of hydrogen in the hydrogen-rich stream is between approximately 50% and approximately 80% of the stoichiometrically available hydrogen.

21. The fuel processing assembly of claim 1, wherein the fuel processing assembly is further adapted to receive a liquid-phase feedstock as the reforming feedstock and vaporize the liquid-phase feedstock prior to delivery to the at least one reforming catalyst bed.

22. The fuel processing assembly of claim 1, wherein the fuel processing assembly includes a vaporization region within the internal compartment of the shell and through which the feedstock is received and vaporized prior to entering the reforming region.

23. The fuel processing assembly of claim 22, wherein the vaporization region is maintained at a greater temperature than the reforming region.

24. The fuel processing assembly of claim 1, wherein the fuel processing assembly further includes a vaporization region through which the feedstock is received and vaporized prior to entering the reforming region, and further wherein the vaporization region is at least partially located external the shell while remaining in thermal communication with the shell.

25. The fuel processing assembly of claim 24, wherein the vaporization region includes a mixing chamber through which a first vaporized component of the reforming feedstock is mixed with a second, at least partially liquid-phase component of the reforming feedstock.

26. The fuel processing assembly of claim 25, wherein the mixing chamber includes means for promoting turbulent flow of the components through the mixing chamber.

27. The fuel processing assembly of claim 1, wherein the fuel processing assembly further includes a quenching chamber in fluid communication with the reforming region and the hydrogen purification module, wherein the quenching chamber is adapted to receive the reformate stream prior to entry to the hydrogen purification module and to reduce the temperature of the reformate stream by heat exchange with a cooler stream.

28. The fuel processing assembly of claim 1, wherein the feedstock is comprised of water and at least one of an alcohol and a hydrocarbon.

29. The fuel processing assembly of claim 28, wherein the reforming region includes a plurality of reforming catalyst beds.

30. The fuel processing assembly of claim 29, wherein the fuel processing assembly further includes a distribution manifold adapted to receive the reforming feedstock and distribute the reforming feedstock to the plurality of reforming catalyst beds.

31. The fuel processing assembly of claim 1, in combination with a fuel cell stack adapted to receive at least a portion of the hydrogen-rich stream.

\* \* \* \* \*

UNITED STATES PATENT AND TRADEMARK OFFICE
CERTIFICATE OF CORRECTION

| | | |
|---|---|---|
| PATENT NO. | : 7,052,530 B2 | Page 1 of 1 |
| APPLICATION NO. | : 10/989907 | |
| DATED | : May 30, 2006 | |
| INVENTOR(S) | : David J. Edlund, William A. Pledger and R. Todd Studebaker | |

It is certified that error appears in the above-identified patent and that said Letters Patent is hereby corrected as shown below:

Column 46,
Line 36, after "that combustion fluid in" please delete "the" and insert -- a -- therefor.

Column 46,
Line 37, before "polishing catalyst bed" please delete "a" and insert -- the -- therefor.

Column 46,
Lines 46-47, after "containg approximately 20-50% of the" please delete "stoichior-netrically" and insert -- stoichiometrically -- therefor.

Signed and Sealed this

Fifth Day of September, 2006

JON W. DUDAS
*Director of the United States Patent and Trademark Office*